(12) United States Patent
Minefuji

(10) Patent No.: US 10,466,452 B2
(45) Date of Patent: Nov. 5, 2019

(54) PROJECTION OPTICAL SYSTEM AND PROJECTOR

(71) Applicant: SEIKO EPSON CORPORATION, Tokyo (JP)

(72) Inventor: Nobutaka Minefuji, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 51 days.

(21) Appl. No.: 15/753,912

(22) PCT Filed: Aug. 19, 2016

(86) PCT No.: PCT/JP2016/003789
§ 371 (c)(1),
(2) Date: Feb. 20, 2018

(87) PCT Pub. No.: WO2017/033445
PCT Pub. Date: Mar. 2, 2017

(65) Prior Publication Data
US 2018/0246302 A1    Aug. 30, 2018

(30) Foreign Application Priority Data
Aug. 21, 2015    (JP) ................. 2015-163476

(51) Int. Cl.
*G02B 17/00* (2006.01)
*G02B 13/18* (2006.01)
(Continued)

(52) U.S. Cl.
CPC ......... *G02B 13/18* (2013.01); *G02B 13/0095* (2013.01); *G02B 13/16* (2013.01);
(Continued)

(58) Field of Classification Search
CPC ................................................... G02B 13/18
(Continued)

(56) References Cited

U.S. PATENT DOCUMENTS 7,549,755 B2    6/2009    Suzuki
7,957,078 B2    6/2011    Minefuji
(Continued)

FOREIGN PATENT DOCUMENTS

JP    2006-235516 A    9/2006
JP    2007-079524 A    3/2007
(Continued)

OTHER PUBLICATIONS

Sep. 27, 2016 International Search Report issued in International Patent Application No. PCT/JP2016/003789.

*Primary Examiner* — James C. Jones
(74) *Attorney, Agent, or Firm* — Oliff PLC

(57) ABSTRACT

A projection optical system capable of performing compact and proximate projection and a projector including the projection optical system. The projection optical system includes a first optical group which is a dioptric system and a second optical group which is a catoptric system. The second optical group includes a first catoptric system to a third catoptric system that have a first reflection surface with a concave surface shape, a second reflection surface with a curved surface shape, and a third reflection surface with a convex surface shape. The first catoptric system to the third catoptric system satisfy Conditional Expression (1) for focal distances. Image light emitted from the first optical group is reflected by the second optical group to be projected to a projection surface.

20 Claims, 34 Drawing Sheets

(51) Int. Cl.
  *G02B 17/08* (2006.01)
  *G02B 13/00* (2006.01)
  *G02B 13/16* (2006.01)
  *G03B 21/28* (2006.01)
(52) U.S. Cl.
  CPC ......... *G02B 17/08* (2013.01); *G02B 17/0828* (2013.01); *G03B 21/28* (2013.01)
(58) Field of Classification Search
  USPC .......................................................... 359/731
  See application file for complete search history.

(56) References Cited

U.S. PATENT DOCUMENTS

| | | |
|---|---|---|
| 8,029,147 B2 | 10/2011 | Suzuki |
| 8,071,965 B2 | 12/2011 | Nishikawa et al. |
| 8,164,838 B2 | 4/2012 | Minefuji |
| 8,217,374 B2 | 7/2012 | Nishikawa et al. |
| 8,419,191 B2 | 4/2013 | Nagase et al. |
| 2006/0198018 A1* | 9/2006 | Shafer .................... G02B 17/08 359/365 |
| 2015/0323767 A1 | 11/2015 | Morikuni et al. |
| 2016/0216497 A1 | 7/2016 | Minefuji |
| 2016/0238822 A1 | 8/2016 | Minefuji |
| 2016/0238825 A1 | 8/2016 | Minefuji |
| 2016/0299415 A1 | 10/2016 | Minefuji |

FOREIGN PATENT DOCUMENTS

| | | |
|---|---|---|
| JP | 2008-250296 A | 10/2008 |
| JP | 2010-186120 A | 8/2010 |
| JP | 2012-203139 A | 10/2012 |
| JP | 2013-242594 A | 12/2013 |
| JP | 2015-215478 A | 12/2015 |
| JP | 2016-138962 A | 8/2016 |
| JP | 2016-151686 A | 8/2016 |
| JP | 2016-151687 A | 8/2016 |
| JP | 2016-151688 A | 8/2016 |
| JP | 2017-003846 A | 1/2017 |
| JP | 2017-003847 A | 1/2017 |

* cited by examiner

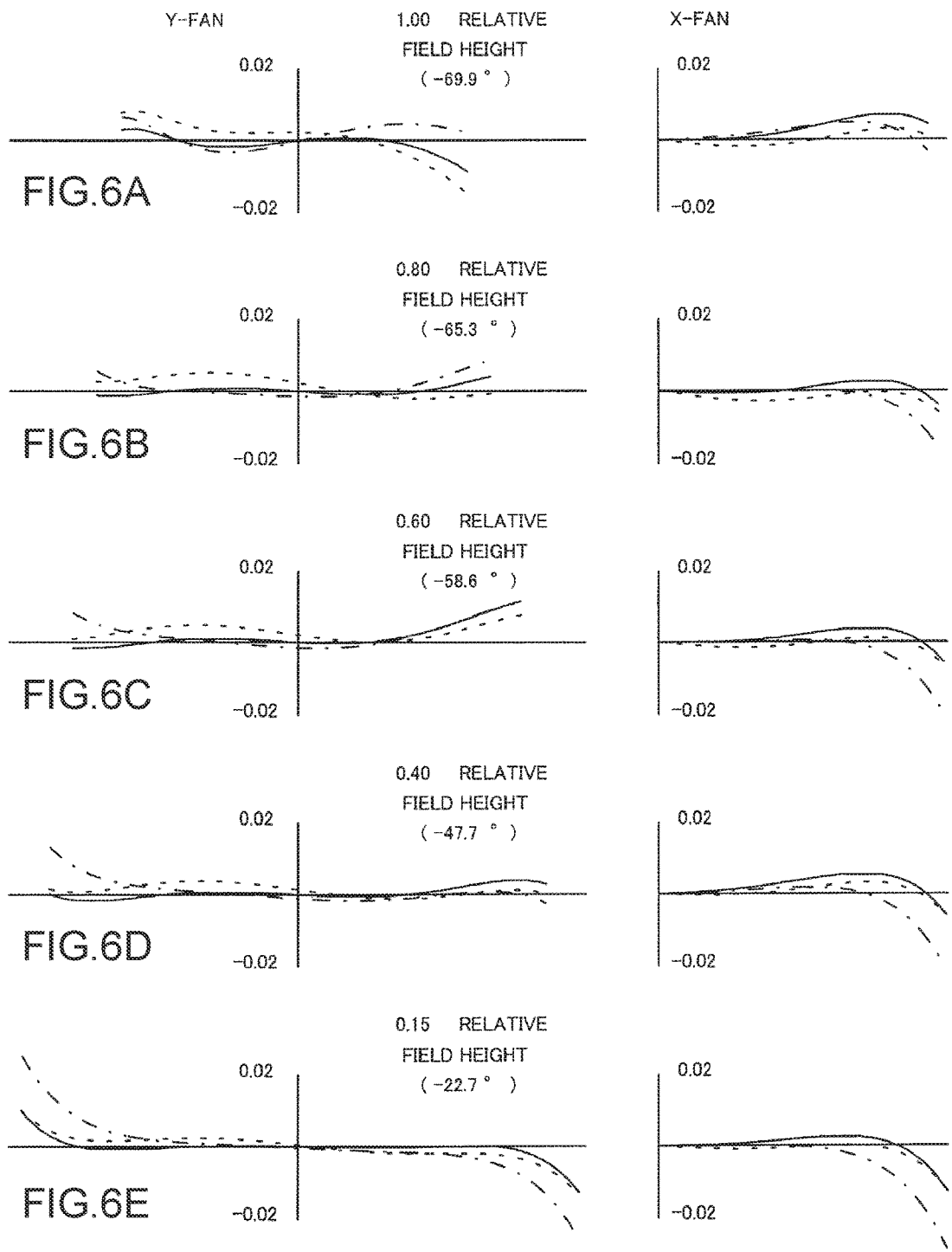

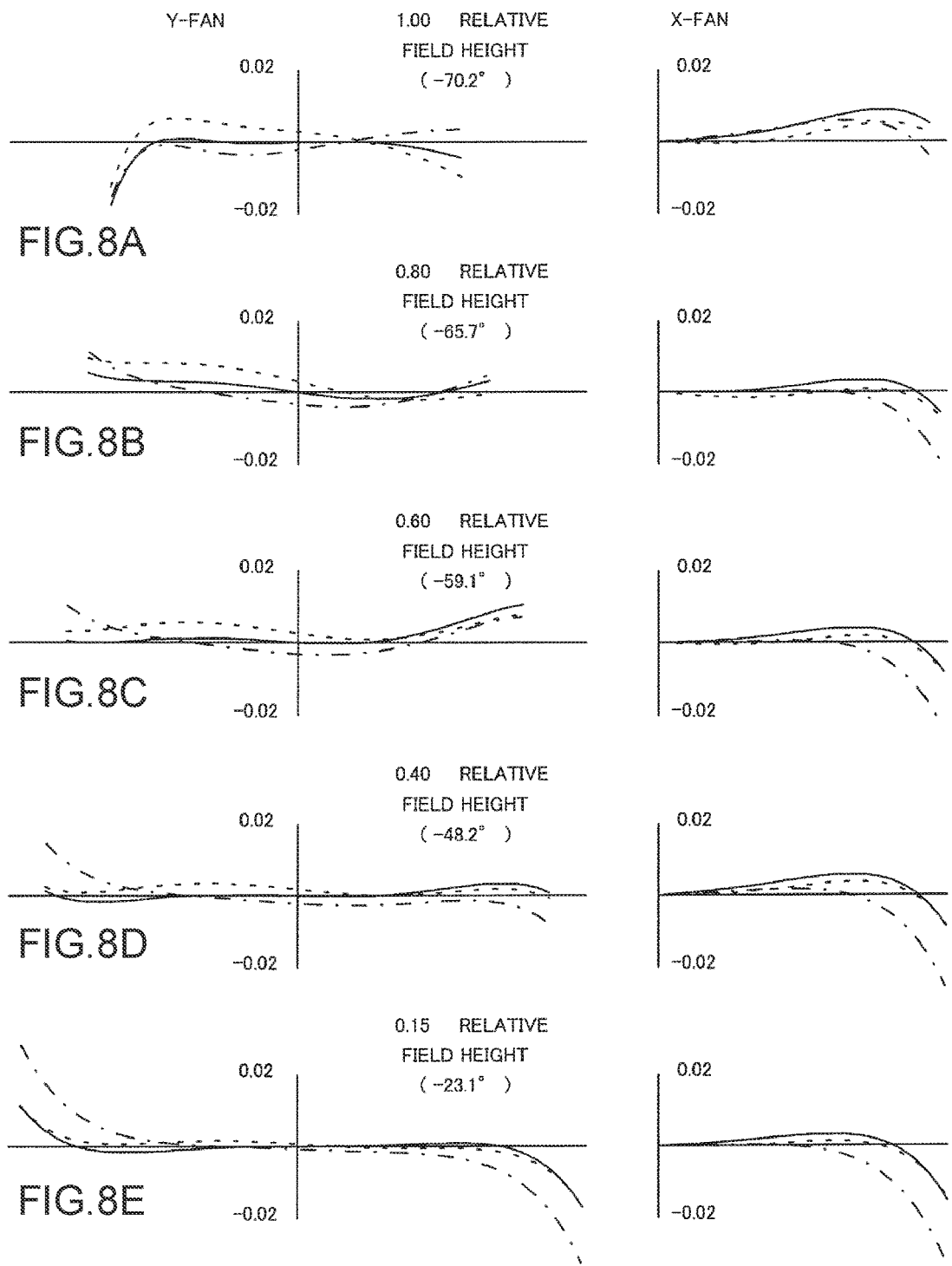

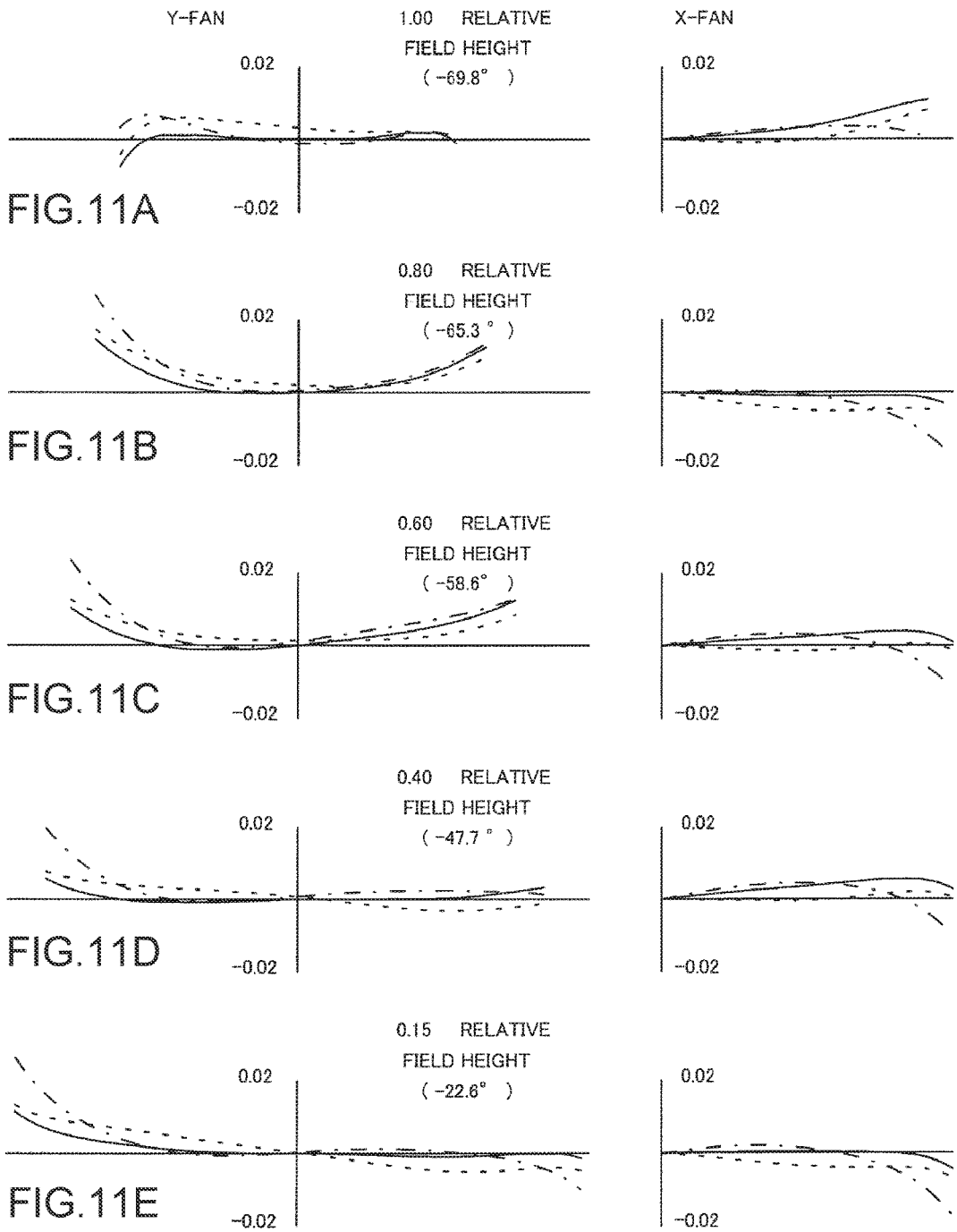

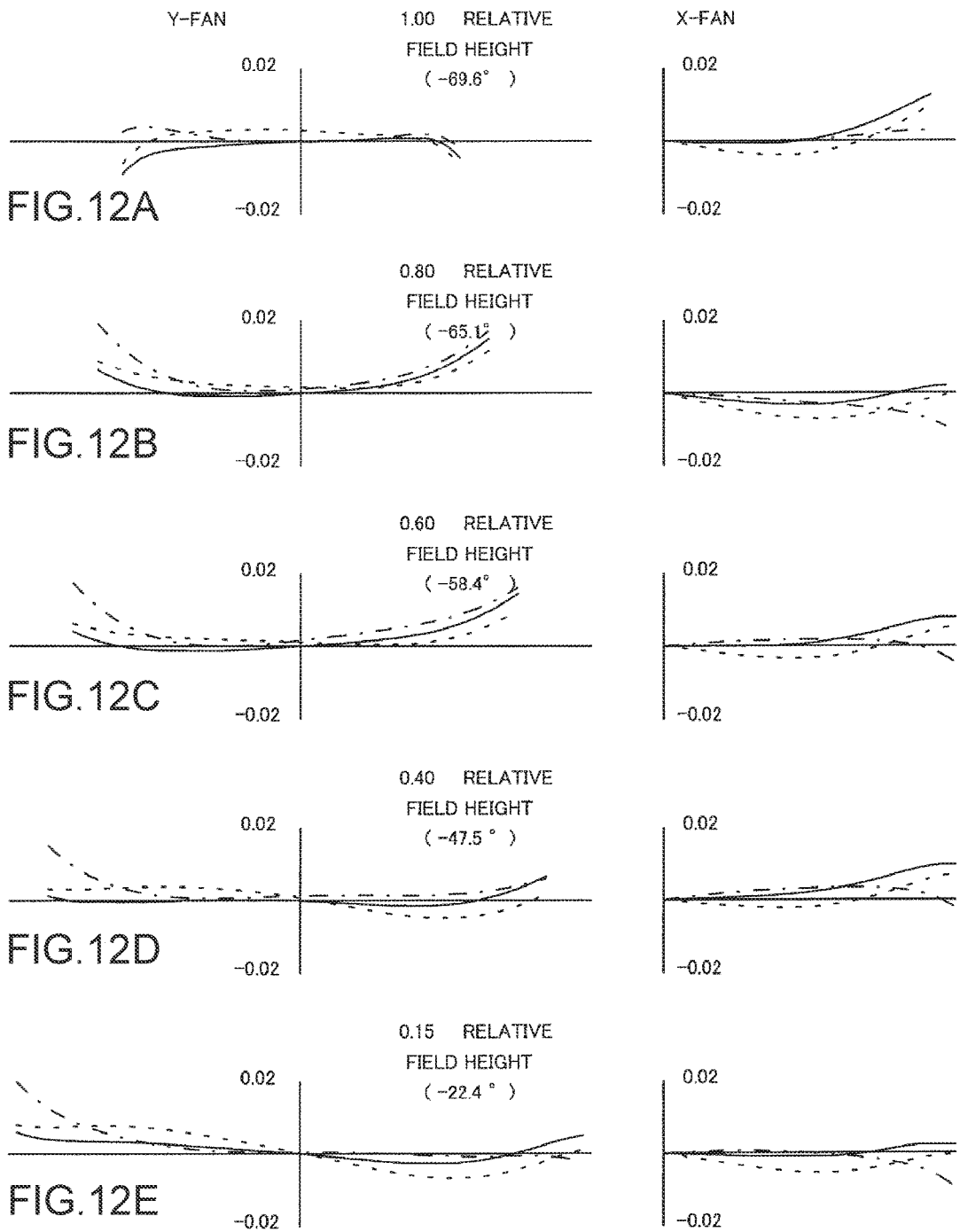

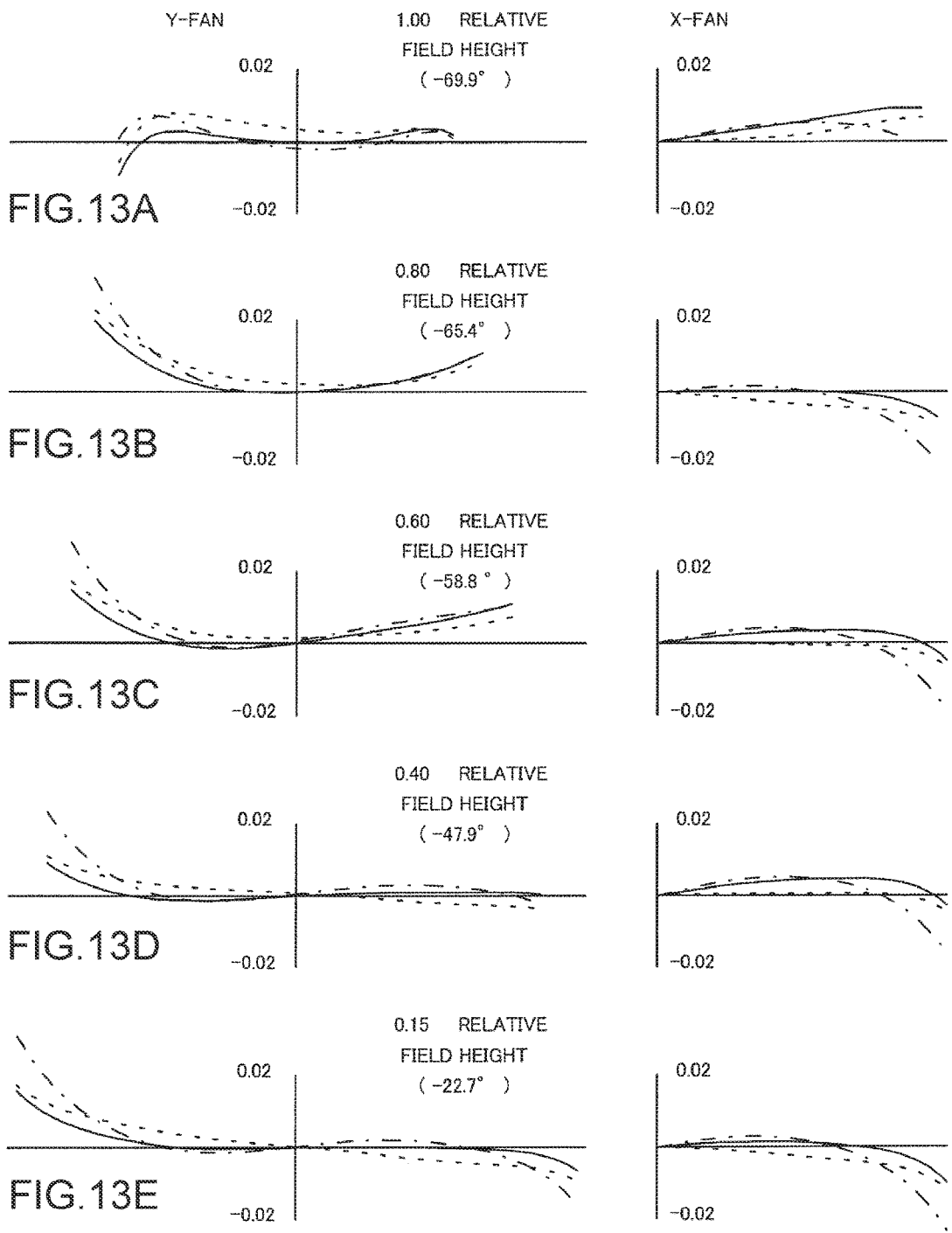

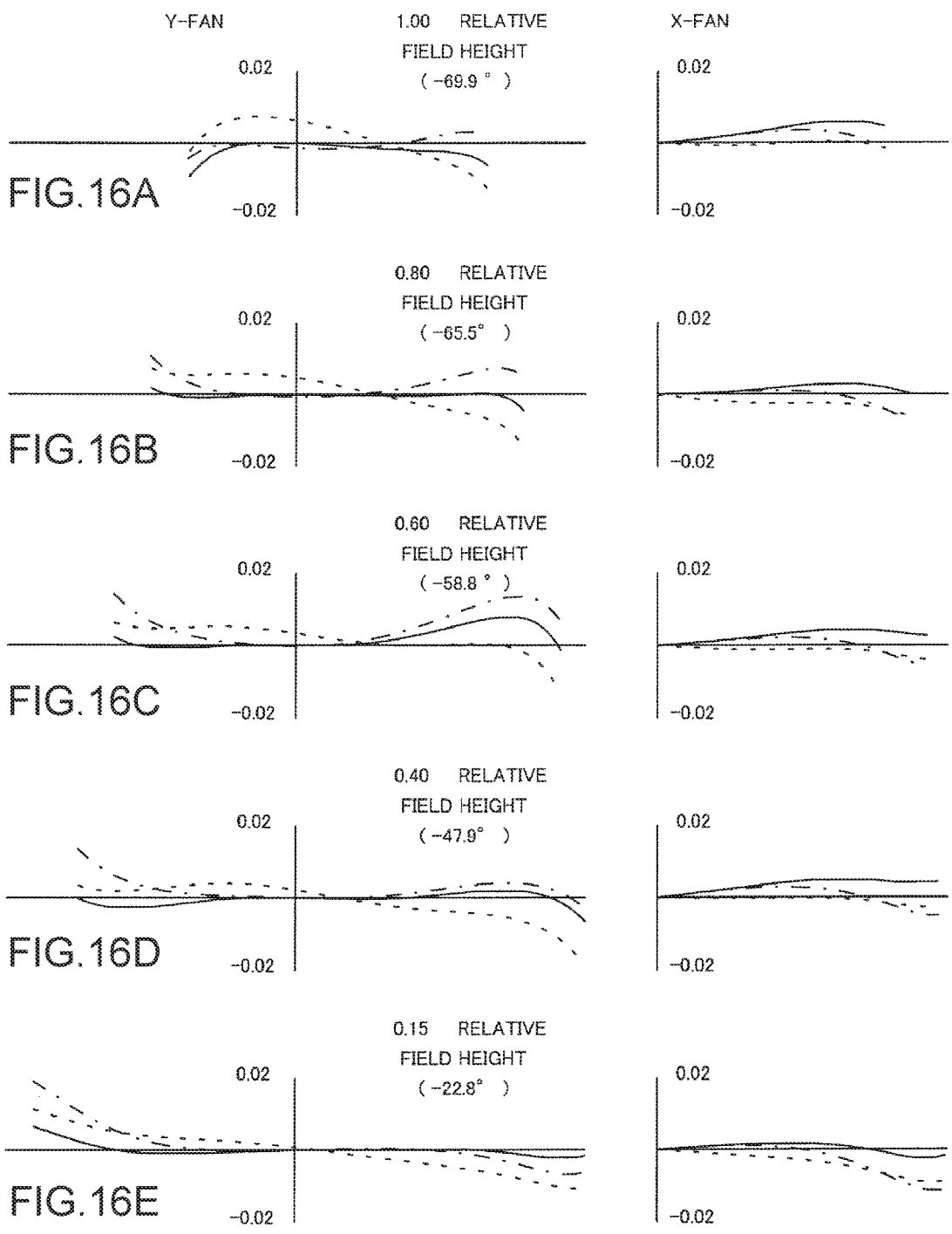

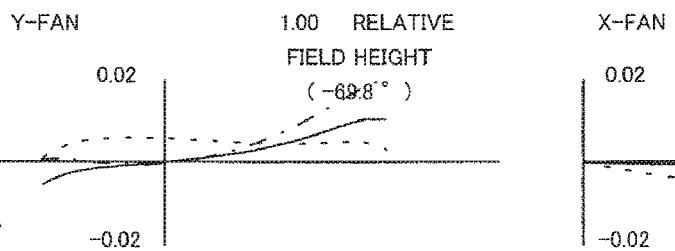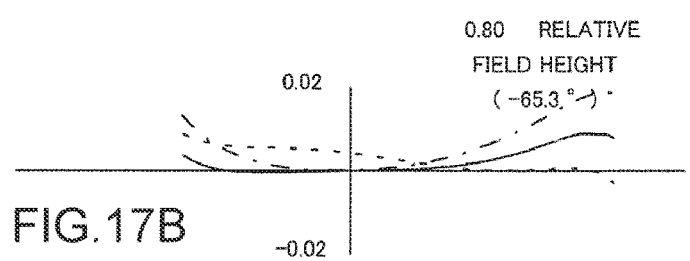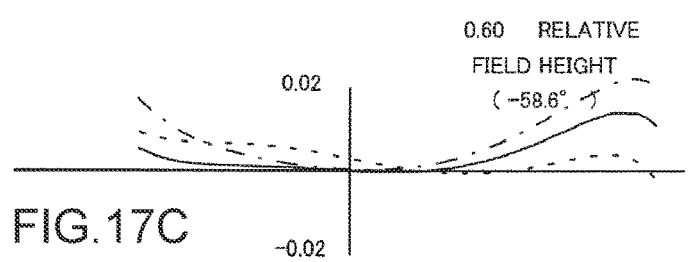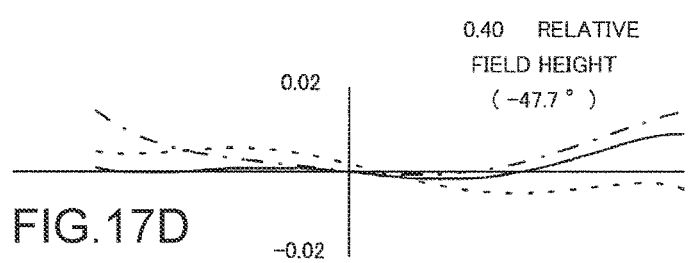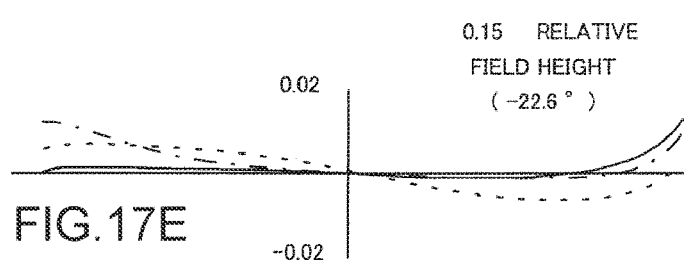

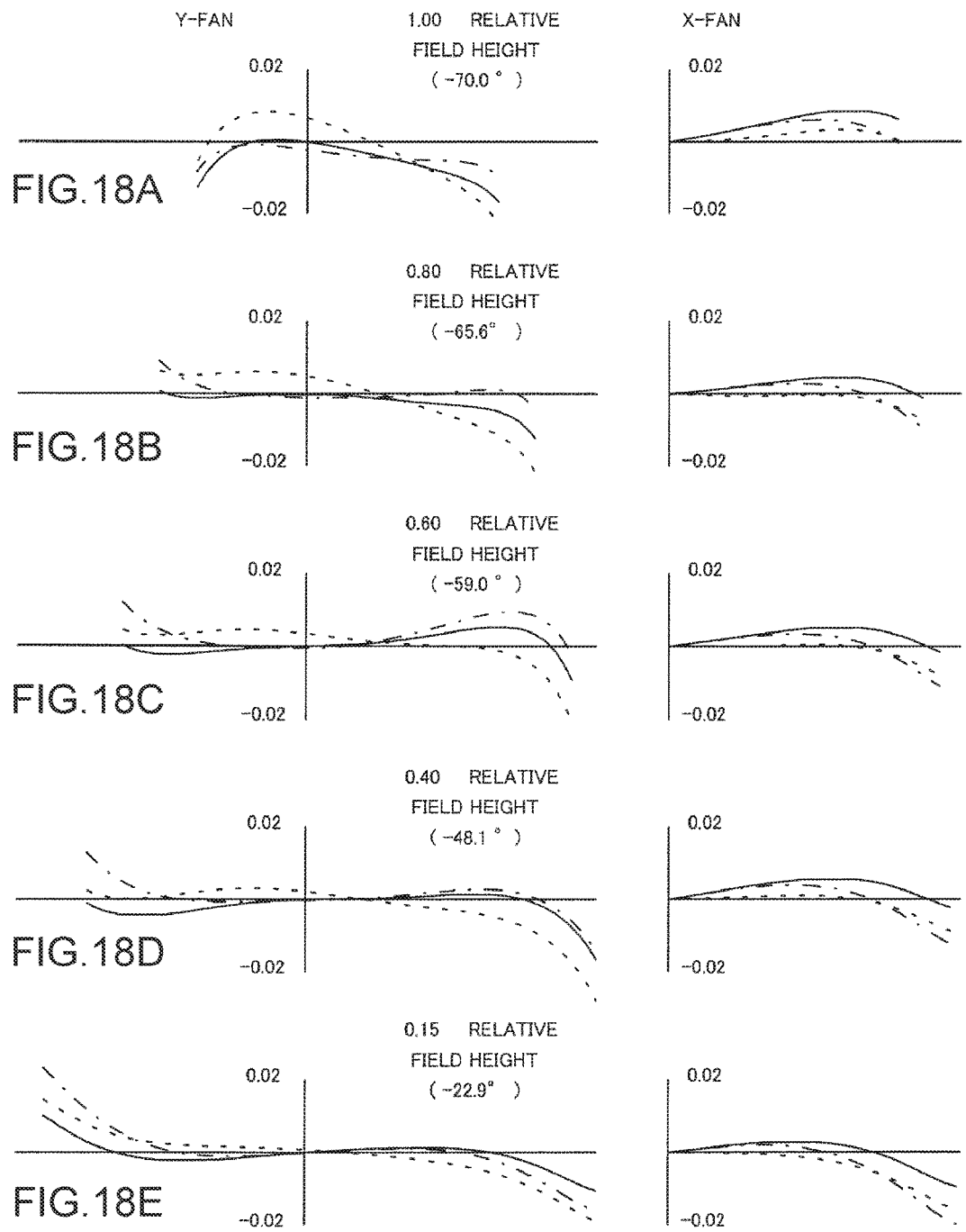

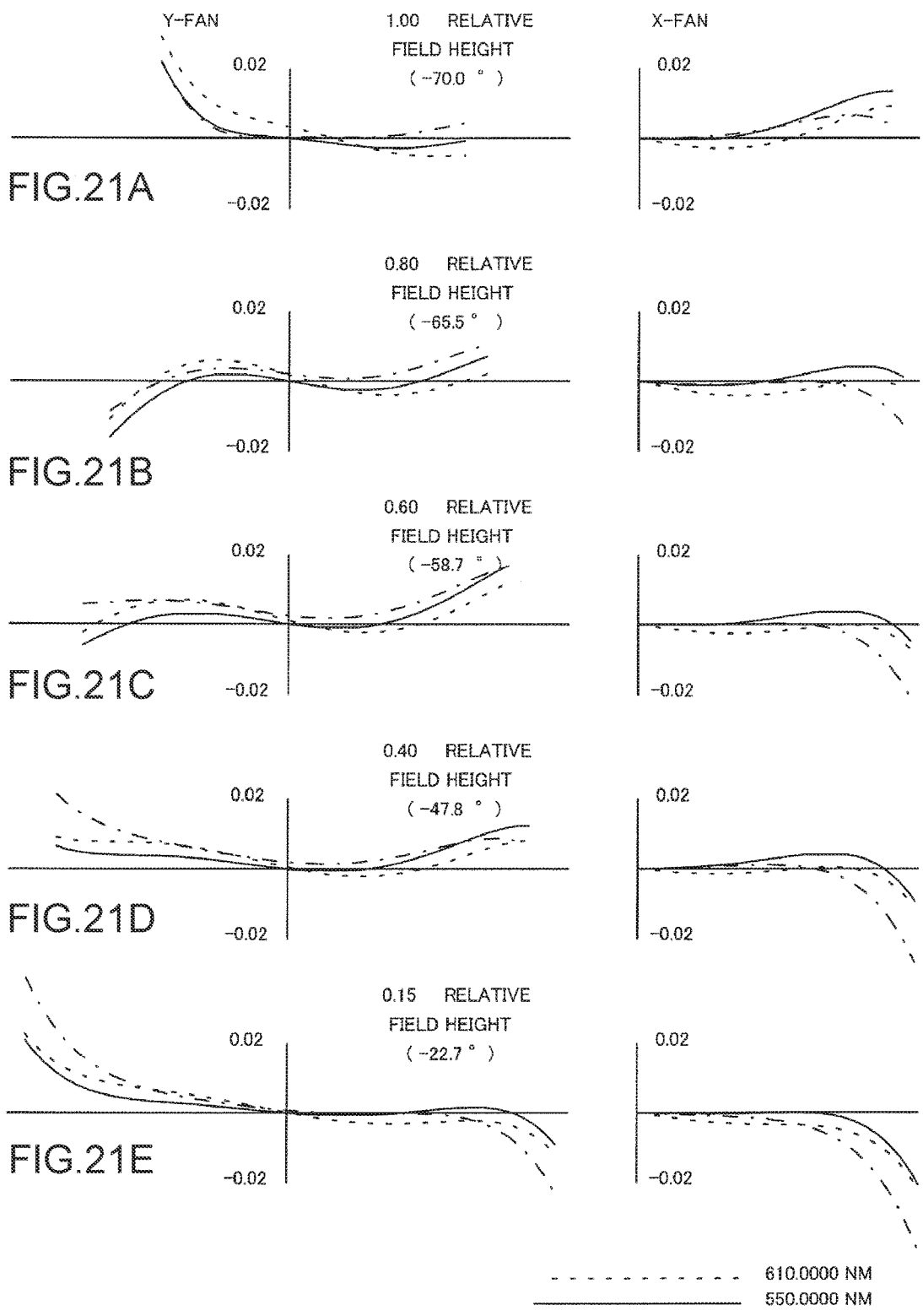

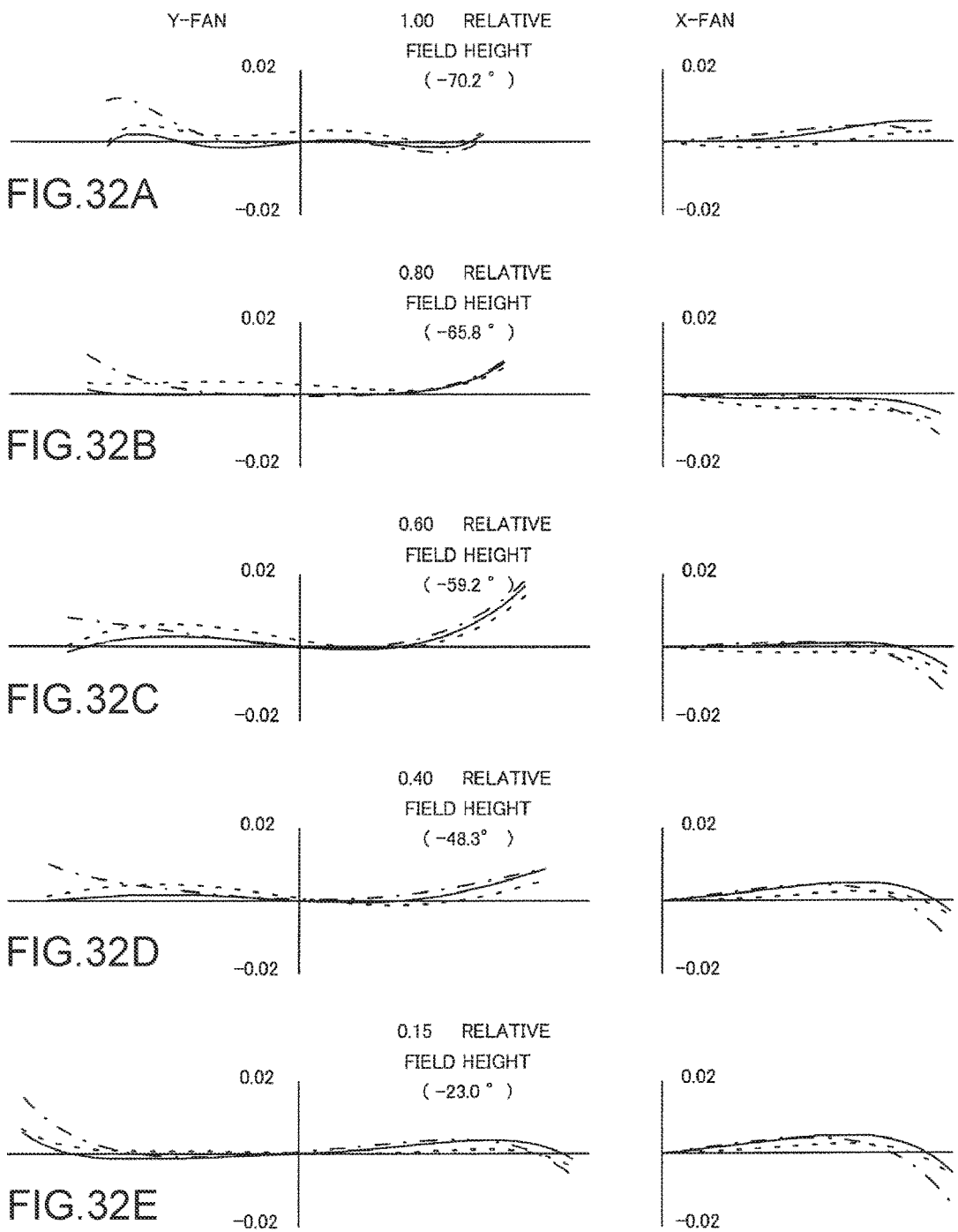

PROJECTION OPTICAL SYSTEM AND PROJECTOR

TECHNICAL FIELD

The present invention relates to a projection optical system appropriate for incorporation into a projector enlarging and projecting an image of an image display element and a projector using the projection optical system.

BACKGROUND ART

In recent years, it has been proposed to use, for example, dioptric systems and single aspherical reflection surfaces as projection optical systems for projectors capable of performing projection from a short distance to obtain a large screen (for example, see PTL 1 or the like).

However, for example, in PTL 1 (JP-A-2008-250296), a dioptric system includes an aspherical lens and a single aspherical reflection surface is used for reimaging. Therefore, there is a considerable burden on the dioptric system. For example, when an F number is brightened to correspond to a broad magnification range, there is a possibility that ten-odd lenses are necessary, for example, although a plurality of strong aspherical surfaces are included.

CITATION LIST

Patent Literature

PTL 1: JP-A-2008-250296

SUMMARY OF INVENTION

The invention was devised in view of the foregoing background and an object of the invention is to provide a projection optical system capable of performing compact and proximate projection and a projector including the projection optical system.

To achieve the foregoing object, a first projection optical system according to an aspect of the invention includes a dioptric system including a plurality of lenses and having positive powers and a catoptric system that are installed in order from a reduction side. The catoptric system includes first, second, and third catoptric systems installed in order from a side of the dioptric system along an optical path of light emitted from the dioptric system. The first catoptric system includes a first reflection surface that has a concave surface shape. The second catoptric system includes a second reflection surface that has a curved surface shape. The third catoptric system includes a third reflection surface that has a convex surface shape. At least two of the first, second, and third reflection surfaces have an aspherical shape. When f1 is a focal distance of the first catoptric system, f2 is a focal distance of the second catoptric system, and f3 is a focal distance of the third catoptric system, f1, f2, and f3 satisfy Conditional Expression (1) below.

$$|f2|>|f3|>|f1| \qquad (1)$$

The projection optical system includes the first to third catoptric systems that respectively include the first reflection surface with the concave surface shape, the second reflection surface with the curved surface shape, and the third reflection surface with the convex surface shape. The first to third catoptric systems satisfy Conditional Expression (1). Accordingly, the projection optical system is capable of performing compact and proximate projection. When $\phi1$, $\phi2$, and $\phi3$ are powers of the first to third catoptric systems, Conditional Expression (1) can also be notated as follows:

$$\phi2<\phi3<\phi1 \text{ (where } \phi k=|1/fk|\text{) (where } k=1, 2, \text{ and } 3),$$

where fk is a focal distance of each catoptric system indicated in Conditional Expression (1).

That is, the power of the second catoptric system is the weakest, the power of the first catoptric system is the strongest, and the power of the third catoptric system is intermediate.

According to a specific aspect of the invention, when F is a focal distance of the whole system and FL is a focal distance of the dioptric system, Conditional Expression (2) below may be satisfied.

$$0.05<F/FL<0.15 \qquad (2)$$

In this case, it is possible to miniaturize the whole apparatus while taking long back focus.

According to another specific aspect of the invention, all the plurality of lenses may be rotationally symmetric systems.

According to still another specific aspect of the invention, all surfaces of the plurality of lenses and the first to third catoptric systems may be configured with rotationally symmetric surfaces and may be coaxial optical systems with a same optical axis.

According to still another specific aspect of the invention, the plurality of lenses may include a light transmission reflection optical system that has a light transmission region functioning as a part of the dioptric system and a light reflection region functioning as the second reflection surface. In this case, it is possible to configure the part of the lens surface of the lens of the dioptric system and the reflection surface of the catoptric system as a sharing surface.

According to still another specific aspect of the invention, the light transmission reflection optical system may be disposed in a most enlargement side in the dioptric system and may be fixed in focusing at the time of magnification associated with a change in a projection distance.

According to still another specific aspect of the invention, the dioptric system may include at least one lens group moved at the time of magnification, may be configured to include a 1-1th lens group with a positive power and a 1-2th lens group with a positive power in order from the reduction side using a variable interval on a most reduction side as a boundary, and Conditional Expression (3) below may be satisfied when $F_{1-1}$ is a focal distance of the 1-1th lens group and $F_{1-2}$ is a focal distance of the 1-2th lens group.

$$0.0<|F_{1-1}/F_{1-2}|<1.0 \qquad (3)$$

In this case, it is possible to correct a curvature of image or a distortion aberration.

According to still another specific aspect of the invention, a numerical aperture on an object side may be equal to or greater than 0.27.

According to still another specific aspect of the invention, the reduction side may be substantially telecentric.

According to still another specific aspect of the invention, a magnification range may be 1.4 times or more.

To achieve the foregoing object, a second projection optical system according to an aspect of the invention includes a dioptric system including a plurality of lenses and having a positive power and a catoptric system having at least three reflection surfaces, the dioptric system and the catoptric system being installed in order from a reduction side. The plurality of lenses included in the dioptric system include a light transmission reflection optical system that has a light transmission region functioning as a part of the dioptric system and a light reflection region functioning as the reflection surface of the catoptric system.

In the projection optical system, the light transmission reflection optical system functions as a refractive lens and also functions as a reflection mirror, so that the projection optical system is capable of performing compact and proximate projection.

To achieve the foregoing object, a projector according to an aspect of the invention includes: a light source; a light modulation element that modulates light from the light source to form image light; and any the foregoing projection optical systems which project image light. The projector includes any of the foregoing projection optical systems, and thus is capable of performing compact and proximate projection.

BRIEF DESCRIPTION OF DRAWINGS

FIGS. 6(A) to 6(E) are lateral aberration views of the projection optical system corresponding to FIG. 5(A).

FIGS. 8(A) to 8(E) are lateral aberration views of the projection optical system corresponding to FIG. 5(C).

FIGS. 11(A) to 11(E) are lateral aberration views of the projection optical system corresponding to FIG. 10(A).

FIGS. 12(A) to 12(E) are lateral aberration views of the projection optical system corresponding to FIG. 10(B).

FIGS. 13(A) to 13(E) are lateral aberration views of the projection optical system corresponding to FIG. 10(C).

FIGS. 16(A) to 16(E) are lateral aberration views of the projection optical system corresponding to FIG. 15(A).

FIGS. 17(A) to 17(E) are lateral aberration views of the projection optical system corresponding to FIG. 15(B).

FIGS. 18(A) to 18(E) are lateral aberration views of the projection optical system corresponding to FIG. 15(C).

FIGS. 21(A) to 21(E) are lateral aberration views of the projection optical system corresponding to FIG. 20(A).

FIGS. 32(A) to 32(E) are lateral aberration views of the projection optical system corresponding to FIG. 31(A).

DESCRIPTION OF EMBODIMENTS

Hereinafter, a projection optical system according to an embodiment of the invention will be described in detail with reference to the drawings.

Figure 1:
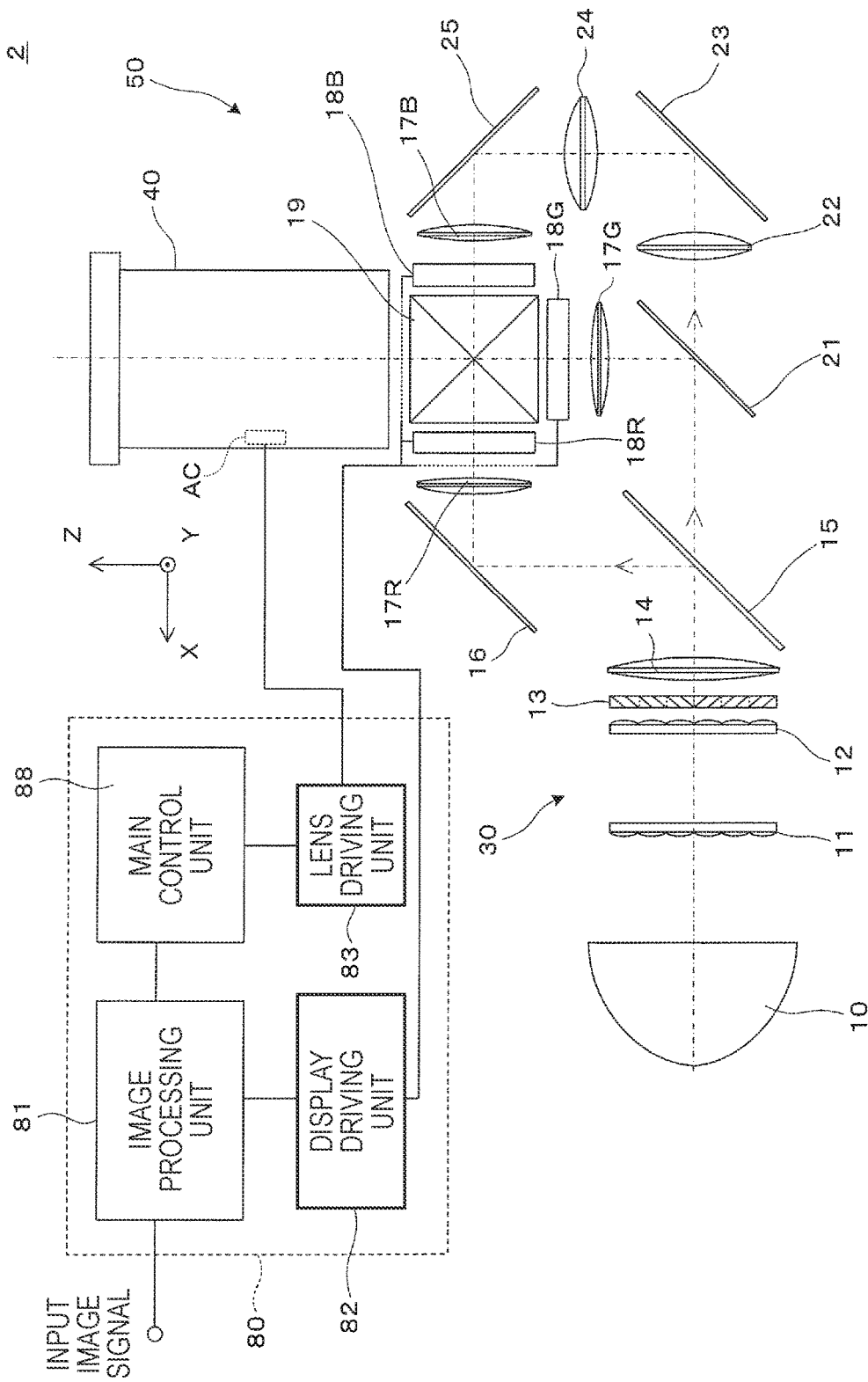
FIG. 1 is a diagram illustrating a schematic configuration of a projector in which a projection optical system according to an embodiment is incorporated.

As illustrated in FIG. 1, a projector 2 in which a projection optical system according to an embodiment of the invention is incorporated includes an optical system portion 50 that projects image light and a circuit device 80 that controls an operation of the optical system portion 50.

In the optical system portion 50, a light source 10 is, for example, an ultrahigh pressure mercury lamp and emits light including R light, G light, and B light. Here, the light source 10 may be a discharge light source other than an ultrahigh pressure mercury lamp or may be a solid-state light source such as an LED or a laser. A first integrator lens 11 and a second integrator lens 12 include a plurality of lens elements arrayed in an array form. The first integrator lens 11 segments a light flux from the light source 10 into a plurality of pieces. Each lens element of the first integrator lens 11 condenses the light flux from the light source 10 into a vicinity of the lens element of the second integrator lens 12. The lens elements of the second integrator lens 12 form an image of the lens elements of the first integrator lens 11 on liquid crystal panels 18R, 18G, and 18B in cooperation with a superimposition lens 14. In this configuration, the light from the light source 10 illuminates the entire display regions of the liquid crystal panels 18R, 18G, and 18B with substantially uniform brightness.

A polarization conversion element 13 converts the light from the second integrator lens 12 into predetermined linearly polarized light. The superimposition lens 14 superimposes images of the lens elements of the first integrator lens 11 on the display regions of the liquid crystal panels 18R, 18G, and 18B via the second integrator lens 12.

A first dichroic mirror 15 reflects the R light incident from the superimposition lens 14 and transmits the G light and the B light. The R light reflected by the first dichroic mirror 15 is incident on the liquid crystal panel 18R which is a light modulation element through a reflection mirror 16 and a field lens 17R. The liquid crystal panel 18R forms an R color image by modulating the R light in accordance with an image signal.

A second dichroic mirror 21 reflects the G light from the first dichroic mirror 15 and transmits the B light. The G light reflected by the second dichroic mirror 21 is incident on the liquid crystal panel 18G which is a light modulation element through a field lens 17G. The liquid crystal panel 18G forms G color image by modulating the G light in accordance with an image signal. The B light transmitted through the second dichroic mirror 21 is incident on the liquid crystal panel 18B which is a light modulation element through relay lenses 22 and 24, reflection mirrors 23 and 25, and a field lens 17B. The liquid crystal panel 18B forms a B color image by modulating the B light in accordance with an image signal.

A cross dichroic prism 19 is a light combination prism, combines the light modulated by the liquid crystal panels 18R, 18G, and 18B to form image light, and causes the image light to travel to a projection optical system 40.

The projection optical system 40 is a projection zoom lens that enlarges and projects the image light modulated by the liquid crystal panels 18G, 18R, and 18B and combined by the cross dichroic prism 19 to a screen (not illustrated).

The circuit device 80 includes an image processing unit 81 to which an external image signal such as a video signal is input, a display driving unit 82 that drives the liquid crystal panels 18G, 18R, and 18B provided in the optical system portion 50 based on an output of the image processing unit 81, a lens driving unit 83 that adjusts a state of the projection optical system 40 by operating a driving mechanism (not illustrated) provided in the projection optical system 40, and a main control unit 88 that generally controls operations of the circuit portions 81, 82, and 83.

The image processing unit 81 converts the input external image signal into an image signal including gradation of each color. The image processing unit 81 can perform various kinds of image processing such as distortion correction and color correction on the external image signal.

The display driving unit 82 operates the liquid crystal panels 18G, 18R, and 18B based on image signals output from the image processing unit 81 and can form images corresponding to the image signals or images corresponding to images subjected to the image processing on the liquid crystal panels 18G, 18R, and 18B.

The lens driving unit 83 operates under the control of the main control unit 88 and performs focusing (focusing at the time of magnification) associated with magnification in projection of an image on the screen by the projection optical system 40 by appropriately moving some of the optical elements included in the projection optical system 40 along an optical axis OA via an actuator AC. The lens driving unit 83 can also change a vertical position of an image to be projected to the screen by adjusting distortion to move the entire projection optical system 40 in the vertical direction vertical to the optical axis OA.

Figure 2:
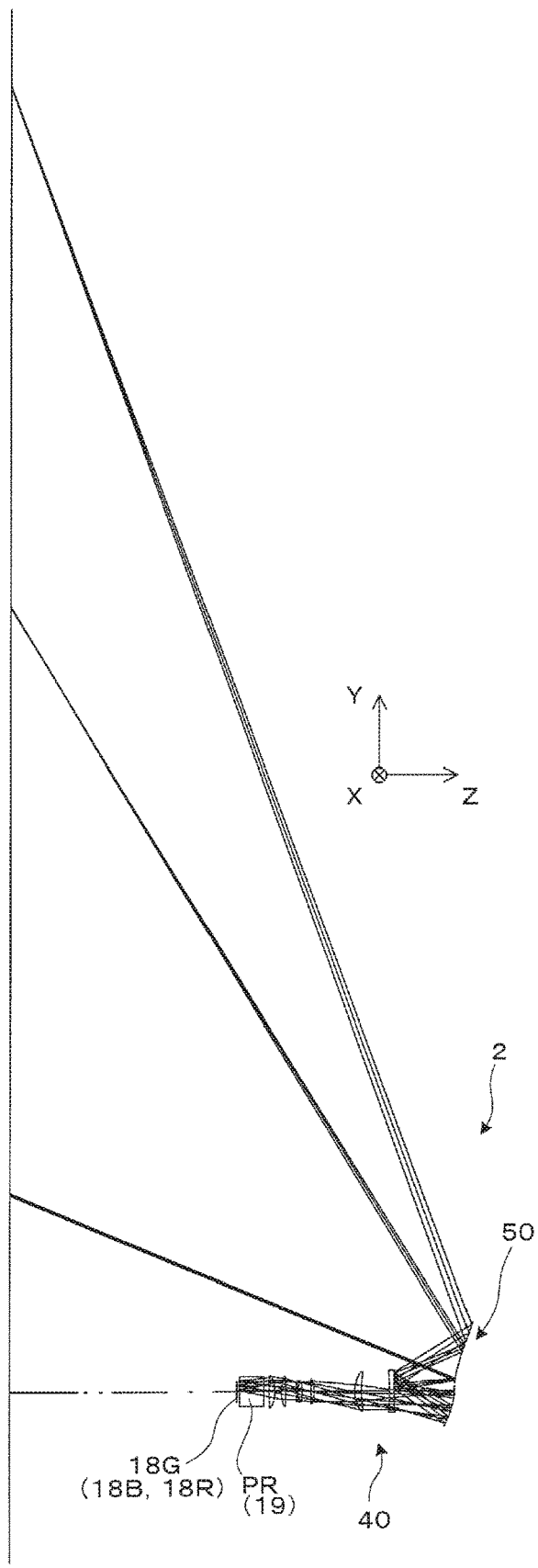
FIG. 2 is a diagram illustrating a configuration and light rays from an object surface to a projection surface in a projection optical system according to an embodiment or Example 1.
Figure 3:
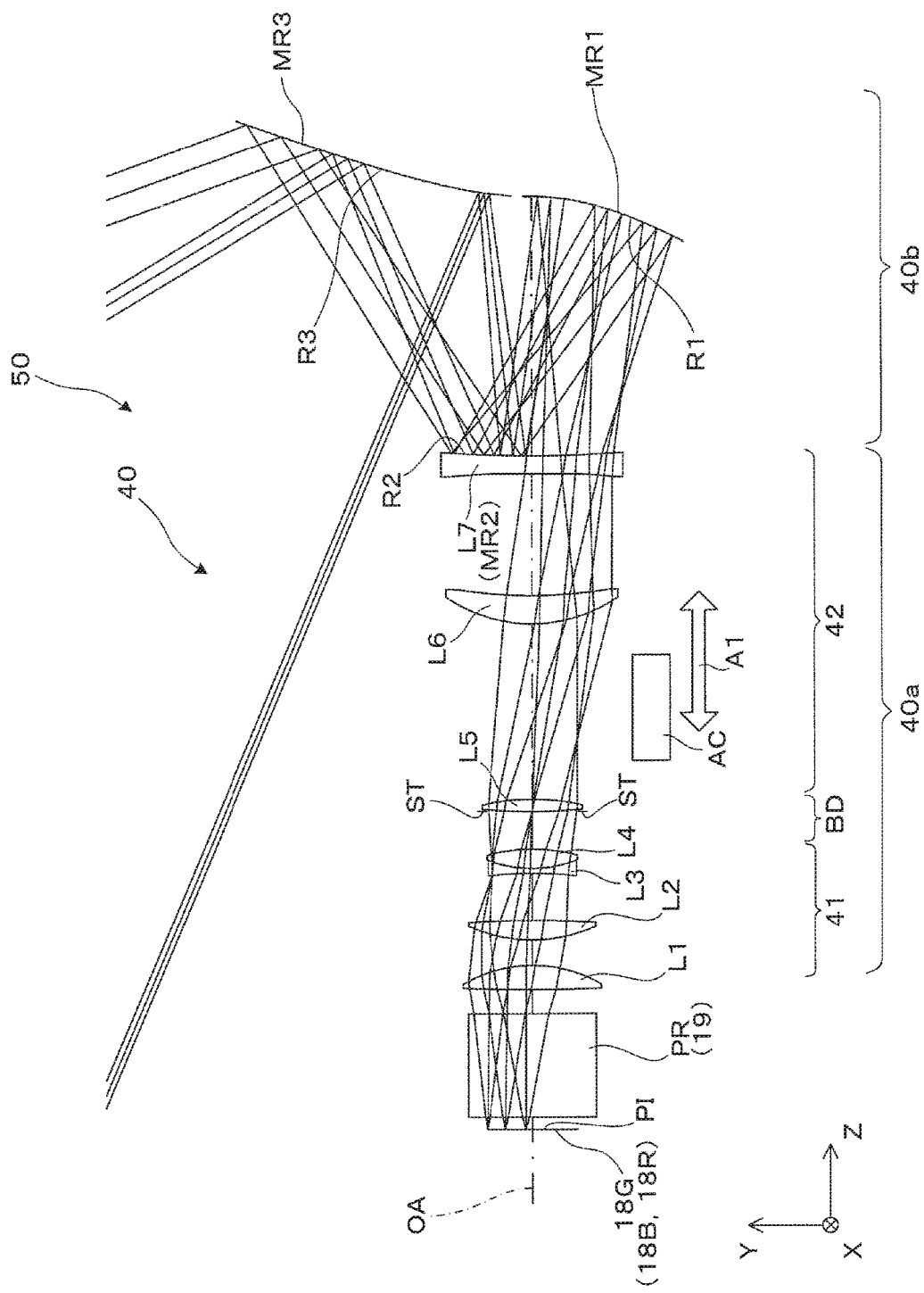
FIG. 3 is a partial enlarged diagram from the object surface to a concave reflection mirror in FIG. 2.

Hereinafter, the projection optical system 40 according to the embodiment will be described specifically with reference to FIGS. 2 and 3 and the like. The projection optical system 40 exemplified in FIG. 2 and the like has the same configuration as the projection optical system 40 according to Example 1 to be described below. For convenience, the +Y direction is assumed to be an upper direction and the −Y direction is assumed to be a lower direction.

The projection optical system 40 according to the embodiment projects an image formed by the liquid crystal panel 18G (18R, or 18B) to the screen (not illustrated). Here, a prism PR equivalent to the cross dichroic prism 19 in FIG. 1 is disposed between the projection optical system 40 and the liquid crystal panel 18G (18R, or 18B).

The projection optical system 40 includes a first optical group 40a which is a dioptric system that includes a plurality of lenses and has a positive power and a second optical group 40b which is a catoptric system that includes a plurality of mirrors and has reflection surfaces with various curved surface shapes in order from a reduction side.

The first optical group 40a is a dioptric system that includes a 1-1th lens group 41 that is disposed on the reduction side and has a positive power and a 1-2th lens group 42 that is disposed on an enlargement side and has a positive power weaker than the power of the 1-1th lens group 41, using a variable interval BD on the most reduction side among intervals variable by lens movement in a space formed between the included lenses as a boundary.

The second optical group 40b is a catoptric system that includes a first catoptric system MR1, a second catoptric system MR2, and a third catoptric system MR3 installed in order from the side of the first optical group 40a along an optical path of light emitted from the first optical group 40a.

Here, in the illustrated example, the first optical group 40a and the second optical group 40b share a partial element (a lens L7 or the second catoptric system MR2 is assumed to be shared). In other words, when the partial element is assumed to be the lens L7, the partial element functions as a part of the first optical group 40a which is a dioptric system. When the partial element is assumed to be the second catoptric system MR2, the partial element is a light transmission reflection optical system functions as a part of the second optical system 40b which is a catoptric system. Here, a lower region of the lens L7 (or the second catoptric system MR2) serves as a light transmission region that has a function of a lens (refractive lens) transmitting and reflecting light. On the other hand, an upper region of the second catoptric system MR2 (or the lens L7) serves as a light reflection region that has a function of a mirror (mirror lens) reflecting light. Accordingly, in the case illustrated in FIG. 1, when a light ray of the image light projected from the liquid crystal panel 18G (18R, or 18B) through the prism PR is emitted to the second optical group 40b through the first optical group 40a, the light ray passes through the lower side of the lens L7 (or the second catoptric system MR2) disposed on the most enlargement side of the first optical group 40a. After the light ray is reflected by the first catoptric system MR1 of the second optical group 40b, the light ray is incident on the second catoptric system MR2 (or the lens L7) again. At this time, the light ray is reflected toward the third catoptric system MR3 on the upper side of the second catoptric system MR2 (or the lens L7).

The first optical group 40a which is a dioptric system will be described in detail below.

In the first optical group 40a, the 1-1th lens group 41 includes an aperture stop ST and a lens group (lenses L1 to L4) closer to the reduction side than the aperture stop ST. The lenses L1 to L4 are fixed in focusing at the time of magnification associated with a change in a projection distance.

The 1-2th lens group 42 includes a lens group (lenses L5 to L7) disposed to be closer to the enlargement side than the aperture stop ST. Of the lenses, the lenses L5 and L6 form a focus group. The lenses L5 and L6 are each moved in a direction A1 (optical axis direction) along the optical axis OA by the actuator AC in focusing at the time of magnification associated with a change in a projection distance. Here, the lenses L5 and L6 are assumed to be independently movable. Thus, even in a broad magnification region, a primary image from which a finally good image can be obtained can be created. As a method of moving the lens by the actuator AC, various aspects can be realized according to aspects of focusing at the time of magnification. For example, the lenses may be moved completely independently or may be moved to interlock with each other using a cam mechanism or the like. On the other hand, the lens L7 (or the second catoptric system MR2) disposed on the most enlargement side in the first optical group 40a is fixed in the focusing at the time of magnification.

The lenses included in the first optical group 40a will be described below in sequence from the reduction side. As described above, the 1-1th lens group 41 is configured to include four lenses L1 to L4. The lenses L1 and L2 are positive lenses and the lenses L3 and L4 are cemented lenses. As described above, the 1-2th lens group 42 is configured to include three lenses L5 to L7. The lens L5 is a positive lens, the lens L6 is a positive meniscus lens, and the L7 is a double-sided aspherical negative lens. That is, the first optical group 40a is configured to include seven lenses L1 to L7 as a whole. The lenses L1 to L7 have a circular shape which is axially symmetric with respect to the optical axis OA. In other words, the plurality of lenses L1 to L7 included in the first optical group 40a which is a dioptric system are all rotationally symmetric systems. The lenses are all spherical lenses made of glass except for the lens L7. The lens L7 is a double-sided aspherical lens and is preferably a resin lens in terms of inexpensive cost since a lens diameter is relatively large. However, the lens L7 has a circular shape which is axially symmetric and may also be a glass aspherical lens in which it is easy to ensure precision since a part of the lens is used as a reflection surface.

The second optical group 40b will be described in detail below.

In the second optical group 40b, the first catoptric system MR1 includes a first reflection surface R1 that is disposed on an emission side (enlargement side) of the first optical group 40a, that is, the most reduction side in the second optical group 40b, and has a concave surface shape. The first catoptric system MR1 emits the light ray emitted from the first optical group 40a toward the second catoptric system MR2 by reflecting the light ray from the first reflection surface R1.

The second catoptric system MR2 includes a second reflection surface R2 that is disposed on the enlargement side of the first catoptric system MR1 along the optical path and has a curved surface shape. Here, as described above, the second catoptric system MR2 (or the lens L7) includes a second reflection surface R2 by forming a light reflection region in a part which is not used as a refractive lens in the lens L7 included in the first optical group 40a. As described above, in association with the lens which is a target in which the second reflection surface R2 is formed and which is a negative lens with a double-sided aspherical surface, the second reflection surface R2 which is a partial surface is an aspherical surface. From another viewpoint, the second catoptric system MR2 is an aspherical mirror. The second catoptric system MR2 emits the light ray emitted from the first catoptric system MR1 toward the third catoptric system MR3 by reflecting the light ray from the second reflection surface R2.

The third catoptric system MR3 includes a third reflection surface R3 that is disposed on the enlargement side of the second catoptric system MR2, that is, the most enlargement side, along the optical path and has a convex surface shape. The third catoptric system MR3 emits the light ray emitted from the second catoptric system MR2 toward the screen which a radiation surface by reflecting the light ray from the third reflection surface R3.

Hereinafter, characteristics of the mirrors (the catoptric systems MR1 to MR3) included in the second optical group 40b will be described. First, all the reflection surfaces R1 to R3 of the first catoptric system MR1 to the third catoptric system MR3 have aspherical shapes, are formed as rotationally symmetric surfaces, and have the same optical axis.

When f1 is a focal distance of the first catoptric system MR1, f2 is a focal distance of the second catoptric system MR2, and f3 is a focal distance of the third catoptric system MR3, f1, f2, and f3 satisfy Conditional Expression (1) below.

$$|f2|>|f3|>|f1| \quad (1)$$

In the foregoing requisites, when φ1, φ2, and φ3 are powers of the first catoptric system MR1 to the third catoptric system MR3, Conditional Expression (1) can also be notated as follows:

$$\varphi 2<\varphi 3<\varphi 1 \text{ (where } \varphi k=|1/fk|) \text{ (where } k=1, 2, \text{ and } 3),$$

where fk is a focal distance of each catoptric system indicated in Conditional Expression (1).

Conditional Expression (1) is a condition for the focal distances f1, f2, and f3 of the three reflection surfaces R1 to R3 and a condition for miniaturizing the second optical group 40b and forming a primary image including an aberration made in the first optical group 40a on the screen as a secondary image, which is obtained by efficiently sufficiently correcting the aberration, by appropriately setting the powers φ1, φ2, and φ3 of the reflection surfaces R1 to R3. When an absolute value of the focal distance f1 of the first reflection surface R1 is greater than an absolute value of the focal distance f3 of the third reflection surface R3, that is, the positive power is considerably weakened, the size of the first reflection surface R1 is increased and the size of the second reflection surface R2 is increases, which is not desirable from the viewpoint of miniaturization. In contrast, by setting the first reflection surface R1 as a surface with a stronger power than the other two reflection surfaces R2 and R3, the position of a light flux incident on the second reflection surface R2 can be set to a low position, and thus it is possible to miniaturize the first reflection surface R2 and the second reflection surface R3.

For example, by causing an absolute value of the focal distance f2 of the second reflection surface R2 to be greater than the absolute value of the focal distance f1 of the reflection surface R1 and the absolute value of the focal distance f3 of the reflection surface R3, that is, setting a surface with a weak power, it is possible to set the positive power of the first reflection surface R1 and the negative power of the third reflection surface R3 in good balance. Thus, it is possible to correct various aberrations in good balance. By weakening the power of the second reflection surface R2, a part of a lens surface of the lens (the lens L7) of the foregoing first optical group 40a (the dioptric system) and the reflection surface (the second reflection surface R2) can be configured as a sharing surface.

In the case of the foregoing projection optical system 40, all the surfaces of the plurality of lenses L1 to L7 included in the first optical group 40a (the dioptric system) and all the surfaces of the first catoptric system MR1 to the third catoptric system MR3 included in the second optical group 40b (the catoptric system) are configured as rotationally symmetric surfaces and consequently form a coaxial optical system that has the same optical axis.

In the projection optical system 40 with the foregoing configuration, when F is a focal distance of the whole system and FL is a focal distance of the first optical group 40a (the dioptric system), the projection optical system 40 satisfies Conditional Expression (2) below.

$$0.05 < F/FL < 0.15 \quad (2)$$

Conditional Expression (2) is a condition for a ratio of the focal distance of the whole system to the focal distance of the first lens group and is a condition for miniaturizing the whole apparatus while taking long back focus.

In such a kind of super-wide angle projection optical system, in order to obtain long back focus for inserting a color combination prism PR or the like in which a focus distance is very short, it is necessary to lengthen the focal distance of the first optical group 40a (the dioptric system) that plays a role in creating a primary image.

When the focal distance of the first optical group 40a is considerably shortened beyond the upper limit of Conditional Expression (2), it is difficult to correct various aberrations, and it is accordingly necessary to increase the number of lenses, which is undesirable. It is difficult to ensure necessary back focus. In contrast, when the focal distance of the first optical group 40a is considerably lengthened beyond the lower limit of Conditional Expression (2), it is easy to correct aberrations. However, the whole length of the lenses is lengthened, which is undesirable in terms of miniaturization. By satisfying Conditional Expression (2), it is possible to miniaturize the whole apparatus while taking long back focus.

Further, when $F_{1-1}$ is a focal distance of the 1-1th lens group 41 and $F_{1-2}$ is a focal distance of the 1-2th lens group 42, the projection optical system 40 satisfies Conditional Expression (3) below.

$$0.0 < |F_{1-1}/F_{1-2}| < 1.0 \quad (3)$$

Since the super-wide angle projection optical system according to the embodiment has a considerably wide angle of view, a change amount of aberration in accordance with a projection distance is considerably larger than a general projection optical system (a projection optical system of about a half angle of view of 30°). When a projection distance is changed, a focal distance is very short. Therefore, a curvature of image or a distortion aberration in a screen circumference portion at a high-image high-position is considerably changed compared to a small focal change at a low-image high-position. Accordingly, in the projection optical system according to the embodiment, a change in the curvature of image or the change in the distortion in the screen circumference portion is corrected in focusing association with magnification. Conditional Expression (3) can be said to be a condition for a ratio of a focal distance of a fixed group to a focal distance of a moved group at the time of focus in the first optical group 40a and is a condition for performing focusing with a simple configuration. By increasing a focal distance of the focus group and decreasing power, it is possible to reduce a focus change in the low-image high-position and correct the curvature of image or the distortion aberration at the high-image high-position.

When the focal distance of the focus group is shortened beyond the upper limit of Conditional Expression (3) and power is considerably strengthened, a movement amount for correcting the curvature of image or the distortion of the circumferential portion is considerably increased in the focusing, which is undesirable. In contrast, when the power of the focus group is considerably weakened beyond the lower limit of Conditional Expression (3), a focal position near an optical axis is also moved at the time of moving the lens group. Thus, it is necessary to move the plurality of lens groups with high precision in order to match the focal positions at the low-image high-position and the high-image high-position, and thus it is difficult to ensure a frame configuration, which is undesirable. By satisfying Conditional Expression (3), it is possible to perform correction so that the curvature of image or the distortion aberration is sufficiently suppressed in focusing association with magnification.

As described above, the lenses L1 to L7 included in the first optical group 40a have a circular shape which is axially symmetric with respect to the optical axis OA. The lens L7 on the enlargement side which is most likely to increase is also circular. Thus, it is possible to suppress an error during manufacturing as much as possible. All the lenses L1 to L7 can be set to have the circular shape. As a comparative example, for example, when a projection optical system in which the second optical group 40b is configured to include one concave mirror is considered, a light flux reflected from the concave mirror interferes in the dioptric system in the projection optical system. Therefore, there is a possibility of the lens disposed on the mirror side (the lens on the most enlargement side in the first optical group 40a) being necessarily cut in a noncircular shape. When the lens is formed in the noncircular shape, a mirror frame structure that accommodates the lens is complicated, and thus cost may increase. In the embodiment, however, a part of the lens surface of the lens L7 located on the most enlargement side functions as a reflection surface. Thus, it is possible to have a general lens mirror frame structure in which all the lenses L1 to L7 have the circular shape, and thus it is possible to achieve low cost and an improvement in precision simultaneously.

As illustrated, the reduction side is substantially telecentric in the projection optical system 40. Thus, for example, as described above, in a case in which light modulated in the liquid crystal panels 18R, 18G, and 18B in the cross dichroic prism 19 are combined to form image light, a variation in assembly can be easily absorbed.

In a proximate projection optical system, a distance to a screen is generally very close. In the projection optical system 40, proximate projection is performed by temporarily forming an image formed on a panel surface PI of the liquid crystal panel 18G (18R, or 18B) in front of a mirror of the second optical group 40b by the first optical group 40a and forming the image on the screen again by the second optical group 40b. That is, the first optical group 40a creates a primary image (intermediate image) before the second optical group 40b. In the foregoing proximate projection optical system, a change in an aberration at the time of magnification is relatively large. Therefore, there is a possibility of a magnification range not being largely taken. Accordingly, it is desirable to optimize the primary image formed by the first optical group 40a so that a good image can be obtained even when a projection magnification is changed. In a general proximate projection optical system, a reduction in contrast is large due to a change in a curvature of image or astigmatism. There is a high tendency that a change in a distortion aberration at the time of magnification is also larger than a general lens system.

However, in the projection optical system 40 according to the embodiment, as described above, when the primary image created by the first optical group 40a is formed again by the second optical group 40b, the power of each optical element can be reduced by providing three mirrors (the catoptric systems MR1 to MR3) in which no chromatic aberration occurs in the configuration of the second optical group 40b to reduce occurrence of a chromatic aberration in the whole optical system as much as possible and reflecting light a plurality of times to lengthen an actual optical path length. As a result, it is possible to reduce a burden on the first optical group 40a. Accordingly, even when no lens with a strong aspherical surface is used, the projection optical system corresponding to a broad magnification range can be configured by reducing the number of the configuration of the first optical group 40a, and thus it is possible to achieve low cost and compactness.

In the embodiment, the number of mirrors included in the second optical group 40b can be set to be odd. In this case, by configuring projected light to return to the light source side, that is, disposing a screen on the light source side at the time of proximate projection, an arm for installing a projector on a wall surface can be shortened and a strength can be reduced in installation of the projector compared to a scheme in which a general reflection mirror is not used or a case of repetition with an even number of reflection mirrors.

Further, by realizing the foregoing configuration, it is possible to ensure a high magnification range of 1.4 times or more (or 1.5 times or more or 1.6 times or more) while setting a numerical aperture on the object side to be 0.27 or more, that is, causing an F number to have brightness of about 1.8, and thus it is possible to have performance sufficiently corresponding to even an image display element with high resolution.

As another idea of the invention of the present specification, an aspherical lens formed of a resin can also be considered to be applied to a dioptric system. However, the aspherical lens formed of a resin has to be formed so that both surfaces are formed with high precision. When a ratio of the thickness of a central portion to the thickness of a circumferential portion, that is, a thickness deviation ratio is large, an internal distortion easily occurs at the time of forming the aspherical lens. In particular, in a case in which an aspherical surface is used for a large lens, a shape target limitation occurs from the viewpoint of manufacturing. Compared to an aspherical lens, only a single-side is formed in a case in which the aspherical mirror is formed of a resin. Since an influence of an internal distortion is small by using surface reflection and a mirror thickness can be set to a uniform thickness with which the forming is easy, precision is more easily realized than that of the aspherical lens. As still another idea, the projection optical system can also be considered to be configured with only mirrors. However, in case of depending on only reflection, a problem of interference of a reflection optical path and a reflection surface easily occurs. When a free curved mirror or an eccentric element is contained to resolve this problem, manufacturing is considerably difficult. In the embodiment, the configuration can be compact with high precision while relatively facilitating manufacturing.

EXAMPLES

Hereinafter, specific examples of the projection optical system 40 will be described. Meanings of factors common to Examples 1 to 4 to be described below are summarized below:

f a focal distance of the whole system;
ω a half angle of view;
NA a numerical aperture;
R a radius of curvature;
D an axial surface interval (a lens thickness or a lens interval);
Nd an index of refraction of a d-line; and
Vd an Abbe number of a d-line.

An aspherical surface is specified by a polynomial (aspherical surface expression) below:

$$z = \frac{ch^2}{1+\sqrt{1-(k+1)c^2h^2}} + A_4h^4 + A_6h^6 + A_8h^8 + A_{10}h^{10} + A_{12}h^{12}$$

where
c: a curvature (1/R);
h: a height from an optical axis:
k: a conical coefficient of an aspherical surface; and
Ai: a high-order aspherical surface coefficient of an aspherical surface.

OBJ means the panel surface PI, STO means an aperture stop ST, and IMG means an image surface (projection surface) of the screen. A surface notated with "*" before a surface number is a surface that has an aspherical shape.

Example 1

Data of lens surfaces in Example 1 is shown in Table 1 below.

TABLE 1 f 4.002
ω 69.9°
NA 0.278

| | R | D | Nd | Vd |
|---|---|---|---|---|
| OBJ | Infinity | 3.000 | — | — |
| 1 | Infinity | 25.750 | 1.51633 | 64.14 |
| 2 | Infinity | 6.000 | — | — |
| 3 | 500.000 | 6.000 | 1.48749 | 70.24 |
| 4 | −33.595 | 6.437 | — | — |
| 5 | 38.183 | 5.000 | 1.48749 | 70.24 |
| 6 | −231.380 | 11.756 | — | — |
| 7 | −89.984 | 1.200 | 1.83400 | 37.16 |
| 8 | 30.366 | 4.800 | 1.48749 | 70.24 |
| 9 | −42.809 | Variable interval | — | — |
| STO | Infinity | 0.000 | — | — |
| 11 | 154.620 | 3.000 | 1.48749 | 70.24 |
| 12 | −54.531 | Variable interval | — | — |
| 13 | 37.909 | 7.000 | 1.48749 | 70.24 |
| 14 | 121.783 | Variable interval | — | — |
| *15 | −2040.867 | 4.500 | 1.53116 | 56.04 |
| *16 | 259.706 | 65.000 | — | — |
| *17 | −54.241 | −65.000 | — | Reflection surface |
| *18 | 259.706 | 65.000 | — | Reflection surface |
| *19 | 76.677 | Variable interval | — | Reflection surface |
| IMG | Infinity | — | — | — |

In Table 1 above and tables below, a power of 10 (for example, $1.00 \times 10^{+18}$) is assumed to be expressed using E (for example, 1.00E+18).

Table 2 below shows aspherical surface coefficients of the lens surfaces in Example 1.

TABLE 2

| | Aspherical surface coefficient | | | | |
|---|---|---|---|---|---|
| K | A04 | A06 | A08 | A10 | A12 |
| 15 | 0.000 | −3.5564E−06 | 2.2000E−09 | −8.3247E−12 | 2.1223E−15 | 0.0000E+00 |
| 16 | −53.570 | 2.8784E−08 | 1.6122E−11 | 0.0000E+00 | 0.0000E+00 | 0.0000E+00 |
| 17 | 0.530 | 2.2300E−06 | −1.4861E−11 | 5.6323E−13 | −3.3721E−16 | 1.5459E−19 |
| 18 | −53.570 | 2.8784E−08 | 1.6122E−11 | 0.0000E+00 | 0.0000E+00 | 0.0000E+00 |
| 19 | −7.265 | −2.6013E−08 | 1.2573E−12 | 0.0000E+00 | 0.0000E+00 | 0.0000E+00 |

Table 3 below shows values of variable intervals 9, 12, 14, and 19 in Table 1 in a projection magnification of 126 times, a projection magnification of 162 times, and a projection magnification of 110 times.

TABLE 3

| | Variable interval | | |
|---|---|---|---|
| | 126x | 162x | 110x |
| 9 | 9.334 | 11.486 | 7.885 |
| 12 | 43.758 | 42.278 | 44.052 |
| 14 | 30.200 | 29.187 | 31.014 |
| 19 | −475.000 | −639.126 | −405.207 |

Figure 4:
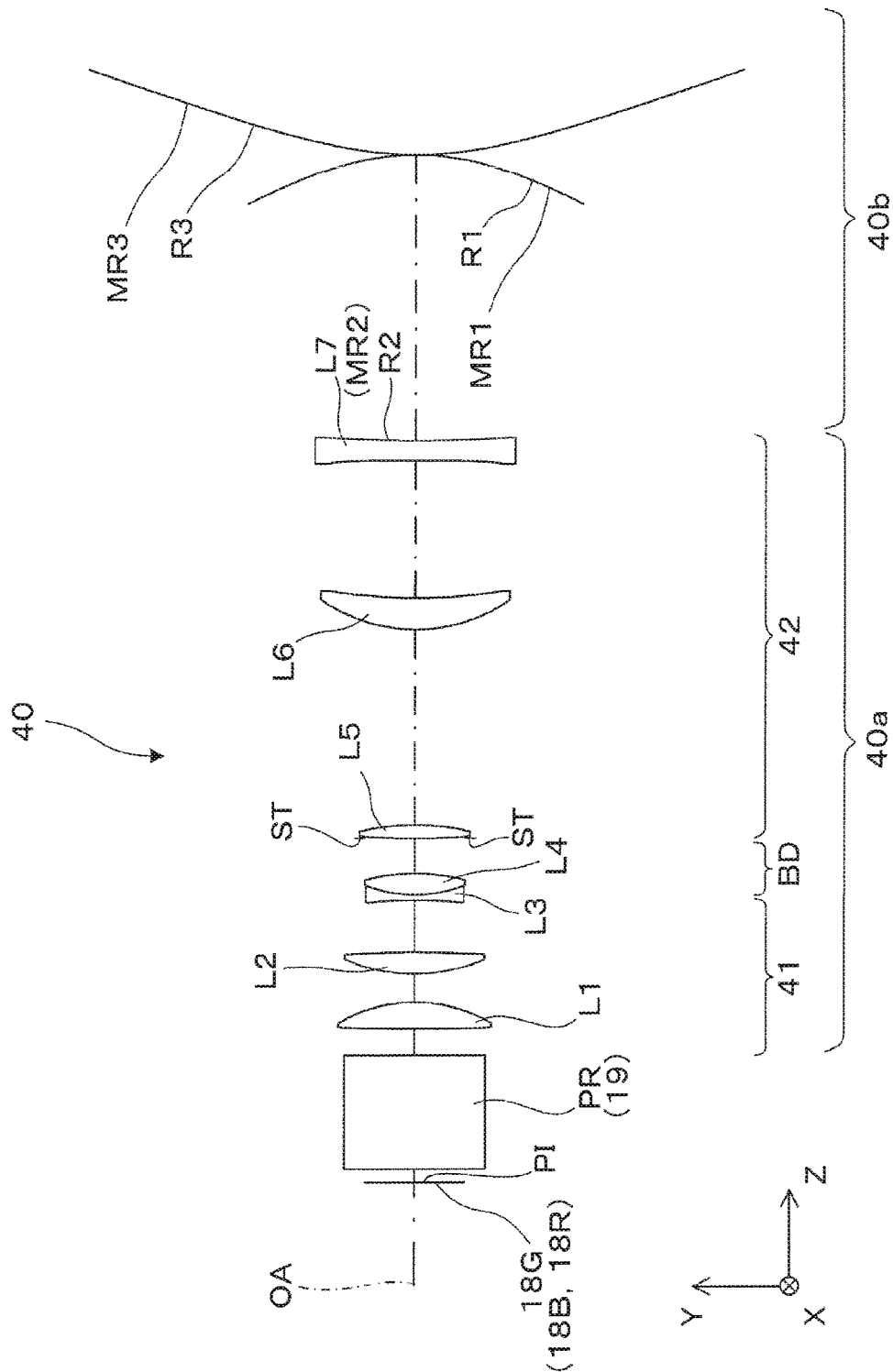
FIG. 4 is a diagram illustrating the configuration of a projection optical system according to Example 1.

FIG. 4 is a sectional view illustrating a projection optical system 40 according to Example 1. The projection optical system 40 in FIG. 4 is equivalent to the projection optical system 40 according to Embodiment 1. In FIG. 4, the projection optical system 40 enlarges and projects an image on the panel surface PI at a magnifying factor according to a distance to the screen. In the projection optical system 40, the first optical group 40a includes seven lenses L1 to L7, the lenses L1 to L4 included in the 1-1th lens group 41 and the lenses L5 to L7 included in the 1-2th lens group 42, in order from the reduction side. The second optical group 40b includes three aspherical mirrors, the first catoptric system MR1 to the third catoptric system MR3. The aspherical mirrors other than the second catoptric system MR2 are drawn without being notched in FIG. 4. However, in an actual optical system, the aspherical mirror has a shape partially notched from a circular shape (see FIG. 3).

Optical elements will be described in detail in an optical path order. The first optical group 40a which is a dioptric system includes seven lenses, a positive first lens (lens L1) with a biconvex shape, a positive second lens (lens L2) with a biconvex shape, a cemented lens of a negative third lens (lens L3) with a biconcave shape and a positive fourth lens (lens L4) with a biconvex shape, an aperture stop ST, a fifth lens (lens L5) with a biconvex shape, a positive sixth lens (lens L6) with a meniscus shape of a convex surface facing the reduction side, and a negative seventh lens (lens L7) of which both surfaces are aspherical in biconcave shape, in order from the reduction side. A pencil of rays emitted from the first optical group 40a is formed as a primary image between the first catoptric system MR1 of the second optical group 40b and the first optical group 40a, and is subsequently reflected from the aspherical concave reflection surface R1 of the first catoptric system MR1. The pencil of rays reflected from the first catoptric system MR1 returns to the side of the first optical group 40a and is reflected from an aspherical concave reflection surface R2 of the second catoptric system MR2 installed in the upper half portion of the lens surface of the seventh lens (lens L7) disposed on the most enlargement side of the first optical group 40a. A refraction surface of the first optical group 40a on the most enlargement side and the reflection surface R2 of the second catoptric system MR2 are formed in the same surface shape such that the substantial half is formed as a transmission surface and the remaining half is formed as a reflection surface with an optical axis OA interposed therebetween. The pencil of rays reflected from the second catoptric system MR2 is reflected from an aspherical convex reflection surface R3 of the third catoptric system MR3 to be formed as an image on the screen.

In a case in which a projection distance is changed to be magnified, focus is performed by moving the fifth lens (lens L5) and the sixth lens (lens L6) in the 1-2th lens group 42 by floating. The seventh lens (lens L7) which is used as the second catoptric system MR2 and is on the most enlargement side is fixed. The 1-1th lens group 41 and the second optical group 40b are fixed.

Figure 5A:
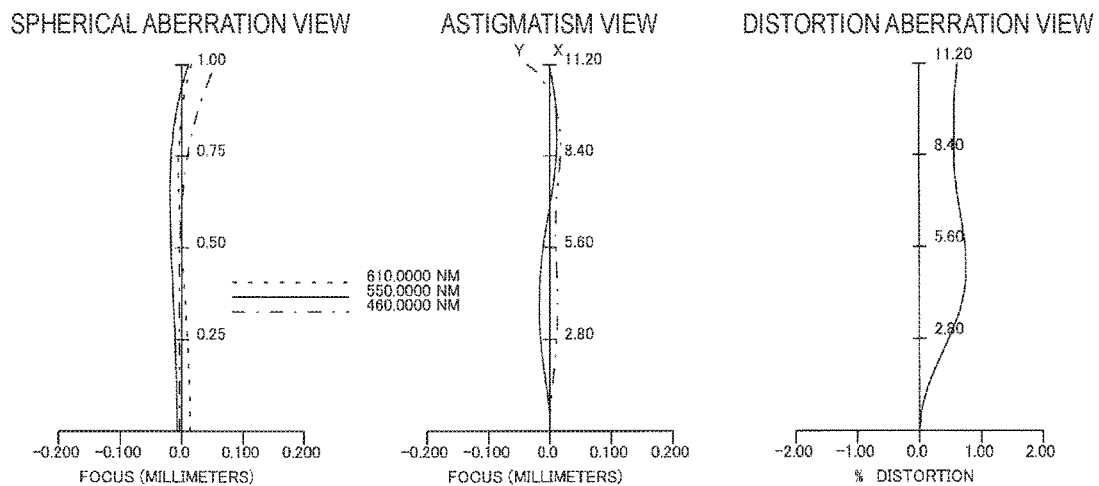
FIGS. 5(A) to 5(C) are reduction-side aberration views of the projection optical system according to Example 1.
Figure 5B:
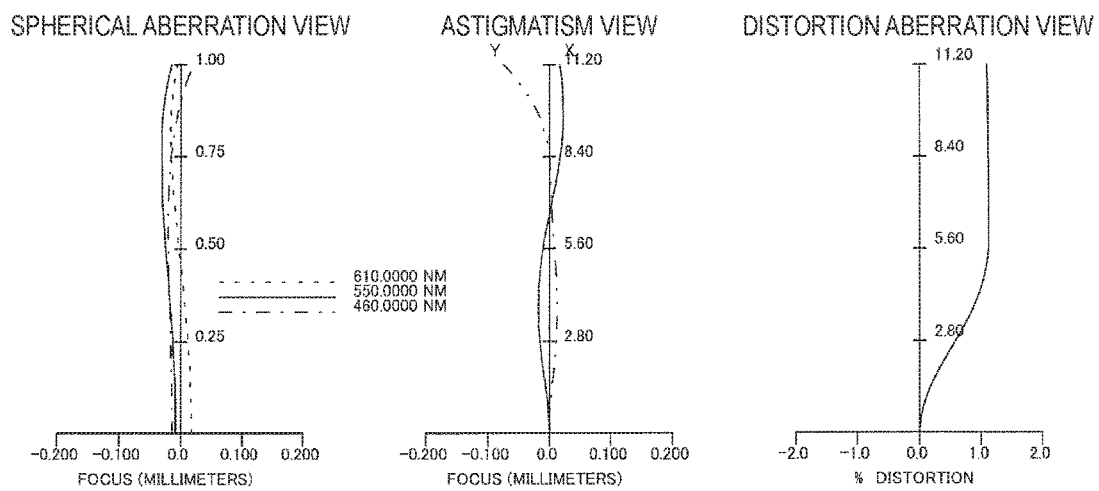
Figure 5C:
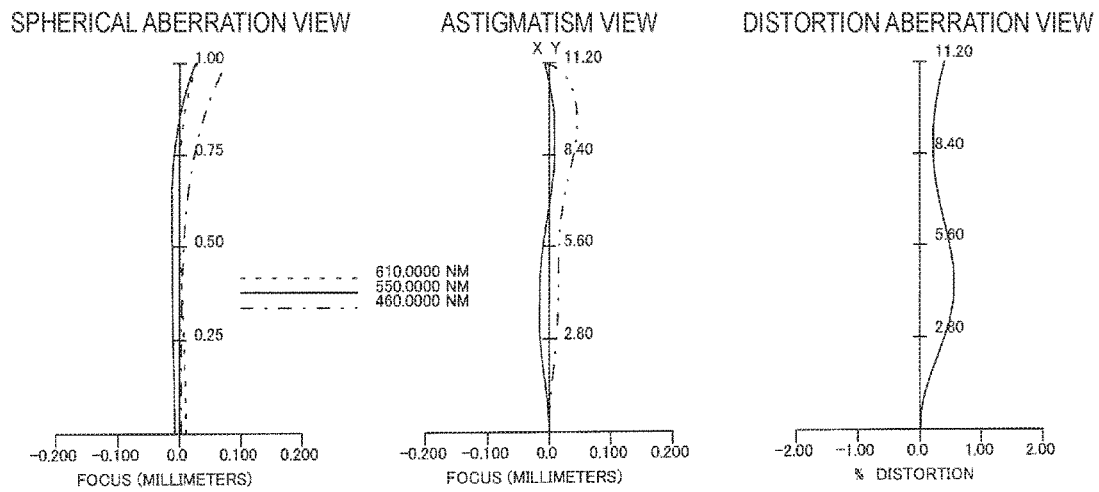
Figure 7A:
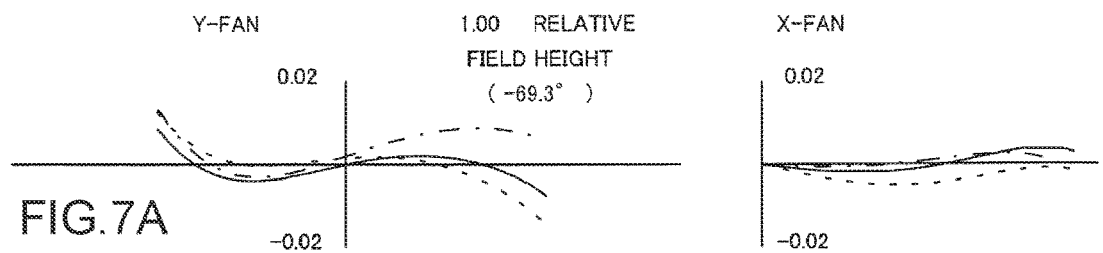
FIGS. 7(A) to 7(E) are lateral aberration views of the projection optical system corresponding to FIG. 5(B).
Figure 7B:
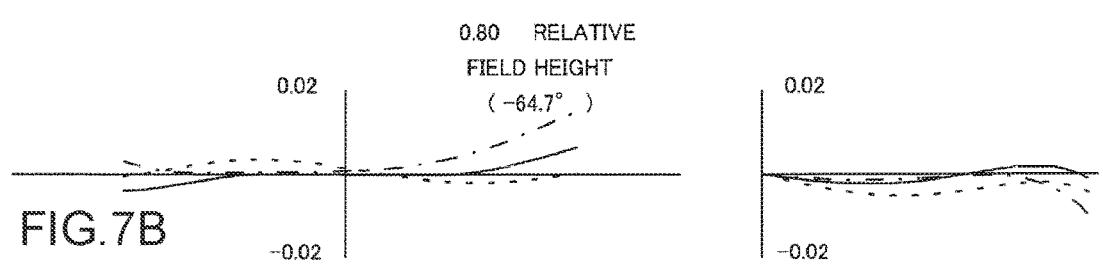
Figure 7C:
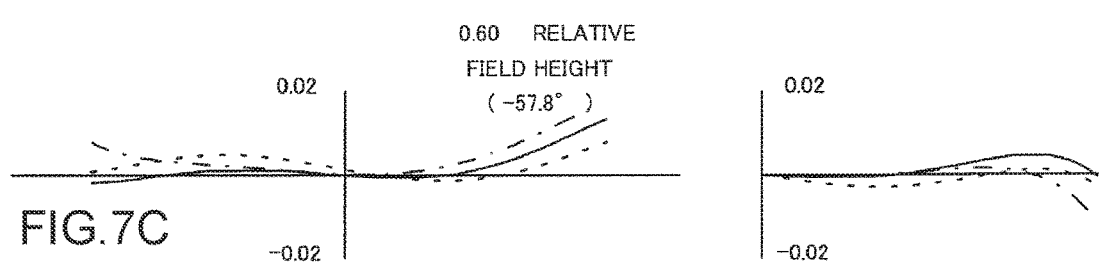
Figure 7D:
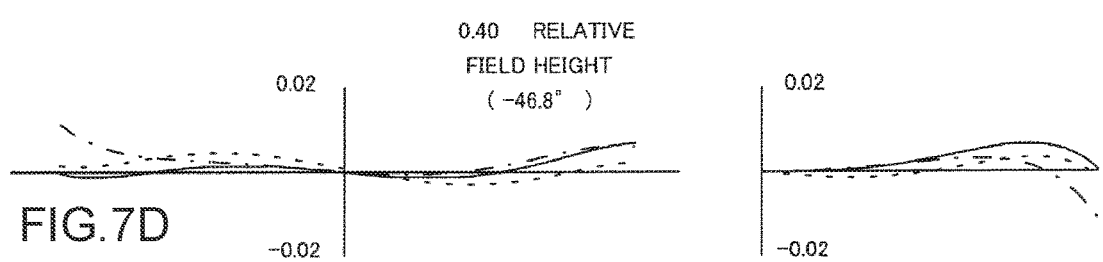
Figure 7E:
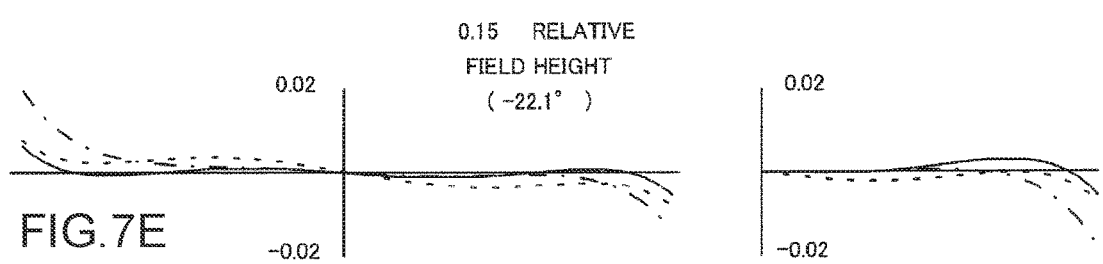

FIG. 5(A) is a reduction-side aberration view (spherical aberration, astigmatism, and distortion aberration) of the projection optical system at the time of a projection magnification of 126 times. FIG. 5(B) is a reduction-side aberration view of the projection optical system at the time of a projection magnification of 162 times. FIG. 5(C) is a reduction-side aberration view of the projection optical system at the time of a projection magnification of 110 times. FIGS. 6(A) to 6(E) are lateral aberration views of the projection optical system corresponding to FIG. 5(A). FIGS. 6(A) to 6(E) illustrate lateral aberrations at field heights of 100%, 80%, 60%, 40%, and 15%. FIG. 6(A) corresponds to a case of a maximum angle of view. Similarly, FIGS. 7(A) to 7(E) are lateral aberration views of the projection optical system corresponding to FIG. 5(B). FIGS. 8(A) to 8(E) are lateral aberration views of the projection optical system corresponding to FIG. 5(C).

Example 2

Data of lens surfaces in Example 2 is shown in Table 4 below.

TABLE 4

| | f 4.029 | | | |
|---|---|---|---|---|
| | ω 69.8° | | | |
| | NA 0.278 | | | |
| | R | D | Nd | Vd |
| OBJ | Infinity | 3.000 | — | — |
| 1 | Infinity | 25.750 | 1.51633 | 64.15 |
| 2 | Infinity | 6.000 | — | — |
| 3 | 275.481 | 5.000 | 1.48749 | 70.24 |
| 4 | −51.033 | 7.170 | — | — |
| 5 | 31.359 | 5.000 | 1.48749 | 70.24 |
| 6 | 154.035 | 12.005 | — | — |
| 7 | −1189.534 | 1.200 | 1.83400 | 37.16 |
| 8 | 25.026 | 5.400 | 1.48749 | 70.24 |
| 9 | −50.108 | Variable interval | — | — |
| STO | Infinity | 1.000 | — | — |

TABLE 4-continued f 4.029
ω 69.8°
NA 0.278

| | R | D | Nd | Vd |
|---|---|---|---|---|
| 11 | 50.553 | 4.500 | 1.48749 | 70.24 |
| 12 | −73.676 | Variable interval | — | — |
| *13 | 20.761 | 4.500 | 1.53116 | 56.04 |
| *14 | 19.593 | Variable interval | — | — |
| 15 | 150.632 | 4.500 | 1.48749 | 70.24 |
| 16 | 475.035 | 65.000 | — | — |
| *17 | −57.867 | −65.000 | — | Reflection surface |
| 18 | 475.035 | 65.000 | — | Reflection surface |
| *19 | 83.144 | Variable interval | — | Reflection surface |
| IMG | Infinity | — | — | — |

Table 5 below shows aspherical surface coefficients of the lens surfaces in Example 2.

TABLE 5

| | Aspherical surface coefficient | | | | | |
|---|---|---|---|---|---|---|
| | K | A04 | A06 | A08 | A10 | A12 |
| 13 | −2.3028 | 2.2111E−06 | −4.9741E−08 | 0.0000E+00 | 0.0000E+00 | 0.0000E+00 |
| 14 | −1.0905 | −2.0101E−05 | −2.8503E−08 | −3.3262E−11 | 8.2831E−14 | 0.0000E+00 |
| 17 | 0.7179 | 2.0389E−06 | −1.6612E−10 | 7.3513E−13 | −4.9826E−16 | 1.9223E−19 |
| 19 | −7.8729 | −1.9238E−08 | −3.4818E−12 | 8.4485E−16 | −4.9184E−20 | 0.0000E+00 |

Table 6 below shows values of variable intervals 9, 12, 14, and 19 in Table 4 in a projection magnification of 125 times, a projection magnification of 161 times, and a projection magnification of 110 times.

TABLE 6

| | Variable interval | | |
|---|---|---|---|
| | 125x | 161x | 110x |
| 9 | 13.010 | 13.367 | 12.737 |
| 12 | 40.292 | 41.372 | 39.565 |
| 14 | 35.732 | 34.295 | 36.732 |
| 19 | −475.000 | −625.034 | −410.197 |

Figure 9:
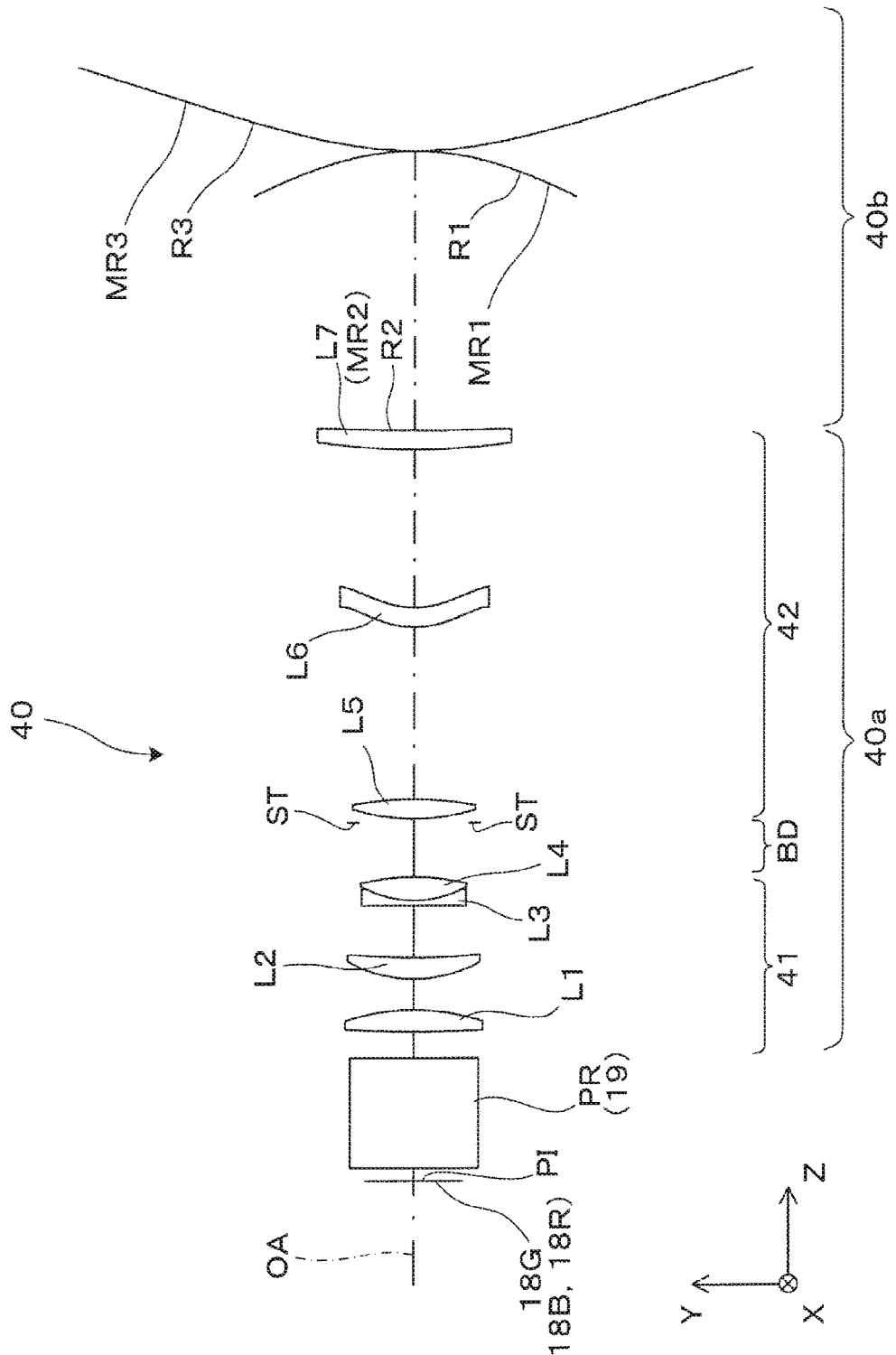
FIG. 9 is a diagram illustrating the configuration of a projection optical system according to Example 2.

FIG. 9 is a sectional view illustrating a projection optical system 40 according to Example 2. In FIG. 9, the projection optical system 40 enlarges and projects an image on the panel surface PI at a magnifying factor according to a distance to the screen. In the projection optical system 40, the first optical group 40a includes seven lenses L1 to L7, the lenses L1 to L4 included in the 1-1th lens group 41 and the lenses L5 to L7 included in the 1-2th lens group 42, in order from the reduction side. The second optical group 40b includes three aspherical mirrors, the first catoptric system MR1 to the third catoptric system MR3. The aspherical mirrors other than the second catoptric system MR2 are drawn without being notched in FIG. 9. However, in an actual optical system, the aspherical mirror has a shape partially notched from a circular shape.

Optical elements will be described in detail in an optical path order. The first optical group 40a which is a dioptric system includes seven lenses, a positive first lens (lens L1) with a biconvex shape, a positive second lens (lens L2) with a meniscus shape of a convex surface facing the reduction side, a cemented lens of a third lens (lens L3) with a biconcave shape and a positive fourth lens (lens L4) with a biconvex shape, an aperture stop ST, a positive fifth lens (lens L5) with a biconvex shape, a negative sixth lens (lens L6) of which both surfaces are aspherical in a meniscus shape of a convex surface facing the reduction side, and a positive seventh lens (lens L7) with a meniscus shape of a convex surface facing the reduction side, in order from the reduction side. A pencil of rays emitted from the first optical group 40a is formed as a primary image between the first catoptric system MR1 of the second optical group 40b and the first optical group 40a, and is subsequently reflected from the concave reflection surface R1 of the first catoptric system MR1. The pencil of rays reflected from the first catoptric system MR1 returns to the side of the first optical group 40a and is reflected from a concave reflection surface R2 of the second catoptric system MR2 installed in the upper half portion of the lens surface of the seventh lens (lens L7) disposed on the most enlargement side of the first optical group 40a. A refraction surface of the first optical group 40a on the most enlargement side and the reflection surface R2 of the second catoptric system MR2 are formed in the same surface shape such that the substantial half is formed as a transmission surface and the remaining half is formed as a reflection surface with an optical axis OA interposed therebetween. The pencil of rays reflected from the second catoptric system MR2 is reflected from an aspherical convex reflection surface R3 of the third catoptric system MR3 to be formed as an image on the screen.

In Example 2, the lens (lens L7) of the first optical group 40a which is on the most enlargement side and is shared by the concave reflection surface R2 of the second catoptric system MR2 is configured as a spherical lens. Such a large-diameter lens with this surface being an aspherical surface is generally a resin lens. However, since a spherical lens can be processed of glass with high precision, the spherical lens is very effective in prevention of a variation in performance.

In a case in which a projection distance is changed to be magnified, focus is performed by moving the fifth lens (lens L5) and the sixth lens (lens L6) in the 1-2th lens group 42 by floating. The seventh lens (lens L7) which is used as the second catoptric system MR2 and is on the most enlargement side is fixed. The 1-1th lens group 41 and the second optical group 40b are fixed.

Figure 10A:
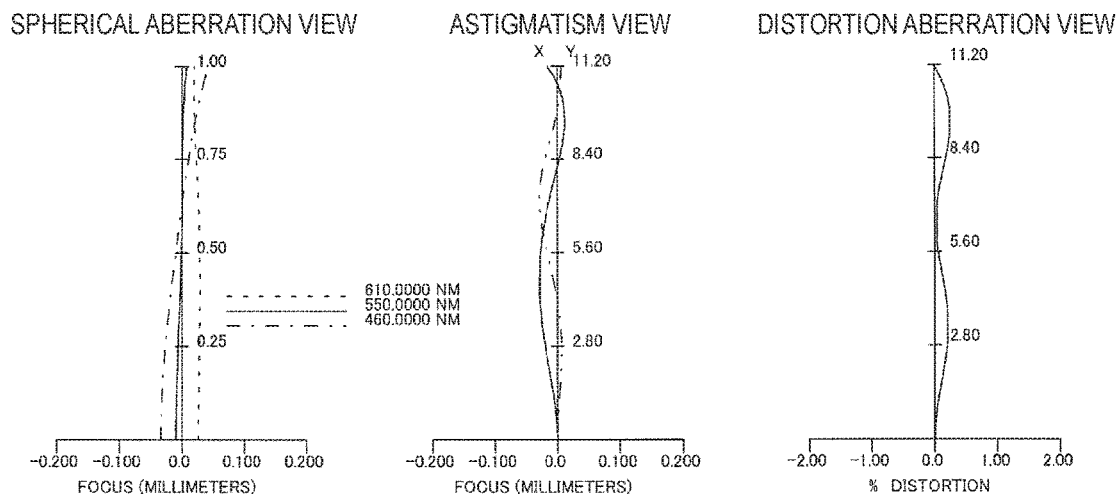
FIGS. 10(A) to 10(C) are reduction-side aberration views of the projection optical system according to Example 2.
Figure 10B:
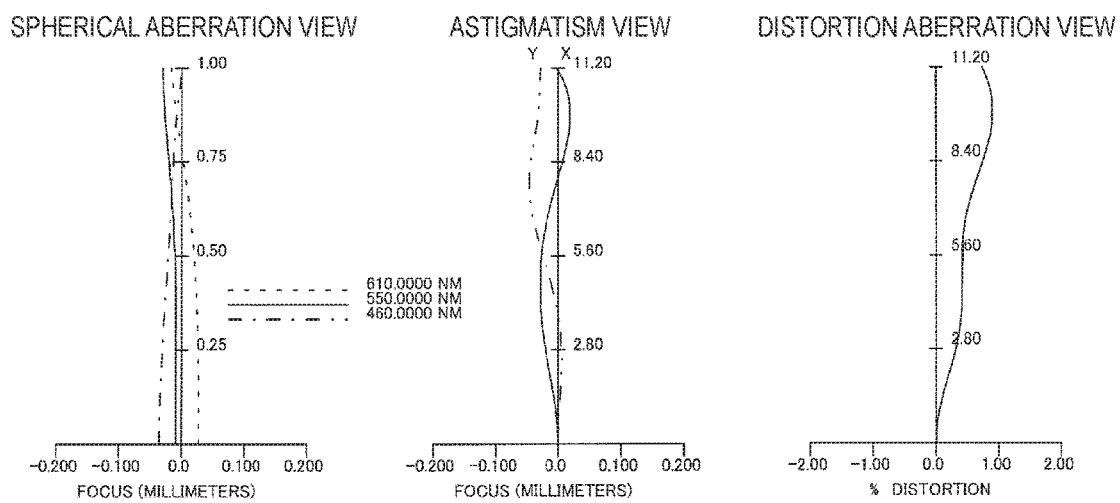
Figure 10C:
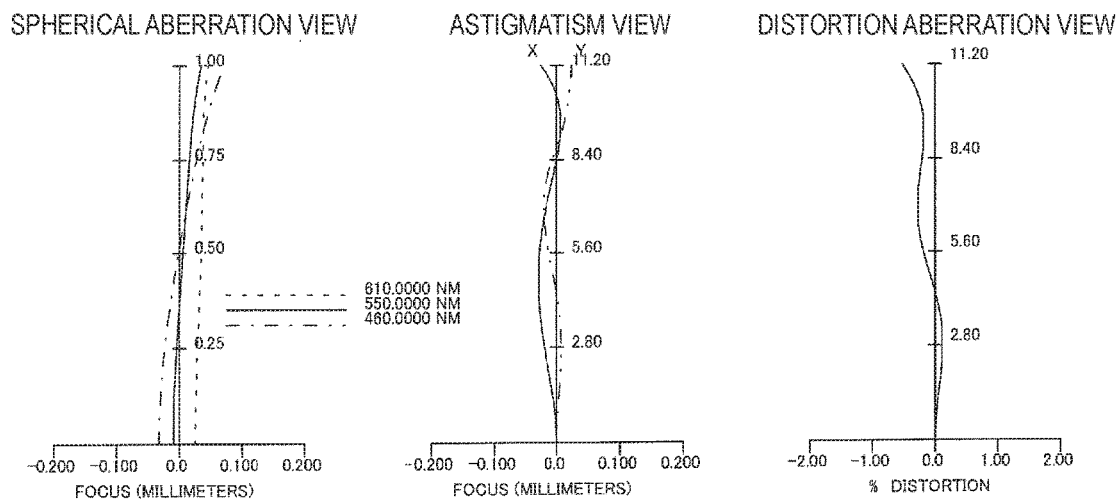

FIG. 10(A) is a reduction-side aberration view (spherical aberration, astigmatism, and distortion aberration) of the projection optical system at the time of a projection magnification of 125 times. FIG. 10(B) is a reduction-side aberration view of the projection optical system at the time of a projection magnification of 161 times. FIG. 10(C) is a reduction-side aberration view of the projection optical system at the time of a projection magnification of 110 times. FIGS. 11(A) to 11(E) are lateral aberration views of the projection optical system corresponding to FIG. 10(A). FIGS. 11(A) to 11(E) illustrate lateral aberrations at field heights of 100%, 80%, 60%, 40%, and 15%. FIG. 11(A) corresponds to a case of a maximum angle of view. Similarly, FIGS. 12(A) to 12(E) are lateral aberration views of the projection optical system corresponding to FIG. 10(B). FIGS. 13(A) to 13(E) are lateral aberration views of the projection optical system corresponding to FIG. 10(C).

Example 3

Data of lens surfaces in Example 3 is shown in Table 7 below.

TABLE 7 f 3.977
ω 69.9°
NA 0.278

|  | R | D | Nd | Vd |
|---|---|---|---|---|
| OBJ | Infinity | 3.000 | — | — |
| 1 | Infinity | 25.750 | 1.51633 | 64.15 |
| 2 | Infinity | 6.000 | — | — |
| 3 | 278.584 | 5.000 | 1.48749 | 70.24 |
| 4 | −41.800 | 10.100 | — | — |
| 5 | 40.324 | 3.000 | 1.48749 | 70.24 |
| 6 | 60.000 | 9.971 | — | — |
| 7 | 94.407 | 1.200 | 1.82690 | 31.49 |
| 8 | 25.499 | 5.400 | 1.48749 | 70.24 |
| 9 | −47.353 | Variable interval | — | — |
| STO | Infinity | 1.000 | — | — |
| 11 | 62.477 | 5.500 | 1.48749 | 70.24 |
| 12 | −40.827 | Variable interval | — | — |
| *13 | −19.327 | 3.000 | 1.53116 | 56.04 |
| *14 | −32.894 | Variable interval | — | — |
| 15 | 255.708 | 4.500 | 1.48749 | 70.24 |
| 16 | −865.000 | 49.466 | — | — |
| *17 | −51.850 | −49.466 | — | Reflection surface |
| 18 | −865.000 | 44.393 | — | Reflection surface |
| *19 | 85.459 | Variable interval | — | Reflection surface |
| IMG | Infinity | — | — | — |

Table 8 below shows aspherical surface coefficients of the lens surfaces in Example 3.

TABLE 8

| Aspherical surface coefficient | | | | | |
|---|---|---|---|---|---|
| K | A04 | A06 | A08 | A10 | A12 |
| 13 | 0.2063 | −2.1299E−05 | 1.0935E−07 | −2.7180E−11 | 1.5034E−13 | 0.0000E+00 |
| 14 | 0.9028 | −2.6396E−05 | 8.2473E−08 | −1.0085E−10 | 0.0000E+00 | 0.0000E+00 |
| 17 | 0.3489 | 2.2064E−06 | −3.5320E−10 | 7.6029E−13 | −4.4273E−16 | 1.7042E−19 |
| 19 | −13.2748 | −1.1943E−07 | 1.6630E−11 | −1.3146E−15 | 4.4883E−20 | 0.0000E+00 |

Table 9 below shows values of variable intervals 9, 12, 14, and 19 in Table 7 in a projection magnification of 126 times, a projection magnification of 162 times, and a projection magnification of 110 times.

TABLE 9

| Variable interval | | | |
|---|---|---|---|
|  | 126x | 162x | 110x |
| 9 | 25.770 | 26.338 | 25.413 |
| 12 | 24.065 | 24.144 | 24.016 |
| 14 | 57.278 | 56.631 | 57.684 |
| 19 | −475.000 | −623.449 | −411.384 |

Figure 14:
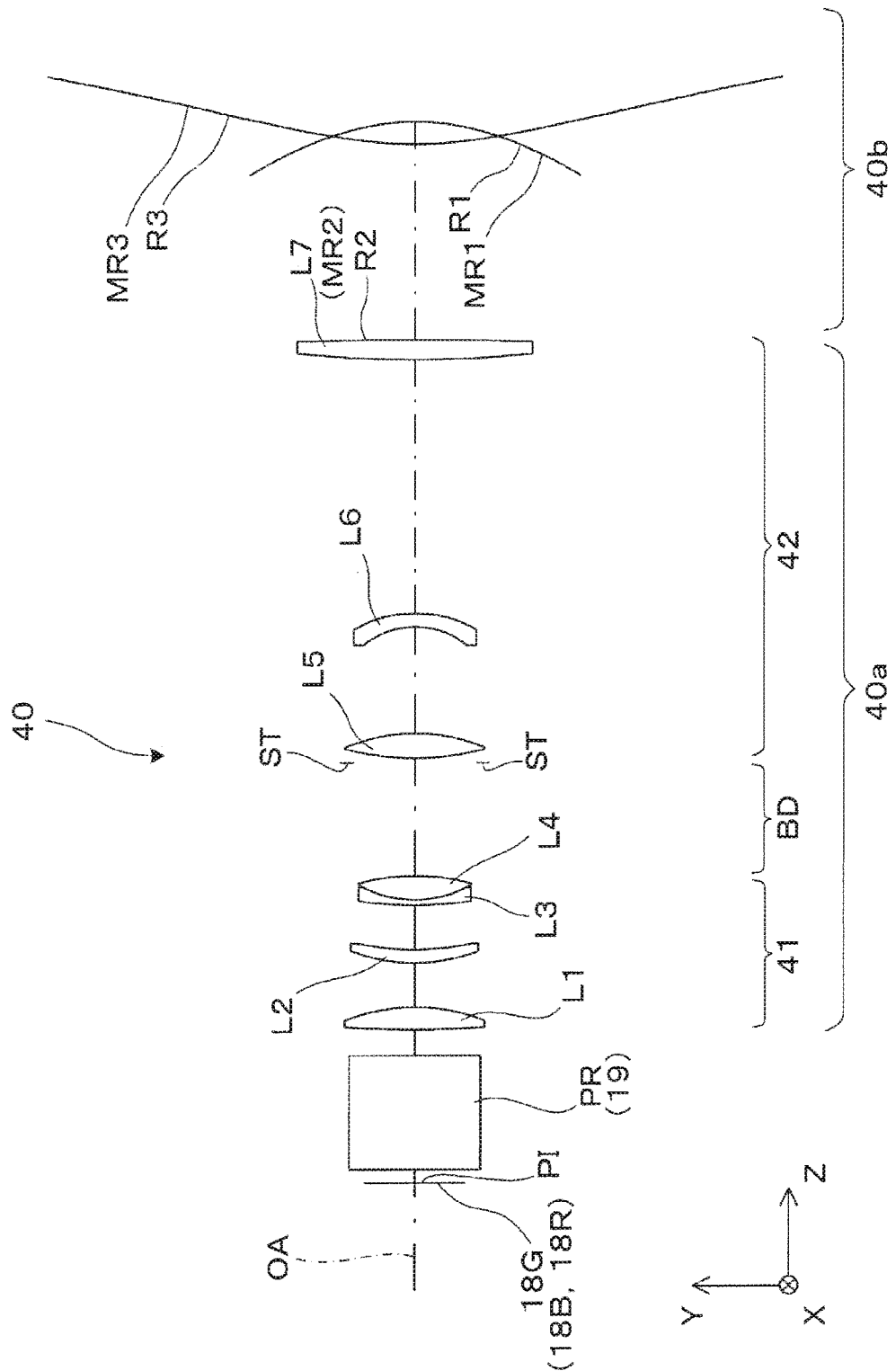
FIG. 14 is a diagram illustrating the configuration of a projection optical system according to Example 3.

FIG. 14 is a sectional view illustrating a projection optical system 40 according to Example 3. In FIG. 14, the projection optical system 40 enlarges and projects an image on the panel surface PI at a magnifying factor according to a distance to the screen. In the projection optical system 40, the first optical group 40a includes seven lenses L1 to L7, the lenses L1 to L4 included in the 1-1th lens group 41 and the lenses L5 to L7 included in the 1-2th lens group 42, in order from the reduction side. The second optical group 40b includes three aspherical mirrors, the first catoptric system MR1 to the third catoptric system MR3. The aspherical mirrors other than the second catoptric system MR2 are drawn without being notched in FIG. 14. However, in an actual optical system, the aspherical mirror has a shape partially notched from a circular shape.

Optical elements will be described in detail in an optical path order. The first optical group 40a which is a dioptric system includes seven lenses, a positive first lens (lens L1) with a biconvex shape, a positive second lens (lens L2) with a meniscus shape of a convex surface facing the reduction side, a cemented lens of a third lens (lens L3) with a meniscus shape of a convex surface facing the reduction side and a positive fourth lens (lens L4) with a biconvex shape, an aperture stop ST, a fifth lens (lens L5) with biconvex positive refractivity, a negative sixth lens (lens L6) of which both surfaces are aspherical in a meniscus shape of a convex surface facing the enlargement side, and a seventh lens (lens L7) with biconvex positive refractivity, in order from the reduction side. A pencil of rays emitted from the first optical group 40a is formed as a primary image between the first catoptric system MR1 of the second optical group 40b and the first optical group 40a, and is subsequently reflected from the concave reflection surface R1 of the first catoptric system MR1. The pencil of rays reflected from the first catoptric system MR1 returns to the side of the first optical group 40a and is reflected from an concave reflection surface R2 of the second catoptric system MR2 installed in the upper half portion of the lens surface of the seventh lens (lens L7) disposed on the most enlargement side of the first optical group 40a. A refraction surface of the first optical group 40a on the most enlargement side and the reflection surface R2 of the second catoptric system MR2 are formed in the same surface shape such that the substantial half is formed as a transmission surface and the remaining half is formed as a reflection surface with an optical axis OA interposed therebetween. The pencil of rays reflected from the second catoptric system MR2 is reflected from an aspherical convex reflection surface R3 of the third catoptric system MR3 to be formed as an image on the screen.

In Example 3, the second catoptric system MR2 has a convex surface. That is, the second catoptric system MR2 can also be configured with a convex surface. In a case in which the second catoptric system MR2 is configured with the convex surface, the third catoptric system MR3 has a shape nearly vertical to the relative optical axis. Therefore, the thickness in the depth direction can be reduced.

In a case in which a projection distance is changed to be magnified, focus is performed by moving the fifth lens (lens L5) and the sixth lens (lens L6) in the 1-2th lens group 42 by floating. The seventh lens (lens L7) which is used as the second catoptric system MR2 and is on the most enlargement side is fixed. The 1-1th lens group 41 and the second optical group 40b are fixed.

Figure 15A:
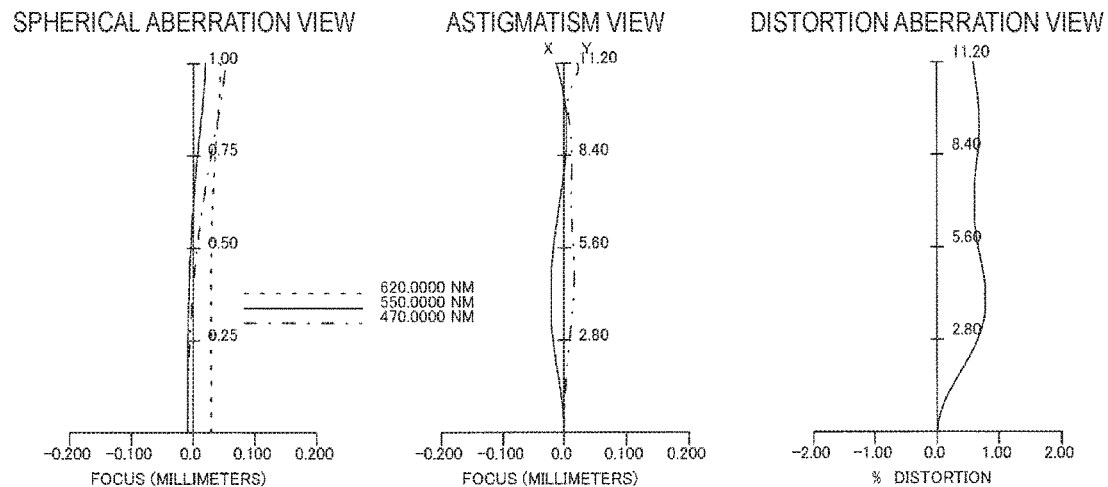
FIGS. 15(A) to 15(C) are reduction-side aberration views of the projection optical system according to Example 3.
Figure 15B:
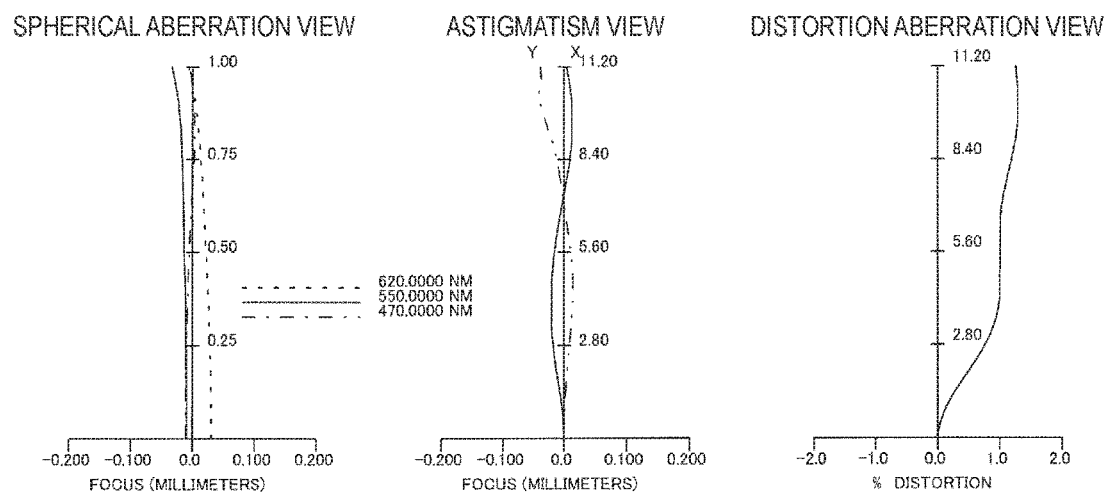
Figure 15C:
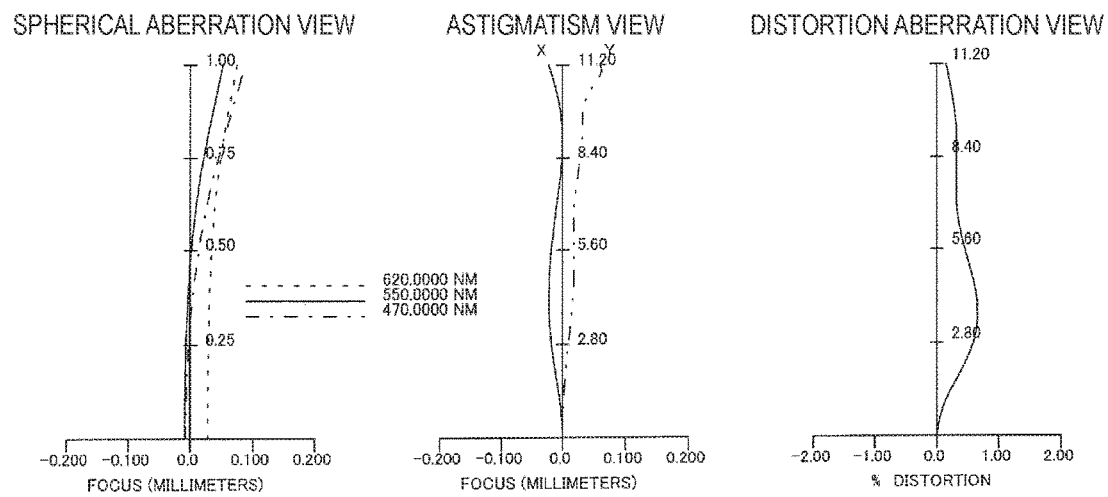

FIG. 15(A) is a reduction-side aberration view (spherical aberration, astigmatism, and distortion aberration) of the projection optical system at the time of a projection magnification of 126 times. FIG. 15(B) is a reduction-side aberration view of the projection optical system at the time of a projection magnification of 162 times. FIG. 15(C) is a reduction-side aberration view of the projection optical system at the time of a projection magnification of 110 times. FIGS. 16(A) to 16(E) are lateral aberration views of the projection optical system corresponding to FIG. 15(A). FIGS. 16(A) to 16(E) illustrate lateral aberrations at field heights of 100%, 80%, 60%, 40%, and 15%. FIG. 16(A) corresponds to a case of a maximum angle of view. Similarly, FIGS. 17(A) to 17(E) are lateral aberration views of the projection optical system corresponding to FIG. 15(B). FIGS. 18(A) to 18(E) are lateral aberration views of the projection optical system corresponding to FIG. 15(C).

Example 4

Data of lens surfaces in Example 4 is shown in Table 10 below. In particular, in the present example and subsequent Example 5, the second catoptric system MR2 is present alone without being shared with a part of the first optical group 40a.

TABLE 10 f 3.994
ω 70.0°
NA 0.278

| | R | D | Nd | Vd |
|---|---|---|---|---|
| OBJ | Infinity | 3.000 | — | — |
| 1 | Infinity | 25.750 | 1.51633 | 64.14 |
| 2 | Infinity | 6.200 | — | — |
| 3 | 116.093 | 6.000 | 1.48749 | 70.24 |
| 4 | −38.077 | 21.734 | — | — |
| 5 | 100.111 | 1.200 | 2.00069 | 25.46 |
| 6 | 41.429 | 4.800 | 1.48749 | 70.24 |
| 7 | −39.676 | Variable interval | — | — |
| STO | Infinity | 1.000 | — | — |
| 9 | 97.248 | 3.000 | 1.48749 | 70.24 |
| 10 | 287.279 | Variable interval | — | — |
| 11 | 91.428 | 4.500 | 1.48749 | 70.24 |
| 12 | −148.941 | Variable interval | — | — |
| *13 | −56.574 | −65.000 | — | Reflection surface |
| *14 | 243.256 | 65.000 | — | Reflection surface |
| *15 | 70.214 | Variable interval | — | Reflection surface |
| IMG | Infinity | — | — | — |

Table 11 below shows aspherical surface coefficients of the lens surfaces in Example 4.

TABLE 11

| | Aspherical surface coefficient | | | | | |
|---|---|---|---|---|---|---|
| | K | A04 | A06 | A08 | A10 | A12 |
| 13 | 0.6140 | 2.2338E−06 | 2.6381E−11 | 3.9285E−13 | −2.0072E−16 | 1.0323E−19 |
| 14 | 0.2723 | −6.0201E−07 | 5.7969E−10 | −4.0071E−13 | 0.0000E+00 | 0.0000E+00 |
| 15 | −6.7963 | −3.1365E−08 | 1.6458E−12 | 0.0000E+00 | 0.0000E+00 | 0.0000E+00 |

Table 12 below shows values of variable intervals 7, 10, 12, and 15 in Table 10 in a projection magnification of 126 times, a projection magnification of 161 times, and a projection magnification of 110 times.

TABLE 12

| | Variable interval | | |
|---|---|---|---|
| | 126x | 161x | 110x |
| 7 | 15.087 | 6.624 | 18.978 |
| 10 | 21.144 | 29.364 | 17.317 |
| 12 | 126.585 | 126.828 | 126.521 |
| 15 | −475.000 | −598.539 | −419.978 |

Figure 19:
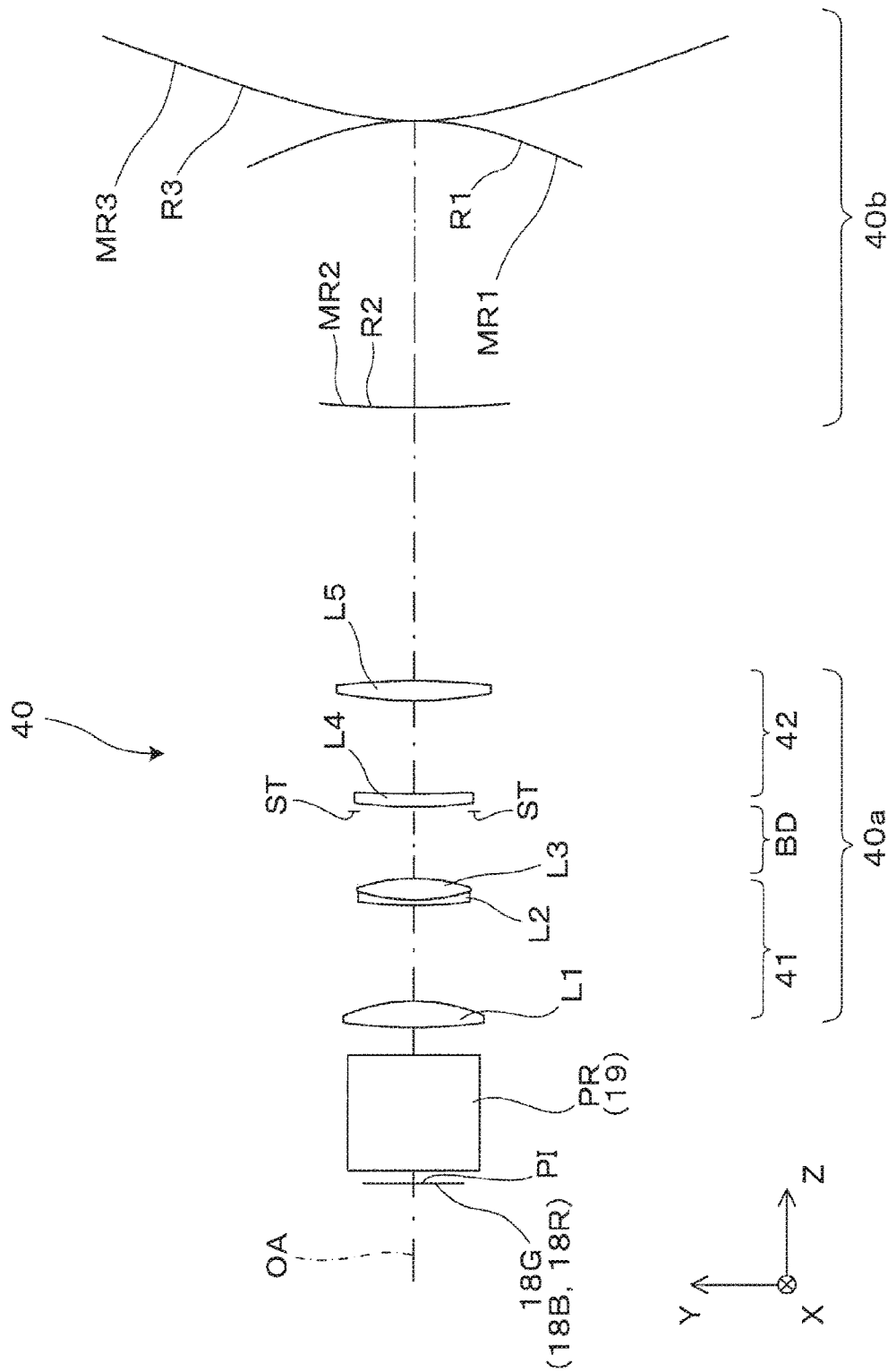
FIG. 19 is a diagram illustrating the configuration of a projection optical system according to Example 4.

FIG. 19 is a sectional view illustrating a projection optical system 40 according to Example 4. In FIG. 19, the projection optical system 40 enlarges and projects an image on the panel surface PI at a magnifying factor according to a distance to the screen. In the projection optical system 40, the first optical group 40a includes five lenses L1 to L5, the lenses L1 to L3 included in the 1-1th lens group 41 and the lenses L4 and L5 included in the 1-2th lens group 42, in order from the reduction side. The second optical group 40b includes three aspherical mirrors, the first catoptric system MR1 to the third catoptric system MR3. Here, as described above, the second catoptric system MR2 is present alone. The aspherical mirrors are drawn without being notched in FIG. 19. However, in an actual optical system, the aspherical mirror has a shape partially notched from a circular shape.

Optical elements will be described in detail in an optical path order. The first optical group 40a which is a dioptric system includes five lenses, a positive first lens (lens L1) with a biconvex shape, a cemented lens of a second lens (lens L2) with a negative meniscus shape of a convex surface facing the reduction side and a positive third lens (lens L3) with a biconvex shape, an aperture stop ST, a fourth lens (lens L4) with a meniscus shape of a convex surface facing the reduction side, and a positive fifth lens (lens L5) with a biconvex shape, in order from the reduction side. A pencil of rays emitted from the first optical group 40a is formed as a primary image between the first catoptric system MR1 of the second optical group 40b and the first optical group 40a, and is subsequently reflected from the aspherical concave reflection surface R1 of the first catoptric system MR1. The pencil of rays reflected from the first catoptric system MR1 returns to the side of the first optical group 40a and is reflected from an aspherical concave reflection surface R2 of the second catoptric system MR2. The pencil of rays reflected from the second catoptric system MR2 is reflected from an aspherical convex reflection surface R3 of the third catoptric system MR3 to be formed as an image on the screen.

The second catoptric system MR2 is configured as a mirror surface alone above. However, as in the cases of Examples 1 to 3, a part of the lens located on the most enlargement side of the first optical group 40a can also be used as the reflection surface R2 of the second catoptric system MR2.

Here, in Example 4, the three aspherical mirrors alone are used in the second optical group 40b and the five lenses are included in the first optical group 40a which is a dioptric system. In the first optical groups 40a, the lenses are all configured as spherical lenses in which it is easy to ensure precision and can be formed in general circular shapes. Therefore, it is possible to reduce a manufacturing variation. In the second optical group 40b, the three aspheric mirrors are all rotationally symmetric and are on the same axis as the optical axis of the dioptric system. Therefore, installation precision is more easily realized. Since the second catoptric system MR2 is relatively miniature, two components can be manufactured from one glass aspherical mirror with a circular shape by forming a glass aspherical mirror with a circular shape in which precision is easily ensured and cutting the glass aspherical mirror in half on the optical axis.

In a case in which a projection distance is changed to be magnified, focus is performed by moving the fourth lens (lens L4) and the fifth lens (lens L5) in the 1-2th lens group 42 by floating. The 1-1th lens group 41 and the second optical group 40b are fixed.

TABLE 13-continued

| | f 4.019 ω 70.7° NA 0.278 | | | |
|---|---|---|---|---|
| | R | D | Nd | Vd |
| 4 | −31.324 | 17.167 | — | — |
| 5 | 106.422 | 4.800 | 1.48749 | 70.24 |
| 6 | −25.930 | 1.200 | 1.84666 | 23.78 |
| 7 | −57.089 | Variable interval | — | — |
| STO | Infinity | 1.000 | — | — |
| 9 | 148.810 | 3.500 | 1.72000 | 50.23 |
| 10 | −61.331 | Variable interval | — | — |
| *11 | −30.201 | 2.500 | 1.53116 | 56.04 |
| *12 | −42.213 | Variable interval | — | — |
| *13 | −62.087 | −83.563 | — | Reflection surface |
| *14 | 207.720 | 55.627 | — | Reflection surface |
| *15 | 74.630 | Variable interval | — | Reflection surface |
| IMG | Infinity | — | — | — |

Table 14 below shows aspherical surface coefficients of the lens surfaces in Example 5.

TABLE 14

| | Aspherical surface coefficient | | | | |
|---|---|---|---|---|---|
| K | A04 | A06 | A08 | A10 | A12 |
| 11 −5.4707 | −8.0145E−05 | 6.1463E−08 | 0.0000E+00 | 0.0000E+00 | 0.0000E+00 |
| 12 2.2146 | −4.6768E−05 | 5.2811E−08 | 0.0000E+00 | 0.0000E+00 | 0.0000E+00 |
| 13 0.4070 | 1.3169E−06 | −7.6337E−11 | 2.6518E−13 | −1.2208E−16 | 3.4649E−20 |
| 14 −1.0000 | −3.8248E−07 | 1.5359E−10 | −4.2092E−14 | 0.0000E+00 | 0.0000E+00 |
| 15 −6.0599 | −2.6499E−08 | 1.3266E−12 | 0.0000E+00 | 0.0000E+00 | 0.0000E+00 |

Figure 20A:
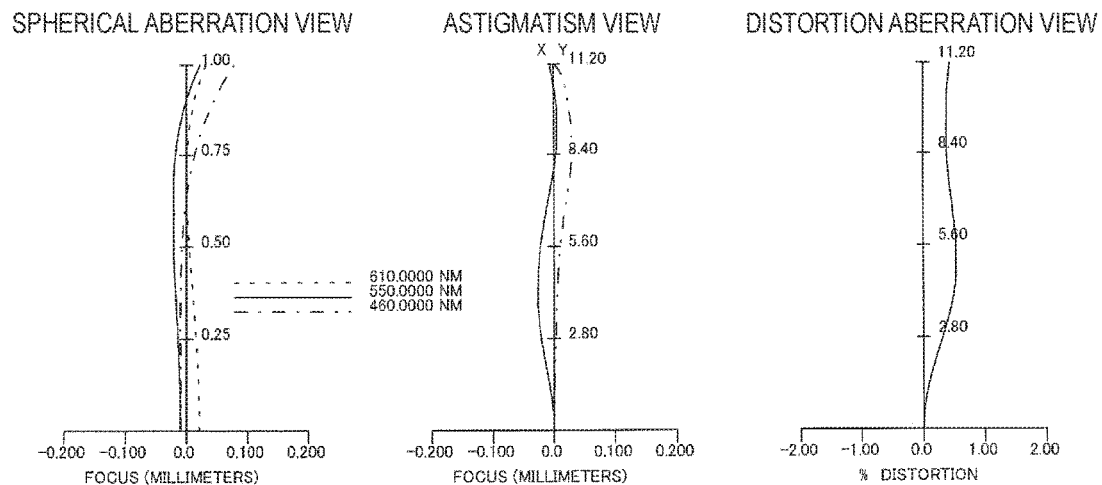
FIGS. 20(A) to 20(C) are reduction-side aberration views of the projection optical system according to Example 4.
Figure 20B:
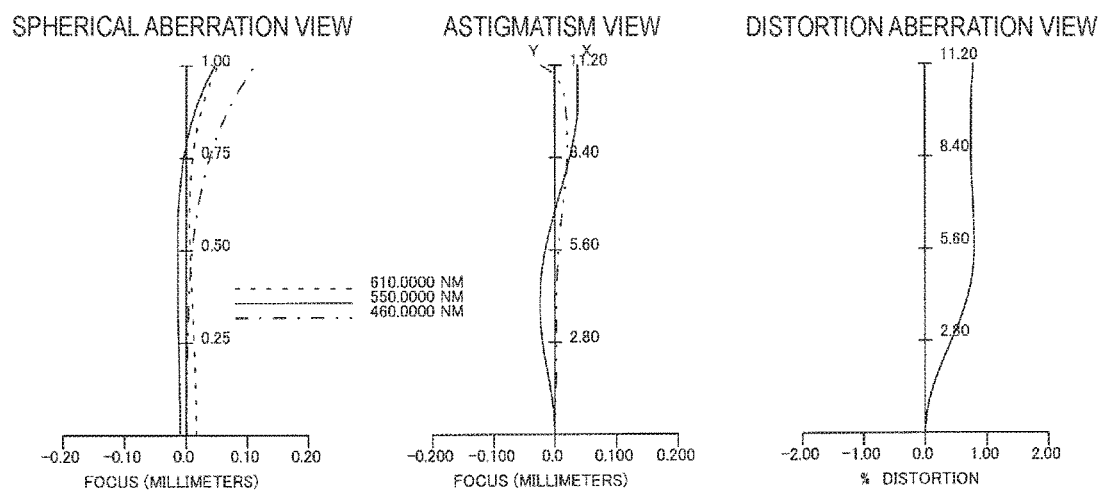
Figure 20C:
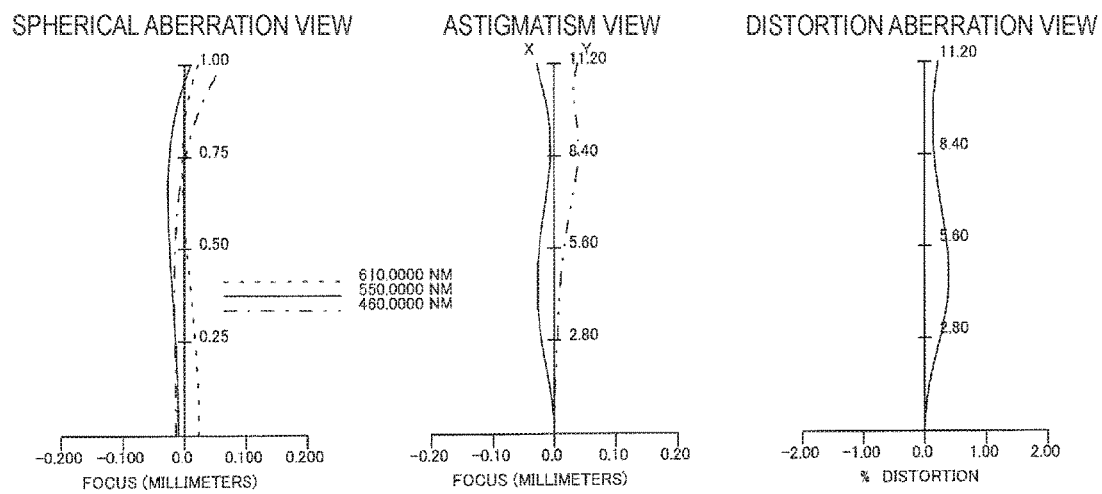
Figure 22A:
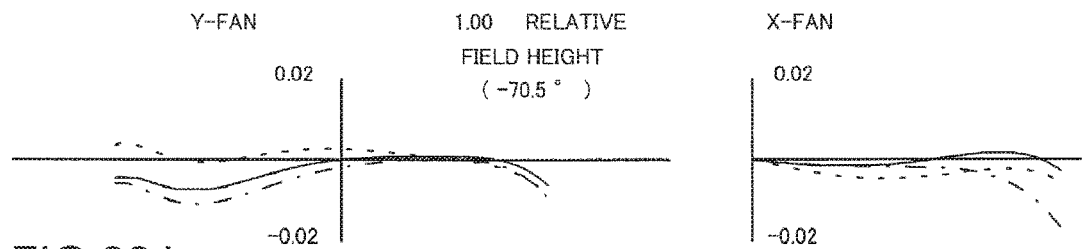
FIGS. 22(A) to 22(E) are lateral aberration views of the projection optical system corresponding to FIG. 20(B).
Figure 22B:
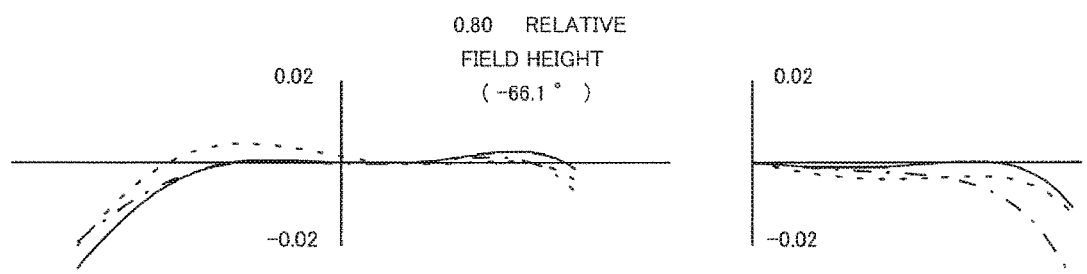
Figure 22C:
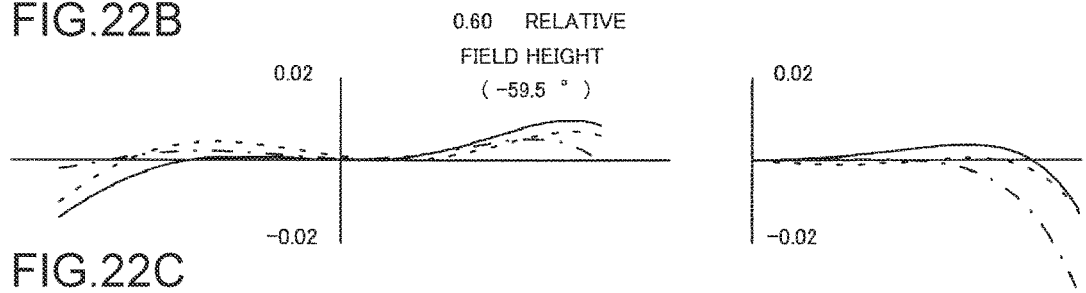
Figure 22D:
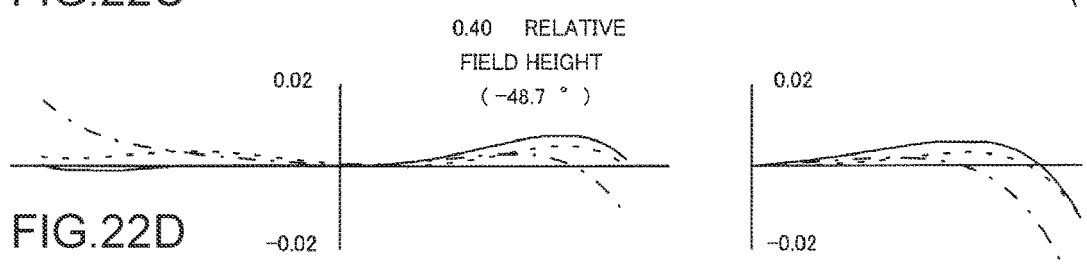
Figure 22E:
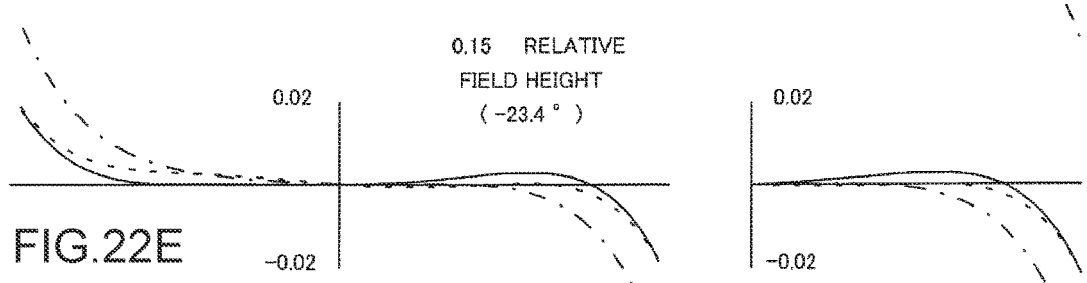
Figure 23A:
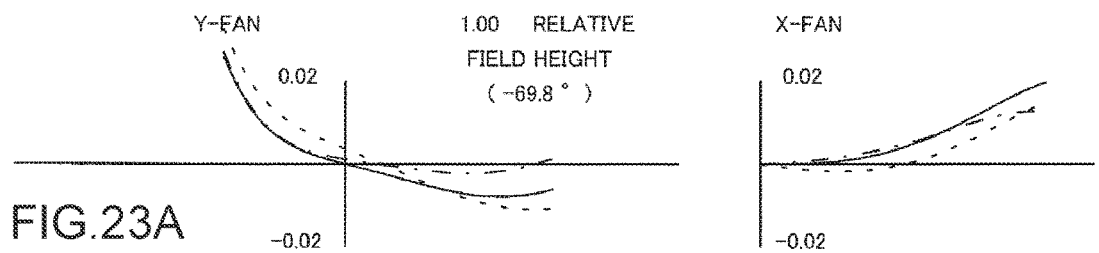
FIGS. 23(A) to 23(E) are lateral aberration views of the projection optical system corresponding to FIG. 20(C).
Figure 23B:
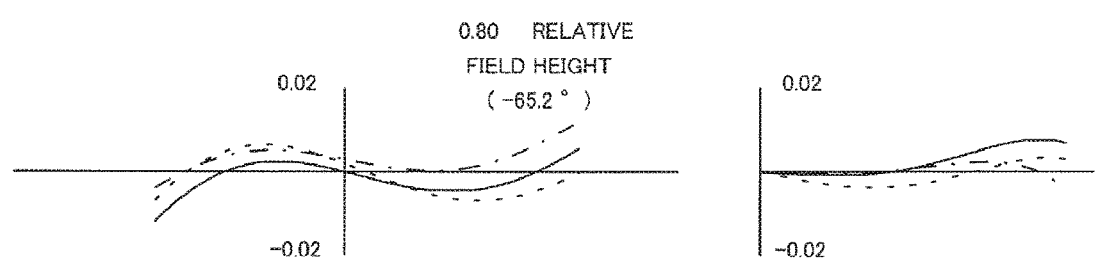
Figure 23C:
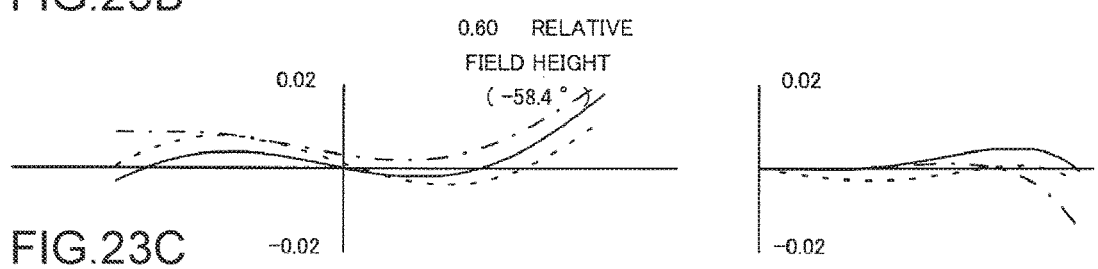
Figure 23D:
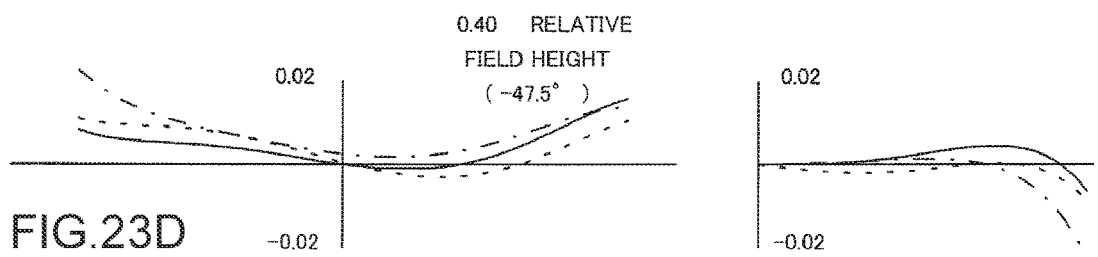
Figure 23E:
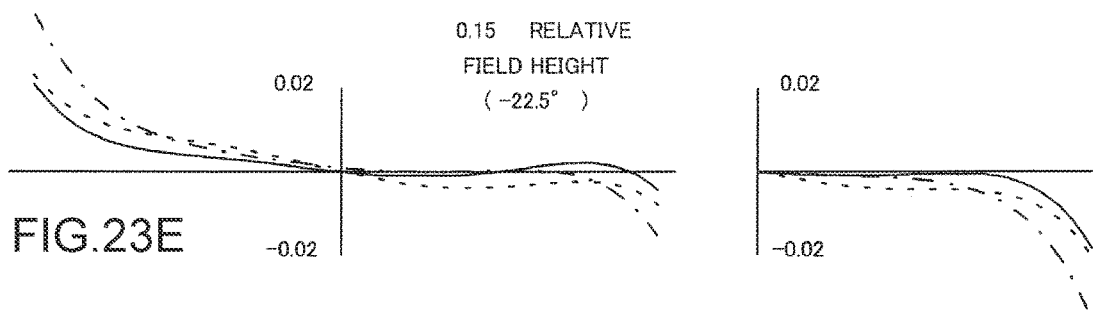

FIG. 20(A) is a reduction-side aberration view (spherical aberration, astigmatism, and distortion aberration) of the projection optical system at the time of a projection magnification of 126 times. FIG. 20(B) is a reduction-side aberration view of the projection optical system at the time of a projection magnification of 161 times. FIG. 20(C) is a reduction-side aberration view of the projection optical system at the time of a projection magnification of 110 times. FIGS. 21(A) to 21(E) are lateral aberration views of the projection optical system corresponding to FIG. 20(A). FIGS. 21(A) to 21(E) illustrate lateral aberrations at field heights of 100%, 80%, 60%, 40%, and 15%. FIG. 21(A) corresponds to a case of a maximum angle of view. Similarly, FIGS. 22(A) to 22(E) are lateral aberration views of the projection optical system corresponding to FIG. 20(B). FIGS. 23(A) to 23(E) are lateral aberration views of the projection optical system corresponding to FIG. 20(C).

Example 5

Data of lens surfaces in Example 5 is shown in Table 13 below.

TABLE 13

| | f 4.019 ω 70.7° NA 0.278 | | | |
|---|---|---|---|---|
| | R | D | Nd | Vd |
| OBJ | Infinity | 3.000 | — | — |
| 1 | Infinity | 25.750 | 1.51633 | 64.14 |
| 2 | Infinity | 6.300 | — | — |
| 3 | 166.812 | 6.000 | 1.48749 | 70.24 |

Table 15 below shows values of variable intervals 7, 10, 12, and 15 in Table 13 in a projection magnification of 125 times, a projection magnification of 161 times, and a projection magnification of 110 times.

TABLE 15

| | Variable interval | | |
|---|---|---|---|
| | 125x | 161x | 110x |
| 7 | 17.464 | 18.314 | 16.903 |
| 10 | 29.892 | 30.296 | 29.667 |
| 12 | 117.496 | 116.412 | 118.451 |
| 15 | −475.000 | −625.806 | −410.412 |

Figure 24:
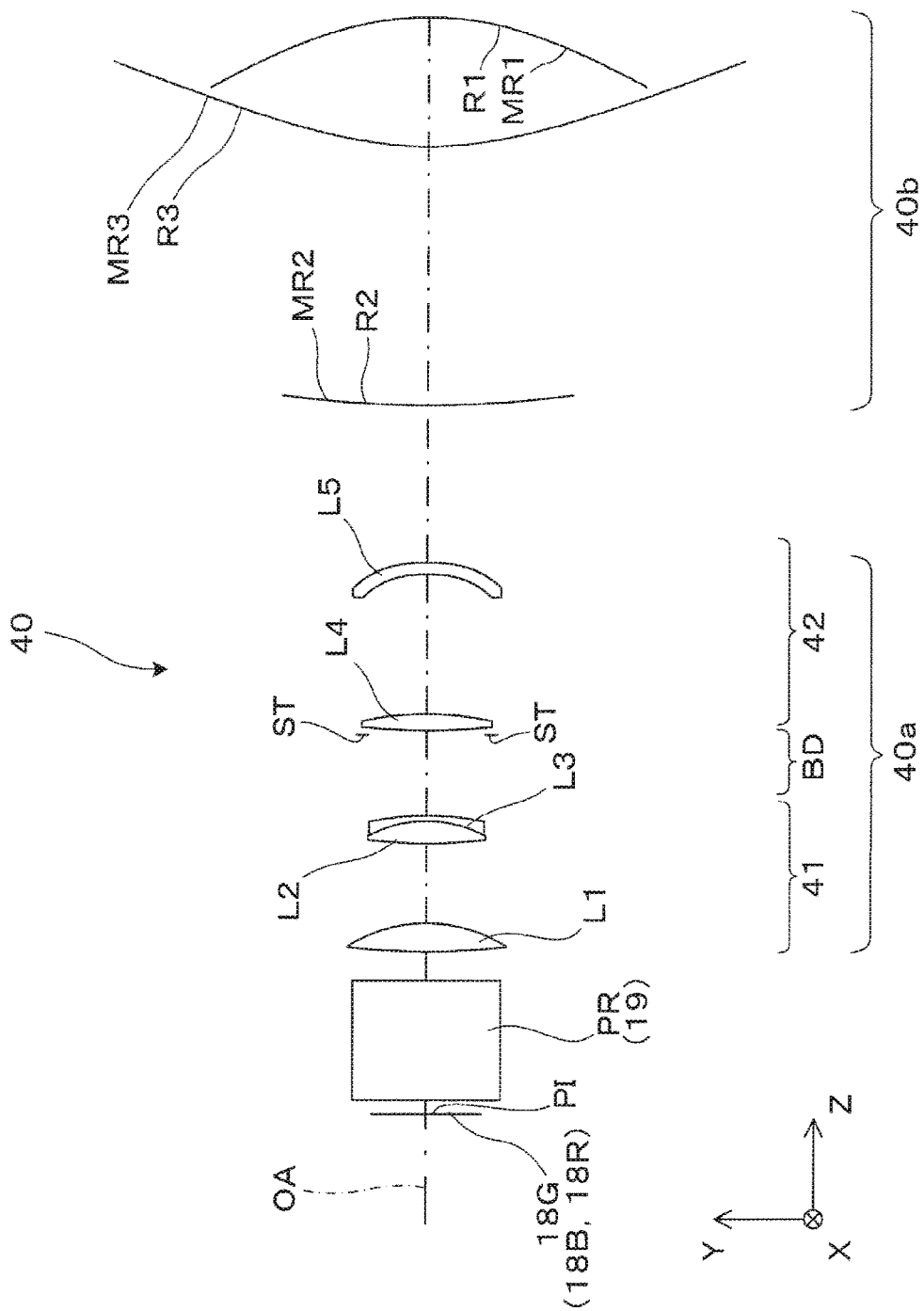
FIG. 24 is a diagram illustrating the configuration of a projection optical system according to Example 5.

FIG. 24 is a sectional view illustrating a projection optical system 40 according to Example 5. In FIG. 24, the projection optical system 40 enlarges and projects an image on the panel surface PI at a magnifying factor according to a distance to the screen. In the projection optical system 40, the first optical group 40a includes five lenses L1 to L5, the lenses L1 to L3 included in the 1-1th lens group 41 and the lenses L4 and L5 included in the 1-2th lens group 42, in order from the reduction side. The second optical group 40b includes three aspherical mirrors, the first catoptric system MR1 to the third catoptric system MR3. Here, as described above, the second catoptric system MR2 is present alone. The aspherical mirrors are drawn without being notched in FIG. 24. However, in an actual optical system, the aspherical mirror has a shape partially notched from a circular shape.

Optical elements will be described in detail in an optical path order. The first optical group 40a which is a dioptric system includes five lenses, a positive first lens (lens L1) with a biconvex shape, a cemented lens of a positive second lens (lens L2) with a biconvex shape and a third lens (lens L3) with a negative meniscus shape of a convex surface facing the enlargement side, an aperture stop ST, a fourth lens (lens L4) with a biconvex shape, and a fifth lens (lens L5) which is a negative meniscus lens of which both surfaces are aspherical and of which the convex surface facing the enlargement side, in order from the reduction side. A pencil of rays emitted from the first optical group 40a is formed as a primary image between the first catoptric system MR1 of the second optical group 40b and the first optical group 40a, and is subsequently reflected from the aspherical concave reflection surface R1 of the first catoptric system MR1. The pencil of rays reflected from the first catoptric system MR1 returns to the side of the first optical group 40a and is reflected from an aspherical concave reflection surface R2 of the second catoptric system MR2. The pencil of rays reflected from the second catoptric system MR2 is reflected from an aspherical convex reflection surface R3 of the third catoptric system MR3 to be formed as an image on the screen.

In Example 5, the three aspherical mirrors are provided in the second optical group 40b and one aspherical lens (lens L5) is provided in the first optical group 40a. Thus, the first optical group 40a which is a dioptric system has a configuration of five lenses and a small configuration, and thus the entire length is shorter than in Example 4. Since the first optical group 40a can be formed in a general circular shape, a manufacturing problem is small and the aspherical lens (lens L5) is configured as a lens with a small power and a small thickness deviation ratio. Therefore, it is possible to reduce an influence of an internal distortion or the like.

In a case in which a projection distance is changed to be magnified, focus is performed by moving the fourth lens (lens L4) and the fifth lens (lens L5) in the 1-2th lens group 42 by floating. The 1-1th lens group 41 and the second optical group 40b are fixed.

Figure 25A:
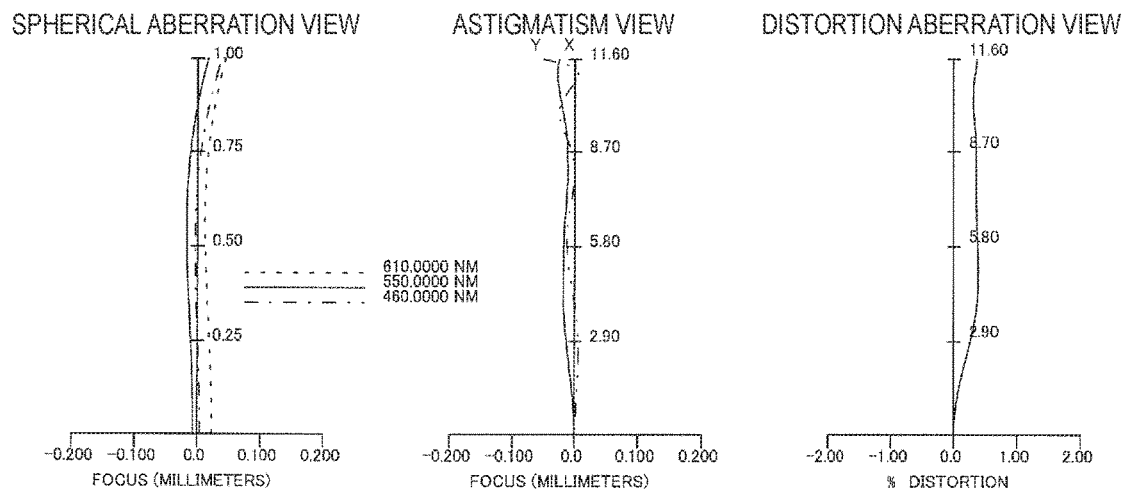
FIGS. 25(A) to 25(C) are reduction-side aberration views of the projection optical system according to Example 5.
Figure 25B:
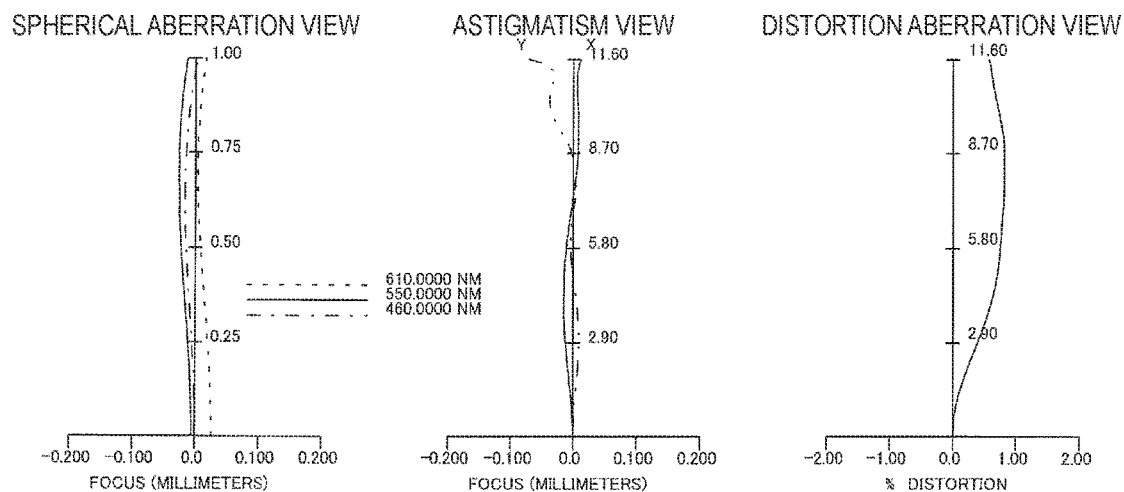
Figure 25C:
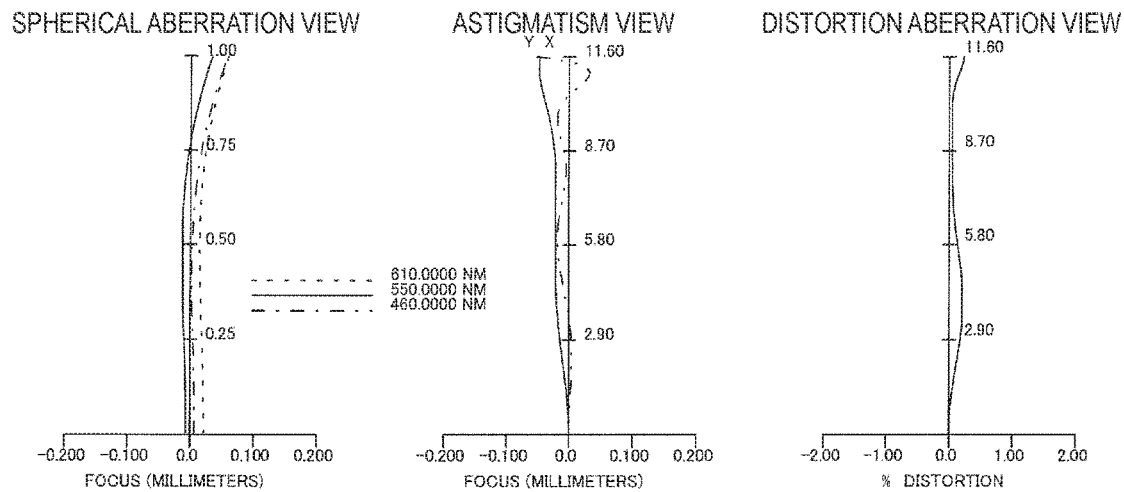
Figure 26A:
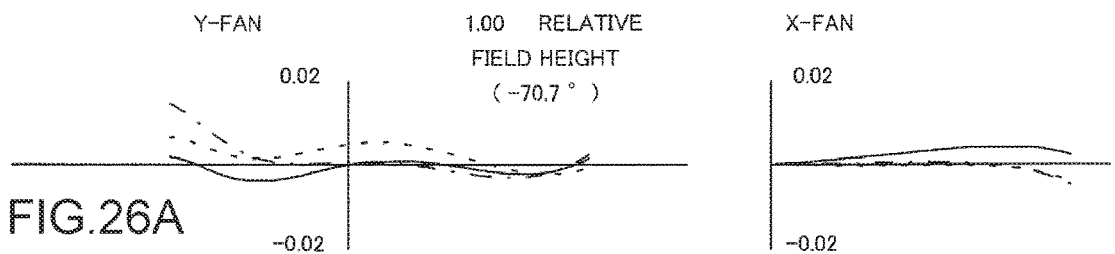
FIGS. 26(A) to 26(E) are lateral aberration views of the projection optical system corresponding to FIG. 25(A).
Figure 26B:
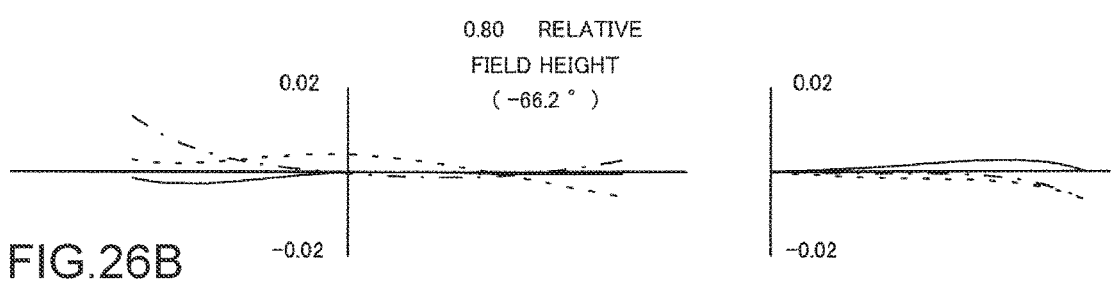
Figure 26C:
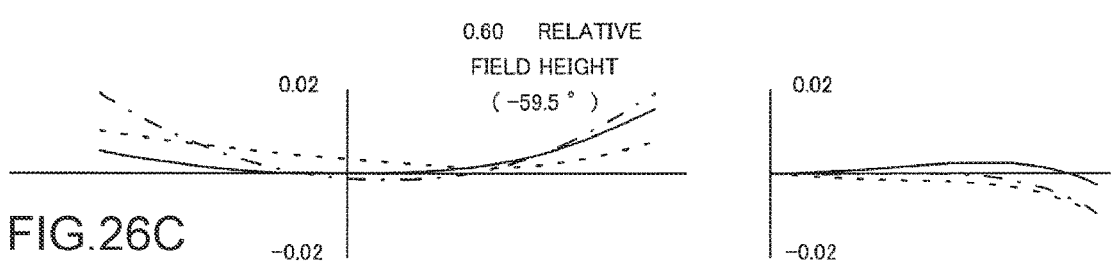
Figure 26D:
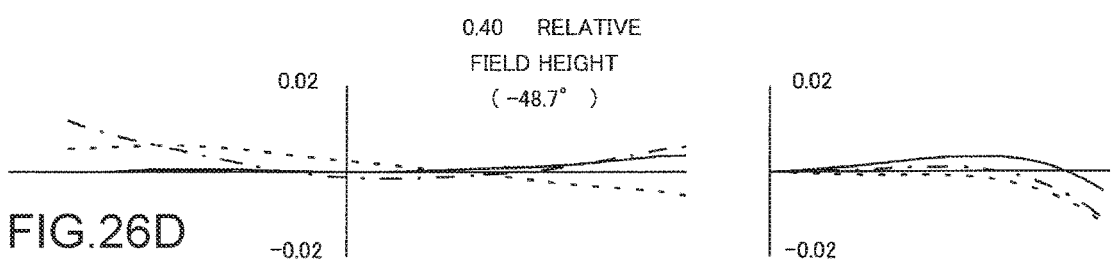
Figure 26E:
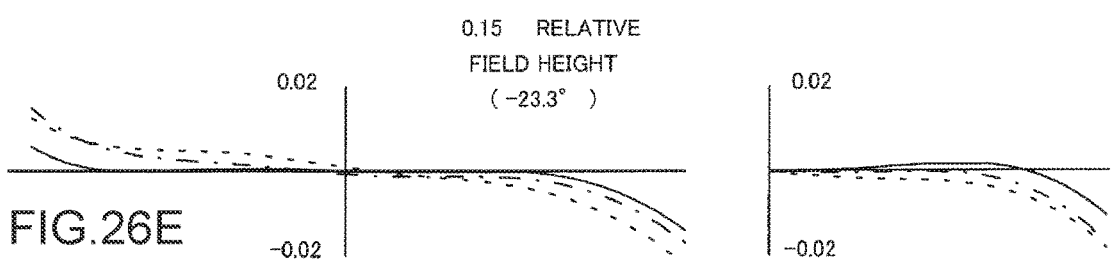
Figure 27A:
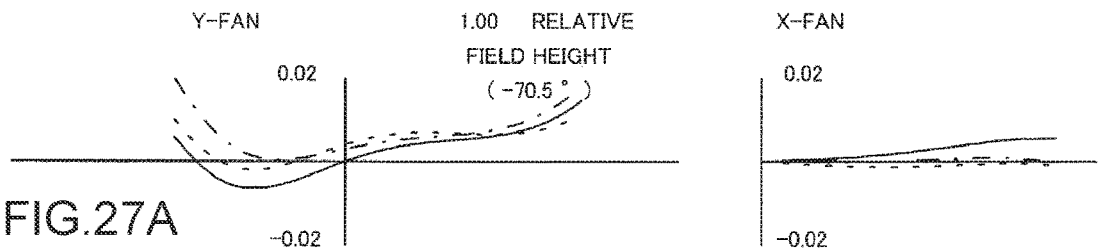
FIGS. 27(A) to 27(E) are lateral aberration views of the projection optical system corresponding to FIG. 25(B).
Figure 27B:
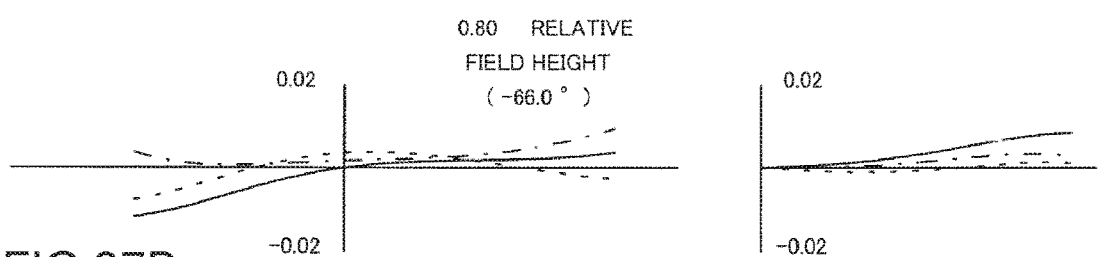
Figure 27C:
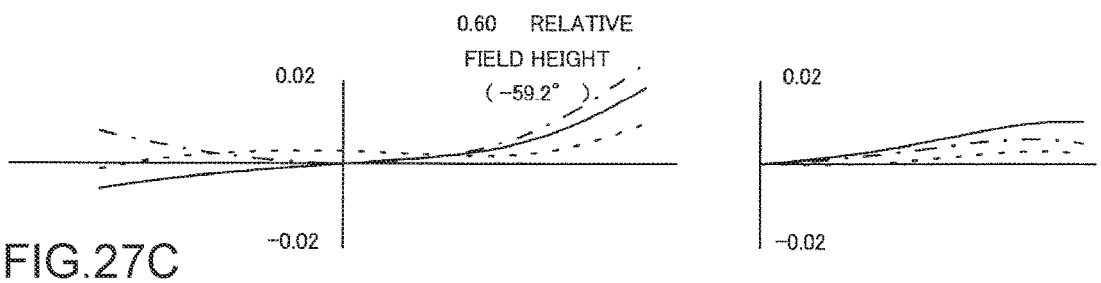
Figure 27D:
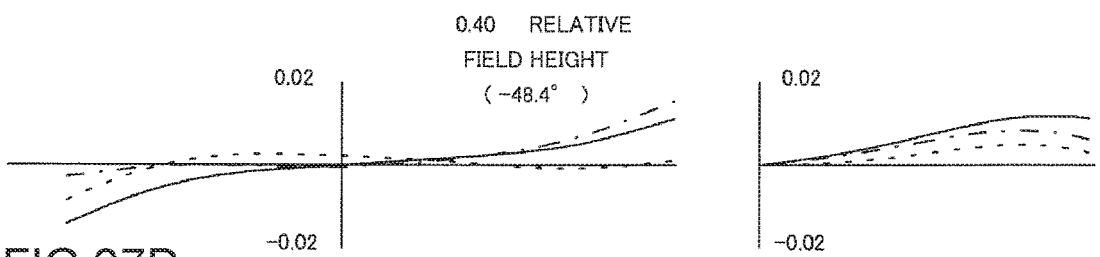
Figure 27E:
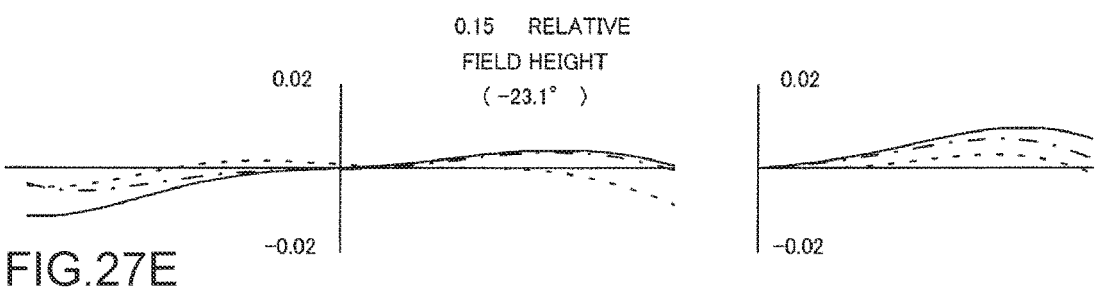
Figure 28A:
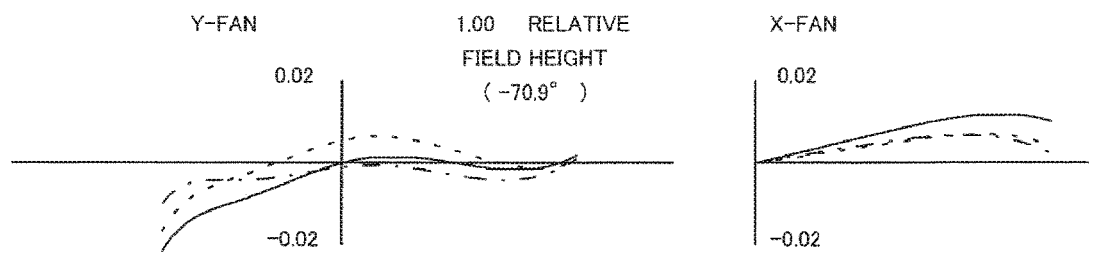
FIGS. 28(A) to 28(E) are lateral aberration views of the projection optical system corresponding to FIG. 25(C).
Figure 28B:
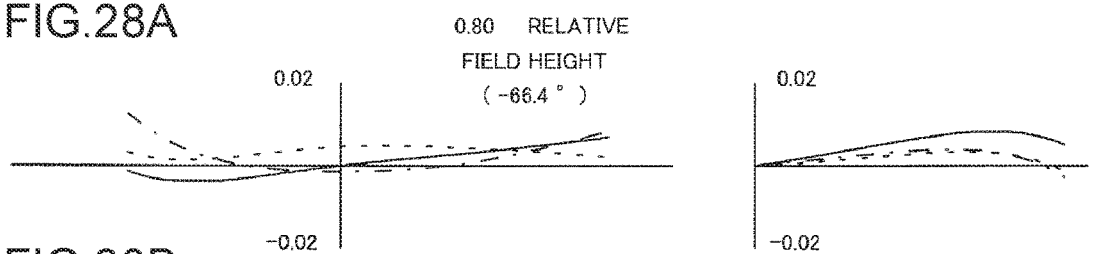
Figure 28C:
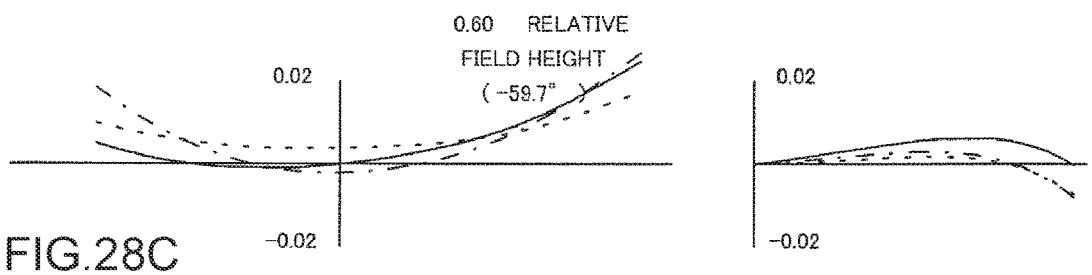
Figure 28D:
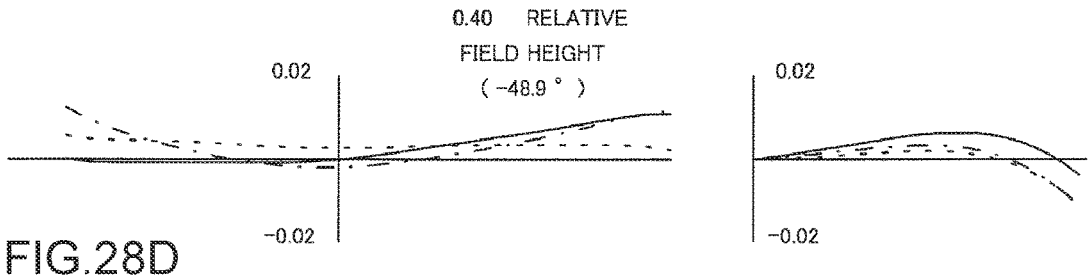
Figure 28E:
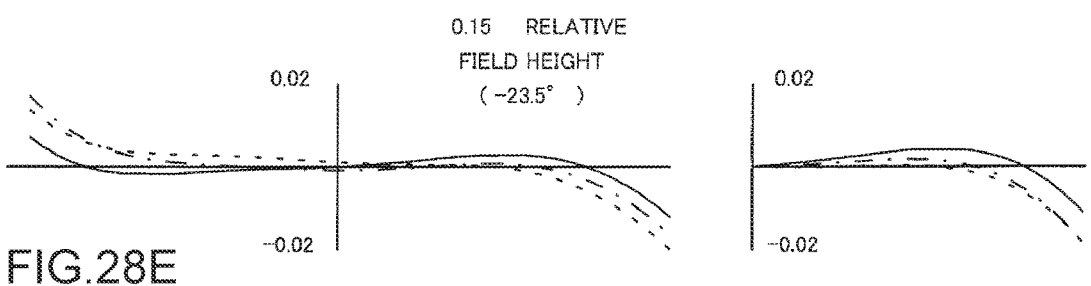

FIG. 25(A) is a reduction-side aberration view (spherical aberration, astigmatism, and distortion aberration) of the projection optical system at the time of a projection magnification of 126 times. FIG. 25(B) is a reduction-side aberration view of the projection optical system at the time of a projection magnification of 161 times. FIG. 25(C) is a reduction-side aberration view of the projection optical system at the time of a projection magnification of 110 times. FIGS. 26(A) to 26(E) are lateral aberration views of the projection optical system corresponding to FIG. 25(A). FIGS. 26(A) to 26(E) illustrate lateral aberrations at field heights of 100%, 80%, 60%, 40%, and 15%. FIG. 26(A) corresponds to a case of a maximum angle of view. Similarly, FIGS. 27(A) to 27(E) are lateral aberration views of the projection optical system corresponding to FIG. 25(B). FIGS. 28(A) to 28(E) are lateral aberration views of the projection optical system corresponding to FIG. 25(C).

Example 6

Figure 29:
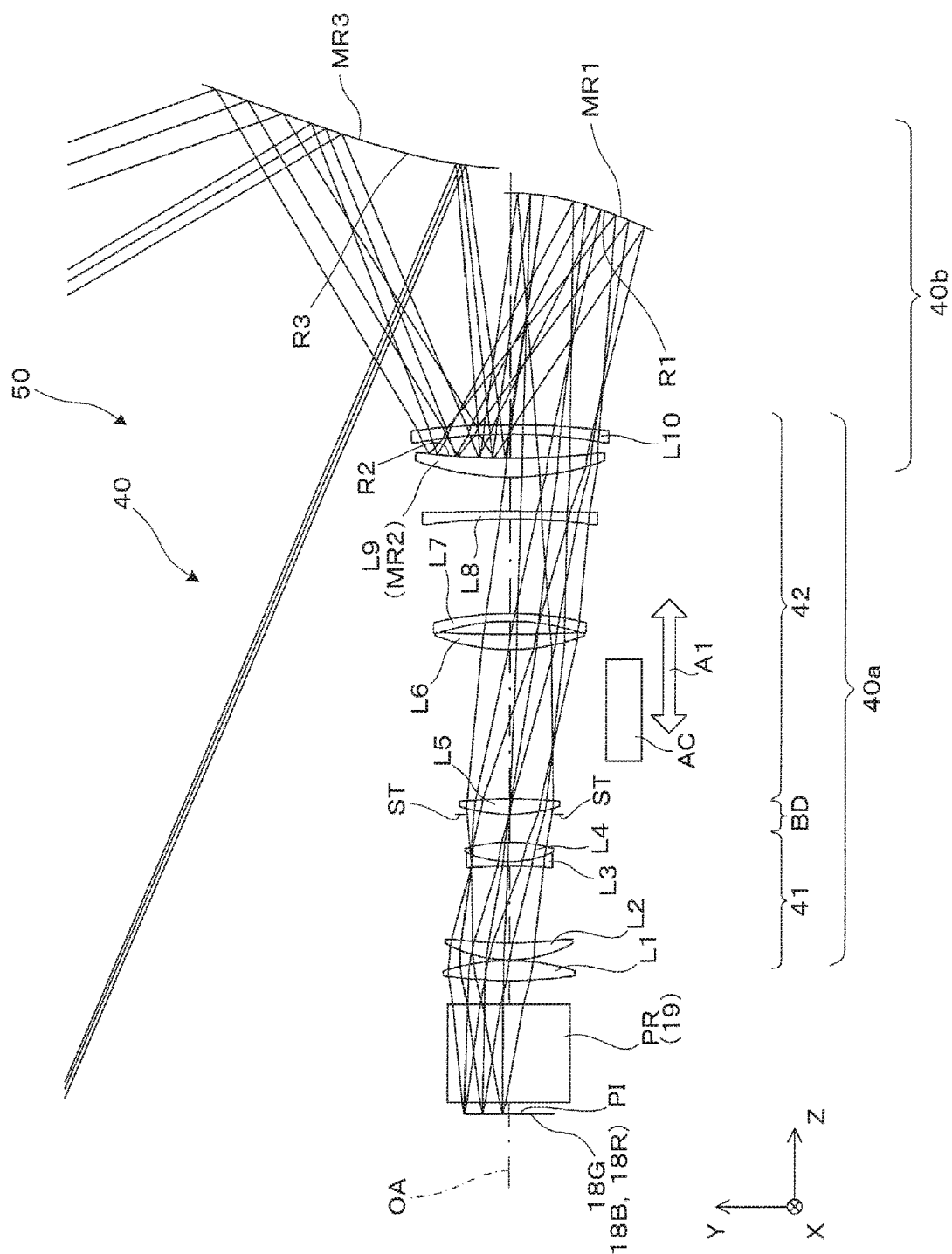
FIG. 29 is a diagram illustrating a configuration and light rays from an object surface to a concave reflection mirror in a projection optical system according to Example 6.

Data of lens surfaces in Example 6 is shown in Table 16 below. In particular, in the present example, for example, as illustrated in FIG. 29, the second catoptric system MR2 is shared with the lens (the lens L9) located to be closer to the reduction side than the lens (the lens L10) on the most enlargement side in the first optical group 40a.

TABLE 16

| | f 4.094 ω 70.2° NA 0.278 | | | |
|---|---|---|---|---|
| | R | D | Nd | Vd |
| OBJ | Infinity | 3.000 | — | — |
| 1 | Infinity | 25.750 | 1.51633 | 64.14 |
| 2 | Infinity | 6.000 | — | — |
| 3 | 115.000 | 5.200 | 1.51633 | 64.14 |
| 4 | −55.000 | 0.200 | — | — |
| 5 | 33.190 | 4.500 | 1.48749 | 70.24 |
| 6 | 112.000 | 20.000 | — | — |
| 7 | −194.000 | 1.200 | 1.83400 | 37.16 |
| 8 | 27.570 | 5.000 | 1.49700 | 81.54 |
| 9 | −42.000 | 7.360 | — | — |
| STO | Infinity | 0.000 | — | — |
| 11 | 42.000 | 4.000 | 1.48749 | 70.24 |
| 12 | −138.000 | Variable interval | — | — |
| 13 | 53.500 | 4.000 | 1.58144 | 40.75 |
| 14 | 370.000 | 3.420 | — | — |
| 15 | −55.000 | 2.000 | 1.51633 | 64.14 |
| 16 | −82.500 | Variable interval | — | — |
| 17 | −160.000 | 2.000 | 1.72342 | 37.95 |
| 18 | −765.000 | Variable interval | — | — |
| 19 | 71.300 | 5.000 | 1.51633 | 64.14 |
| 20 | 205.000 | 6.320 | — | — |
| 21 | −130.400 | 2.500 | 1.48749 | 70.24 |
| 22 | −200.000 | 60.500 | — | — |
| *23 | −58.562 | −60.500 | — | Reflection surface |
| 24 | −200.000 | −2.500 | 1.48749 | 70.24 |
| 25 | −130.400 | −6.320 | — | — |
| 26 | 205.000 | 6.320 | — | Reflection surface |
| 27 | −130.400 | 2.500 | 1.48749 | 70.24 |
| 28 | −200.000 | 67.000 | — | — |
| *29 | 82.450 | Variable interval | — | Reflection surface |
| IMG | Infinity | 0.000 | — | — |

Table 17 below shows aspherical surface coefficients of the lens surfaces in Example 6.

TABLE 17

| | Aspherical surface coefficient | | | | | |
|---|---|---|---|---|---|---|
| | K | A04 | A06 | A08 | A10 | A12 |
| 23 | 0.7860 | 2.3470E−06 | −2.2290E−10 | 6.0050E−13 | −3.2890E−16 | 1.4560E−19 |
| 29 | −6.0410 | −6.4310E−08 | 1.3060E−11 | −2.5160E−15 | 2.9150E−19 | −1.3920E−23 |

Table 18 below shows values of variable intervals 12, 16, 18, and 29 in Table 16 in a projection magnification of 125 times, a projection magnification of 171 times, and a projection magnification of 99 times.

TABLE 18

| | Variable interval | | |
|---|---|---|---|
| | 125x | 171x | 99x |
| 12 | 38.774 | 40.637 | 36.953 |
| 16 | 24.413 | 26.922 | 22.069 |

TABLE 18-continued

| | Variable interval | | |
|---|---|---|---|
| | 125x | 171x | 99x |
| 18 | 8.800 | 4.422 | 12.959 |
| 29 | −480.000 | −675.194 | −371.837 |

Figure 30:
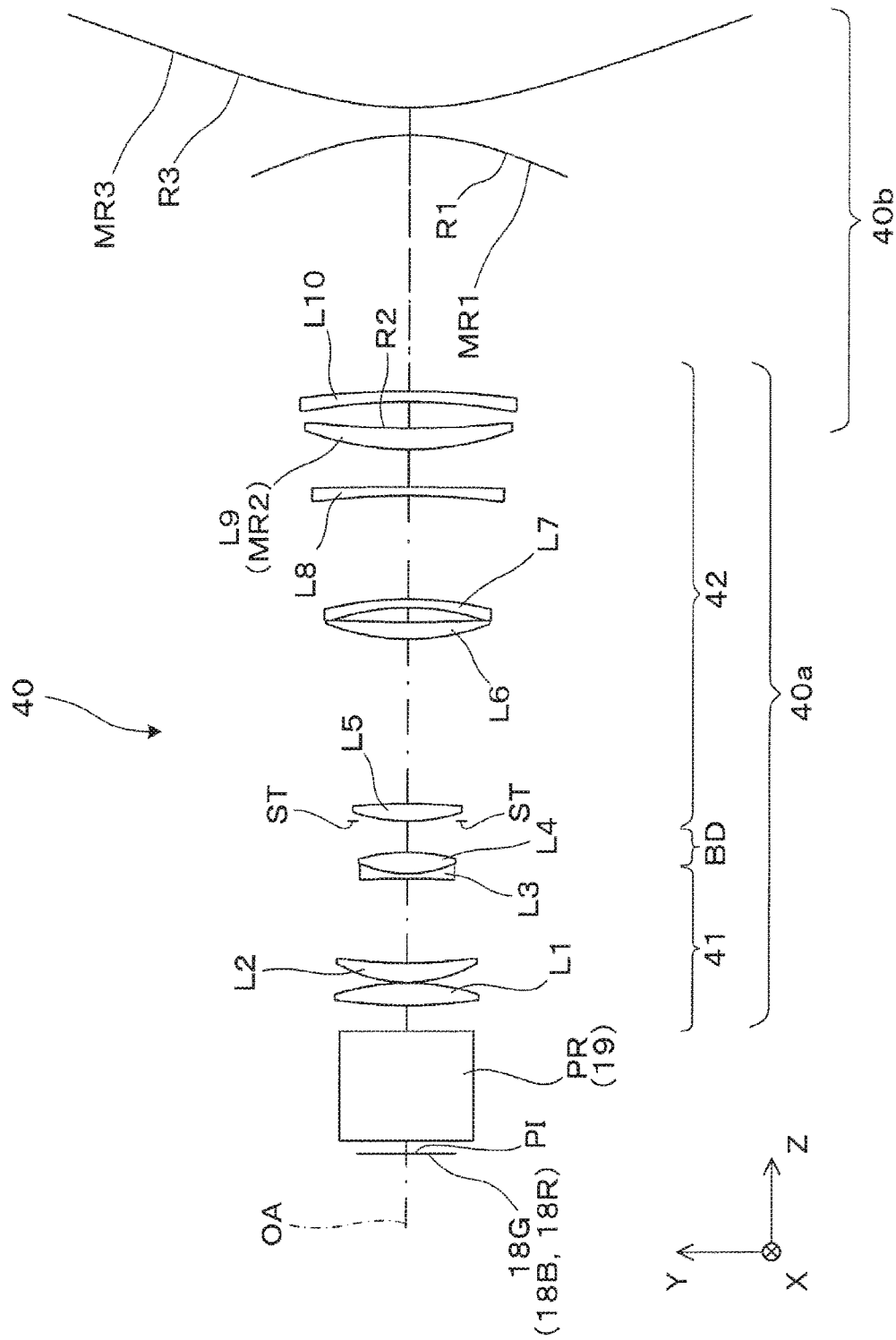
FIG. 30 is a diagram illustrating the configuration of a projection optical system according to Example 6.

FIG. 29 is a diagram illustrating a configuration and light rays from an object surface to a concave reflection mirror in a projection optical system 40 according to Example 6. FIG. 30 is a sectional view illustrating the projection optical system 40 according to Example 6. In FIGS. 29 and 30, the projection optical system 40 enlarges and projects an image on the panel surface PI at a magnifying factor according to a distance to the screen. In the projection optical system 40, the first optical group 40a includes ten lenses L1 to L10, the lenses L1 to L4 included in the 1-1th lens group 41 and the lenses L5 and L10 included in the 1-2th lens group 42, in order from the reduction side. The second optical group 40b includes three aspherical mirrors, the first catoptric system MR1 to the third catoptric system MR3. Here, as described above, the second catoptric system MR2 is shared with the lens located to be closer to the reduction side than the lens on the most enlargement side in the first optical group 40a. The aspherical mirrors other than the second catoptric system MR2 are drawn without being notched in FIG. 30. However, in an actual optical system, the aspherical mirror has a shape partially notched from a circular shape.

Optical elements will be described in detail in an optical path order. The first optical group 40a which is a dioptric system includes ten lenses, a positive first lens (lens L1) with a biconvex shape, a positive second meniscus lens (lens L2) with a convex shape on the reduction side, a cemented lens of a negative third lens (lens L3) with a biconcave shape and a positive fourth lens (lens L4) with a biconvex shape, an aperture stop ST, a positive fifth lens (lens L5) with a biconvex shape, a sixth lens (lens L6) which is a positive meniscus lens with a convex surface facing the reduction side, a seventh lens (lens L7) which is a negative meniscus lens of which a convex surface facing the enlargement side, an eighth lens (lens L8) which is a negative meniscus lens of which a convex surface facing the enlargement side, a ninth lens (lens L9) which is a positive meniscus lens with a convex surface facing the reduction side, and a tenth lens (lens L10) which is a negative meniscus lens of which a convex surface facing the enlargement side, in order from the reduction side. The first optical group 40a is configured to include all spherical lenses. A pencil of rays emitted from the first optical group 40a is formed as a primary image between the first catoptric system MR1 of the second optical group 40b and the first optical group 40a, and is subsequently reflected from the aspherical concave reflection surface R1 of the first catoptric system MR1. The pencil of rays reflected from the first catoptric system MR1 returns to the side of the first optical group 40a, passes through the tenth lens (lens L10) of the first optical group 40a, and is subsequently reflected from a concave reflection surface R2 of the second catoptric system MR2. The concave reflection surface R2 is configured of a reflection film formed on the upper half of the ninth lens (lens L9) of the first optical group 40a, that is, the reflection surface R2 is shared with the reflection surface of the ninth lens (lens L9). The pencil of rays reflected from the second catoptric system MR2 passes through the tenth lens (lens L10) and is reflected from an aspherical convex reflection surface R3 of the third catoptric system MR3 again to be formed as an image on the screen.

In Example 6, the first optical group 40a which is a dioptric system is configured to include all the spherical lenses in which precision is easily ensured and is formed in a general circular shape, and thus it is possible to reduce a manufacturing problem. The aspherical surfaces in Example 6 are only two surfaces, the reflection surfaces R1 and R3 of the first catoptric system MR1 and the third catoptric system MR3 and are general rotationally symmetric surfaces. Therefore, it is relatively easy to manufacture the aspherical surfaces. The second optical group 40b is configured to have the same axis as the first optical group 40a, is easily installable, and is easily manufactured.

In a case in which a projection distance is changed to be magnified, focus is performed by moving the sixth and seventh lenses (lenses L6 and L7) which can be integrally moved and the eighth lens (lens L8) which can be moved alone in the 1-2th lens group 42 by floating. The other lenses of the 1-2th lens group 42, the 1-1th lens group 41, and the second optical group 40b are fixed.

Figure 31A:
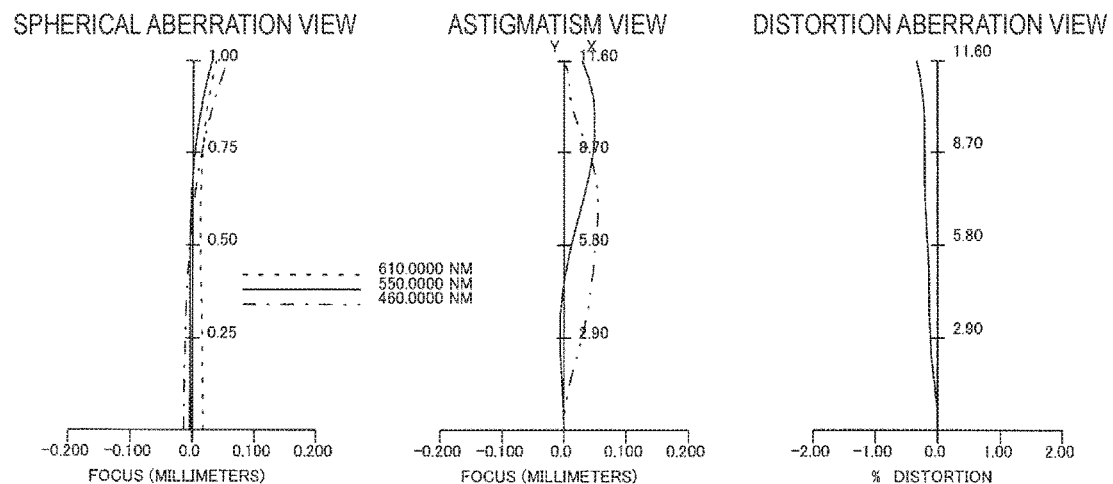
FIGS. 31(A) to 31(C) are reduction-side aberration views of the projection optical system according to Example 6.
Figure 31B:
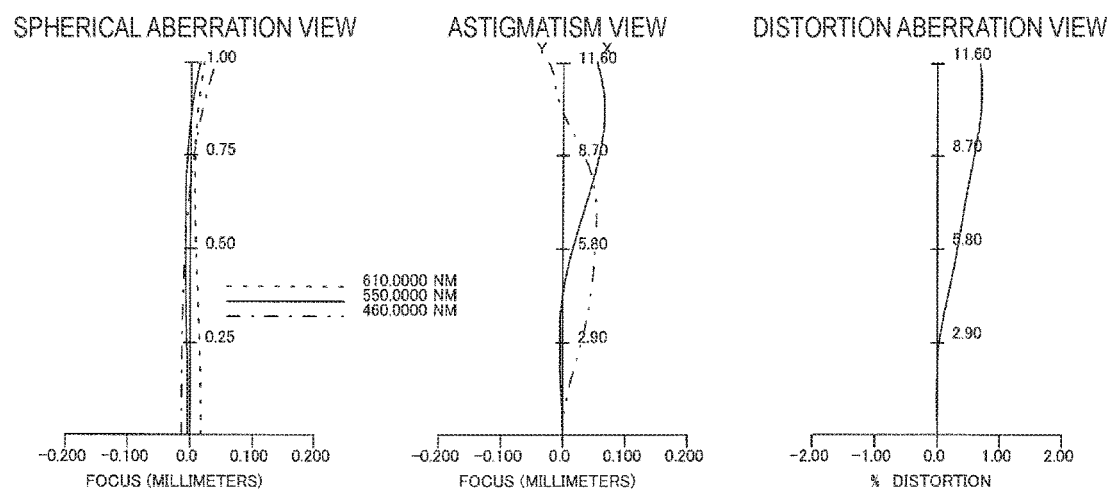
Figure 31C:
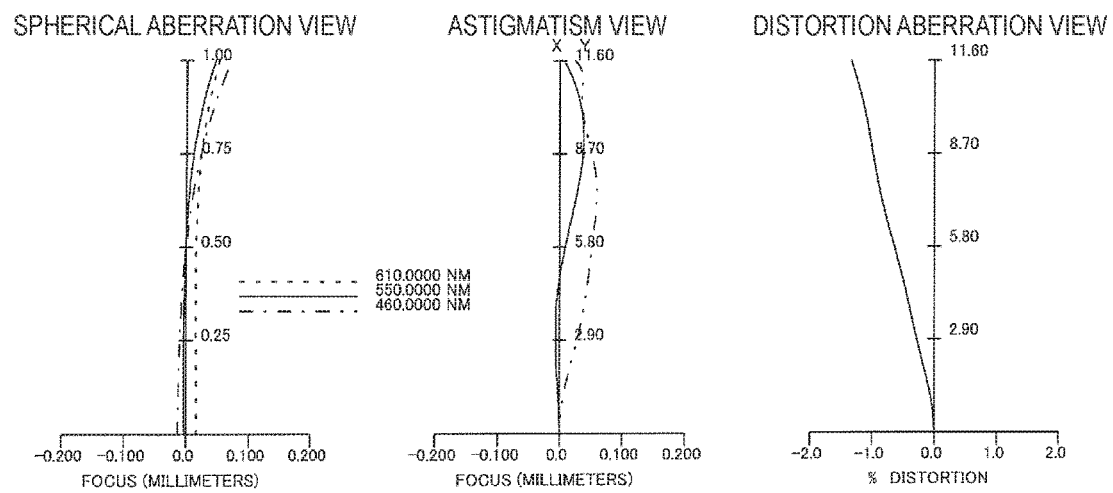
Figure 33A:
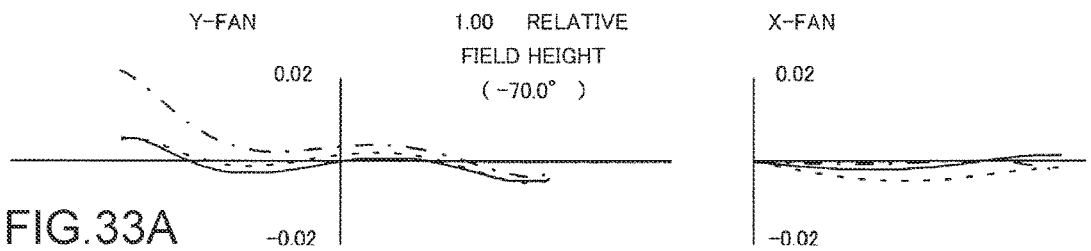
FIGS. 33(A) to 33(E) are lateral aberration views of the projection optical system corresponding to FIG. 31(B).
Figure 33B:
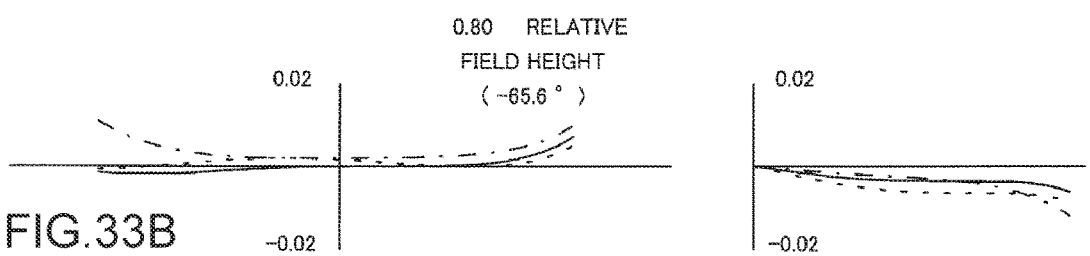
Figure 33C:
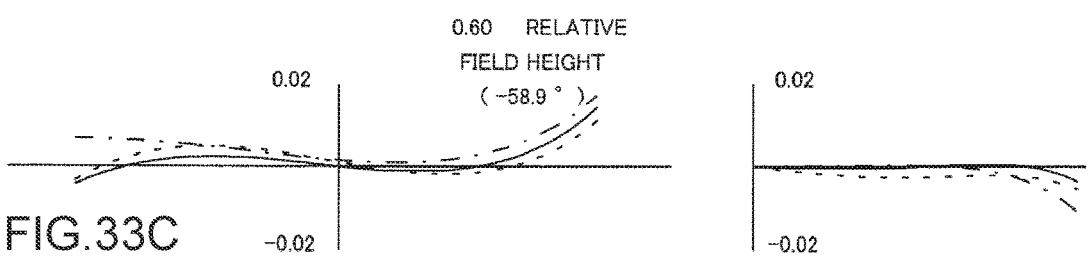
Figure 33D:
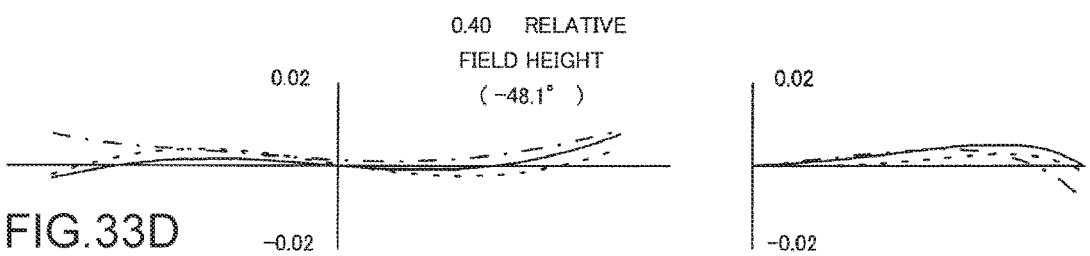
Figure 33E:
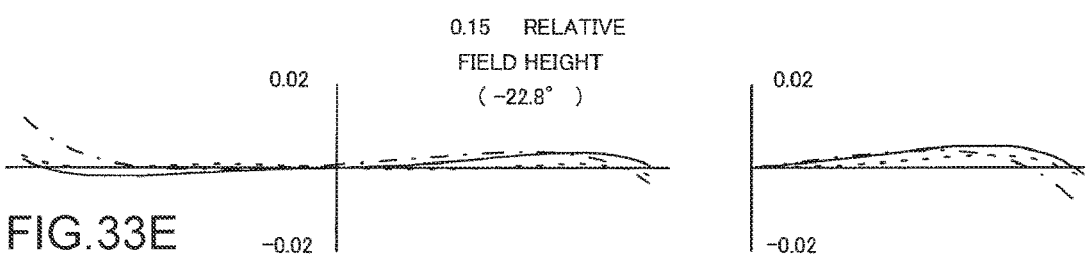
Figure 34A:
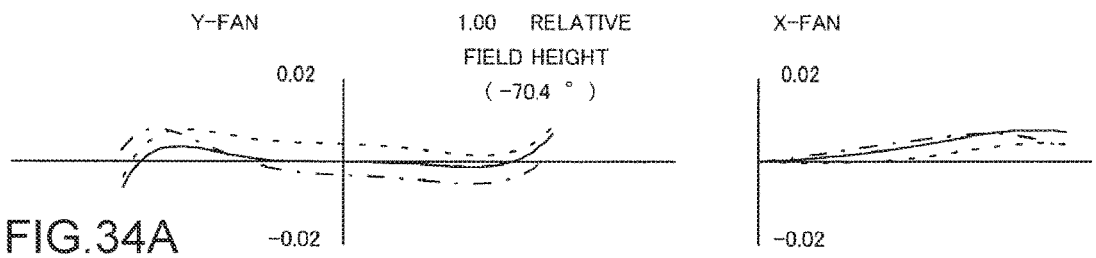
FIGS. 34(A) to 34(E) are lateral aberration views of the projection optical system corresponding to FIG. 31(C).
Figure 34B:
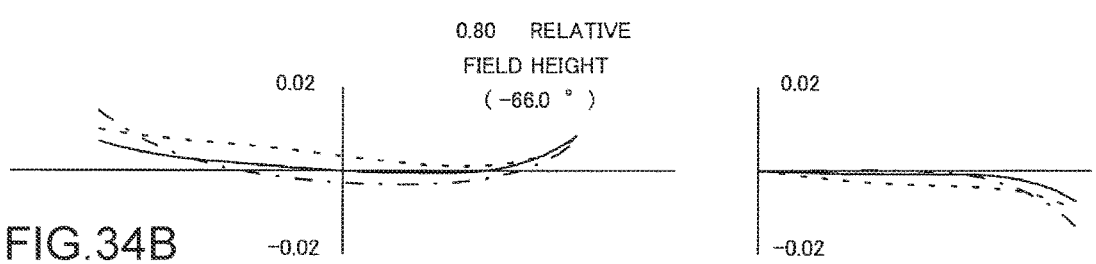
Figure 34C:
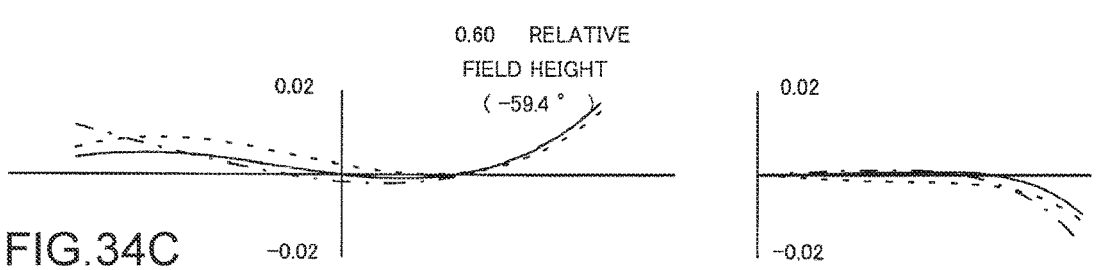
Figure 34D:
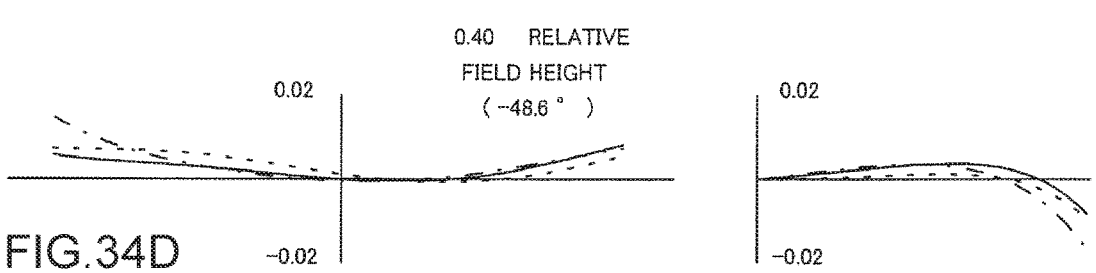
Figure 34E:
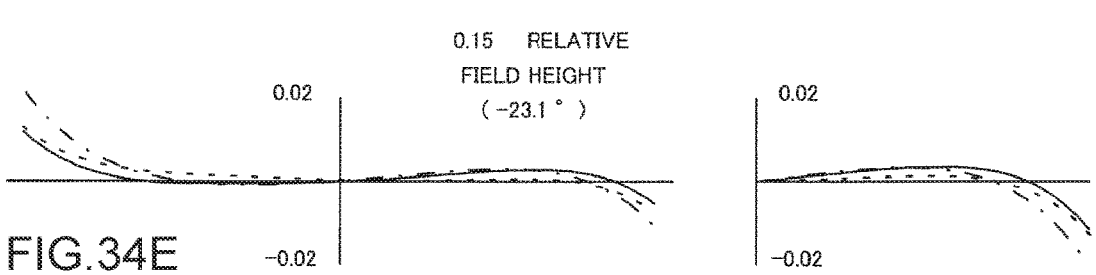

FIG. 31(A) is a reduction-side aberration view (spherical aberration, astigmatism, and distortion aberration) of the projection optical system at the time of a projection magnification of 125 times. FIG. 31(B) is a reduction-side aberration view of the projection optical system at the time of a projection magnification of 171 times. FIG. 31(C) is a reduction-side aberration view of the projection optical system at the time of a projection magnification of 99 times. FIGS. 32(A) to 32(E) are lateral aberration views of the projection optical system corresponding to FIG. 31(A). FIGS. 32(A) to 32(E) illustrate lateral aberrations at field heights of 100%, 80%, 60%, 40%, and 15%. FIG. 32(A) corresponds to a case of a maximum angle of view. Similarly, FIGS. 33(A) to 33(E) are lateral aberration views of the projection optical system corresponding to FIG. 31(B). FIGS. 34(A) to 34(E) are lateral aberration views of the projection optical system corresponding to FIG. 31(C).

Conclusion of Examples

In Examples 1 to 6 described above, the entries in Conditional Expressions (1) to (3) for the focal distance and the like are shown in Table 19 below. It can be understood that Conditional Expressions (1) to (3) are satisfied from numerical values in the following fields.

TABLE 19

| | Example 1 | Example2 | Example3 | Example4 | Example5 | Example6 |
|---|---|---|---|---|---|---|
| f1 | 27.121 | 28.934 | 25.925 | 28.287 | 31.044 | 29.281 |
| f2 | 129.853 | 237.518 | −432.500 | 121.628 | 103.860 | 102.500 |
| f3 | −38.339 | −41.572 | −42.730 | −35.107 | −37.315 | −41.225 |
| F | 4.002 | 4.029 | 3.977 | 3.994 | 4.019 | 4.094 |
| FL | 49.000 | 48.806 | 50.385 | 50.271 | 37.403 | 53.388 |
| $F_{1-1}$ | 41.454 | 50.705 | 49.197 | 44.837 | 45.7565 | 41.4536 |

TABLE 19-continued

| $F_{1-2}$ | 155.477 | 59.584 | 77.937 | 89.326 | 72.045 | 157.834 |
|---|---|---|---|---|---|---|
| | Example 1 | Example 2 | Example 3 | Example 4 | Example 5 | Example 6 |
| \|f1\| | 27.121 | 28.934 | 25.925 | 28.287 | 31.044 | 29.281 |
| \|f2\| | 129.853 | 237.518 | 432.500 | 121.628 | 103.860 | 102.500 |
| \|f3\| | 38.339 | 41.572 | 42.730 | 35.107 | 37.315 | 41.225 |
| F/FL | 0.082 | 0.083 | 0.079 | 0.079 | 0.107 | 0.077 |
| $F_{1-1}/F_{1-2}$ | 0.267 | 0.851 | 0.631 | 0.502 | 0.635 | 0.263 |

In any example, the dioptric system (the first optical group 40a) can be configured with a small number of lenses of 5 to 7 while having a wide angle of view such as about a half angle of view of about 70° at a wide angle end. As a comparison, for example, in a case in which a one-mirror scheme is set in a catoptric system, a light flux reflected from a concave lens interferes in a lens on the most enlargement side of a dioptric system. Therefore, there is a possibility that it is necessary to increase an offset amount of a screen or cut a part of a lens. However, in the embodiment, in a case in which the catoptric system is configured to include three mirrors, a part of the enlargement side which is likely to interfere in the dioptric system as in the above-described example can be used (can also serve as) as a mirror depending on a configuration. Thus, the configuration is easy and there is also an advantage in cost.

As described above, in the projection optical system or the projector using the projection optical system according to the embodiment, the catoptric system (the second optical group) has a negative power as a whole. Therefore, the dioptric system (the first optical group) has a simpler configuration than in the related art and has a sufficiently good optical performance similarly to a case in which the dioptric system (the first optical group) is configured to include multiple lenses as in the related art. Further, the whole length of the focus group is short and is lightweight. Thus, even when a coupling unit of the focus group and a main lens barrel is simplified, the miniaturization and a decrease in cost of all the lenses can be realized without having an influence on the performance.

The invention is not limited to the foregoing embodiment and examples, but may be realized in various forms within the scope of the invention without departing from the gist of the invention.

For example, the curved surface shape of the second catoptric system MR2 is configured as the concave surface or the convex surface, but may be configured as a planar surface.

In the foregoing embodiment, for example, the method of manufacturing the lens L7 which is the light transmission reflection optical system can also be realized in various forms. For example, after the refractive lens is formed in a normal lens manufacturing process, lens coating is performed. Thereafter, the lens L7 can be manufactured by depositing aluminum in a state in which a region equivalent to a light transmission region is masked so that a reflective film is formed only in a portion equivalent to a light reflection region.

For example, in each example, one or more lenses that substantially have no power can be added before, after, or between lenses forming each lens group.

A target to be enlarged and projected by the projection optical system 40 is not limited to an image formed on the liquid crystal panel, but an image formed by a light modulation element such as a digital micromirror device can be enlarged and projected by the projection optical system 40.

The entire disclosure of Japanese Patent Application No. 2015-163476, filed Aug. 21, 2015 is expressly incorporated by reference herein.

The invention claimed is:

1. A projection optical system comprising:
   a dioptric system including a plurality of lenses and having positive powers and a catoptric system that are installed in order from a reduction side,
   wherein the catoptric system includes first, second, and third catoptric systems installed in order from a side of the dioptric system along an optical path of light emitted from the dioptric system,
   wherein the first catoptric system includes a first reflection surface that has a concave surface shape,
   wherein the second catoptric system includes a second reflection surface that has a curved surface shape,
   wherein the third catoptric system includes a third reflection surface that has a convex surface shape,
   wherein at least two of the first, second, and third reflection surfaces have an aspherical shape, and
   wherein when f1 is a focal distance of the first catoptric system, f2 is a focal distance of the second catoptric system, and f3 is a focal distance of the third catoptric system, f1, f2, and f3 satisfy Conditional Expression (1) below $$|f2|>|f3|>|f1| \tag{1}$$

2. The projection optical system according to claim 1, wherein when F is a focal distance of the whole system and FL is a focal distance of the dioptric system, Conditional Expression (2) below is satisfied $$0.05<F/FL<0.15 \tag{2}$$

3. The projection optical system according to claim 1, wherein all the plurality of lenses are rotationally symmetric systems.

4. The projection optical system according to claim 3, wherein all surfaces of the plurality of lenses and the first to third catoptric systems are configured with rotationally symmetric surfaces to form a coaxial optical system that has a same optical axis.

5. The projection optical system according to claim 1, wherein the plurality of lenses include a light transmission reflection optical system that has a light transmission region functioning as a part of the dioptric system and a light reflection region functioning as the second reflection surface.

6. The projection optical system according to claim 5, wherein the light transmission reflection optical system is disposed in a most enlargement side in the dioptric system and is fixed in focusing at the time of magnification associated with a change in a projection distance.

7. The projection optical system according to claim 1, wherein the dioptric system includes at least one lens group moved at the time of magnification and is configured to include a 1-1th lens group with a positive power and a 1-2th lens group with a positive power in order from the reduction side using a variable interval on a most reduction side as a boundary, and Conditional Expression (3) below is satisfied when $F_{1-1}$ is a focal distance of the 1-1th lens group and $F_{1-2}$ is a focal distance of the 1-2th lens group $$0.0 < |F_{1-1}/F_{1-2}| < 1.0 \qquad (3).$$

8. The projection optical system according to claim 1, wherein a numerical aperture on an object side is equal to or greater than 0.27.

9. The projection optical system according to claim 1, wherein the reduction side is substantially telecentric.

10. The projection optical system according to claim 1, wherein a magnification range is 1.4 times or more.

11. A projector comprising:
a light source;
a light modulation element that modulates light from the light source to form image light; and
the projection optical system according to claim 1 that projects the image light.

12. A projector comprising:
a light source;
a light modulation element that modulates light from the light source to form image light; and
the projection optical system according to claim 2 that projects the image light.

13. A projector comprising:
a light source;
a light modulation element that modulates light from the light source to form image light; and
the projection optical system according to claim 3 that projects the image light.

14. A projector comprising:
a light source;
a light modulation element that modulates light from the light source to form image light; and
the projection optical system according to claim 4 that projects the image light.

15. A projector comprising:
a light source;
a light modulation element that modulates light from the light source to form image light; and
the projection optical system according to claim 5 that projects the image light.

16. A projector comprising:
a light source;
a light modulation element that modulates light from the light source to form image light; and
the projection optical system according to claim 6 that projects the image light.

17. A projector comprising:
a light source;
a light modulation element that modulates light from the light source to form image light; and
the projection optical system according to claim 7 that projects the image light.

18. A projector comprising:
a light source;
a light modulation element that modulates light from the light source to form image light; and
the projection optical system according to claim 8 that projects the image light.

19. A projector comprising:
a light source;
a light modulation element that modulates light from the light source to form image light; and
the projection optical system according to claim 9 that projects the image light.

20. A projector comprising:
a light source;
a light modulation element that modulates light from the light source to form image light; and
the projection optical system according to claim 10 that projects the image light.

* * * * *